(12) United States Patent
Petrus et al.

(10) Patent No.: US 12,276,951 B2
(45) Date of Patent: Apr. 15, 2025

(54) INTELLIGENT BUILDING MANAGEMENT SYSTEMS

(71) Applicant: SmithGroup Companies, Inc., Detroit, MI (US)

(72) Inventors: Ionel Petrus, Silver Spring, MD (US); Elena Gowdy Charming, Arlington, VA (US); Ma Melissa Lim, Springfield, VA (US); Stet Sanborn, Oakland, CA (US)

(73) Assignee: SMITHGROUP COMPANIES, INC., Detroit, MI (US)

( * ) Notice: Subject to any disclaimer, the term of this patent is extended or adjusted under 35 U.S.C. 154(b) by 268 days.

(21) Appl. No.: 17/748,696

(22) Filed: May 19, 2022

(65) Prior Publication Data

US 2022/0283553 A1 Sep. 8, 2022

Related U.S. Application Data

(63) Continuation-in-part of application No. 17/163,133, filed on Jan. 29, 2021, now Pat. No. 11,579,573, (Continued)

(51) Int. Cl.
G05B 13/04 (2006.01)
G05B 13/02 (2006.01)
G06N 20/00 (2019.01)

(52) U.S. Cl.
CPC ....... *G05B 13/041* (2013.01); *G05B 13/0265* (2013.01); *G06N 20/00* (2019.01); *G05B 2219/25011* (2013.01)

(58) Field of Classification Search
CPC .................................................. G05B 13/041
See application file for complete search history.

(56) References Cited

U.S. PATENT DOCUMENTS 8,091,088 B2  1/2012 Kishan et al.
9,092,741 B1  7/2015 Goparaju et al.
(Continued)

FOREIGN PATENT DOCUMENTS

| CN | 104516324 A | * | 4/2015 | ....... G05B 19/41815 |
| CN | 105318500 A | * | 2/2016 | ............. F24F 11/30 |
| WO | 2013176334 A1 | | 11/2013 | |

OTHER PUBLICATIONS

Jim Gao, "Machine Learning Applications for Data Center Optimization," Google, 2014, pp. 1-13.
(Continued)

*Primary Examiner* — Suresh Suryawanshi
(74) *Attorney, Agent, or Firm* — Brooks Kushman P.C.

(57) ABSTRACT

A hierarchical resource analysis system, for a building that has a plurality of zones each with a corresponding resource arranged to alter an environment of the zone, includes one or more processors that implement a plurality of causal agents and a causal coordinator. Each of the causal agents reports to the causal coordinator parameter values describing a state of the environment of one of the zones and parameter values describing a state of the corresponding resource for the zone. The causal coordinator, responsive to indication that at least one of the parameter values describing a state of the environment of one of the zones is outside a predefined zone range and all of the parameter values describing the states of the corresponding resources for the zones being within corresponding predefined resource ranges, commands at least one of the causal agents to operate the corresponding resource within an altered span.

5 Claims, 52 Drawing Sheets

Related U.S. Application Data which is a continuation of application No. 16/436,564, filed on Jun. 10, 2019, now Pat. No. 10,908,564.

(60) Provisional application No. 62/682,746, filed on Jun. 8, 2018.

(56) References Cited

U.S. PATENT DOCUMENTS

| | | |
|---|---|---|
| 9,817,383 B1 | 11/2017 | Sinha et al. |
| 2009/0276060 A1 | 11/2009 | Lu et al. |
| 2012/0010757 A1 | 1/2012 | Francino et al. |
| 2015/0241895 A1* | 8/2015 | Lu .................. G05F 1/66 700/295 |
| 2016/0091871 A1* | 3/2016 | Marti ............... H04L 67/535 702/188 |
| 2016/0305678 A1* | 10/2016 | Pavlovski ........... G05B 15/02 |
| 2017/0322534 A1 | 11/2017 | Sinha et al. |
| 2018/0138742 A1 | 5/2018 | Song et al. |
| 2018/0204116 A1 | 7/2018 | Evans et al. |
| 2018/0275625 A1 | 9/2018 | Park et al. |
| 2018/0299840 A1* | 10/2018 | Sinha ............... G05B 13/0265 |
| 2018/0335759 A1 | 11/2018 | Harvey |
| 2018/0356775 A1 | 12/2018 | Harvey |
| 2018/0364654 A1 | 12/2018 | Locke et al. |
| 2019/0017719 A1 | 1/2019 | Sinha et al. |
| 2019/0353379 A1 | 11/2019 | Lee et al. |
| 2019/0361412 A1 | 11/2019 | Park et al. |

OTHER PUBLICATIONS

Tools-Center for Causal Discovery, https://www.ccd.pitt.edu/tools/, accessed Nov. 3, 2020, 4 pgs.

Richard Scheines, Tutorial: Causal Model Search, https://www.cmu.edu/dietrich/philosophy/events/workshops-conferences/causal-discovery/RichardScheinesTutorial.pdf, accessed Nov. 3, 2020, 93 pgs.

Tetrad Tutorial, https://rawgit.com/cmu-phil/tetrad/development/tetrad-gui/src/main/resources/resources/javahelp/manual/tetrad_tutorial.html#/toc_1, accessed Nov. 3, 2020, 20 pgs.

Causal Models, Stanford Encyclopedia of Philosophy, https://plato.stanford.edu/entries/causal-models/, accessed Aug. 7, 2018, 34 pgs.

* cited by examiner

INTELLIGENT BUILDING MANAGEMENT SYSTEMS

CROSS-REFERENCE TO RELATED APPLICATIONS

This application is a continuation-in-part of U.S. patent application Ser. No. 17/163,133, filed Jan. 29, 2021, which is a continuation of U.S. patent application Ser. No. 16/436,564, filed Jun. 10, 2019, which claims the benefit of U.S. Provisional Patent Application No. 62/682,746, filed Jun. 8, 2018, all of which are incorporated by reference herein in their entirety.

TECHNICAL FIELD

This disclosure relates to the control of equipment used within buildings.

BACKGROUND

A building management system (BMS), otherwise known as a building automation system (BAS), is a computer-based control system installed in a building that controls and monitors the building's electrical and mechanical equipment such as ventilation, lighting, power systems, fire systems, and security systems. As such, a BMS may also include a variety of devices (e.g., HVAC devices, controllers, chillers, fans, sensors, lighting controllers, lighting fixtures etc.) configured to facilitate monitoring and controlling the building space. Throughout this disclosure, such devices are referred to as BMS devices or building equipment.

Typically, even though the building controllers, input-output devices, and various switching equipment communicate via open source networks such as BACnet, LONworks, Modbus etc. the programming language for each such device is proprietary to the specific manufacturer. The sequences of operation for each system are manually programmed into each controller and then "released" to automatically control their related systems.

SUMMARY

A hierarchical resource analysis system, for a building that has a plurality of zones each with a corresponding resource arranged to alter an environment of the zone, includes one or more processors that implement a plurality of causal agents and a causal coordinator. Each of the causal agents reports to the causal coordinator parameter values describing a state of the environment of one of the zones and parameter values describing a state of the corresponding resource for the zone. The causal coordinator, responsive to indication that at least one of the parameter values describing a state of the environment of one of the zones is outside a predefined zone range and all of the parameter values describing the states of the corresponding resources for the zones being within corresponding predefined resource ranges, commands at least one of the causal agents to operate the corresponding resource within an altered span of at least one of the predefined resource ranges that is derived from a causal analysis of the parameter values describing the states of the environments of the zones and parameter values describing the states of the corresponding resources for the zones such that the at least one of the parameter values describing the state of the environment returns to the predefined zone range.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent.

A. SMITHGROUP-AI

1. General Description

SMITHGROUP-AI (supervisor) is an independent, multifunctional software agent responsible for the monitoring and control of all agents that control all building systems. Its main goal is to direct the agents to operate at conditions that result in the lowest possible building energy consumption levels and building energy cost levels. This is achieved by analyzing all possible combinations and associated laws between the various system coordinator scenarios, and then directing each system coordinator to implement a scenario that will result in the lowest possible building energy consumption levels. It is not required nor assumed that SMITHGROUP-AI selects the most energy efficient scenario from each system coordinator. Some system coordinator scenarios selected to be implemented by SMITHGROUP-AI might not be the most energy cost efficient for that system; however, when analyzed from an overall building energy consumption or energy cost level, those scenarios are collectively the most energy efficient. Further, SMITHGROUP-AI using various known machine learning algorithms may predict the overall building energy consumption and energy cost levels for the following hour, day, week, month and year.

Figure 1:
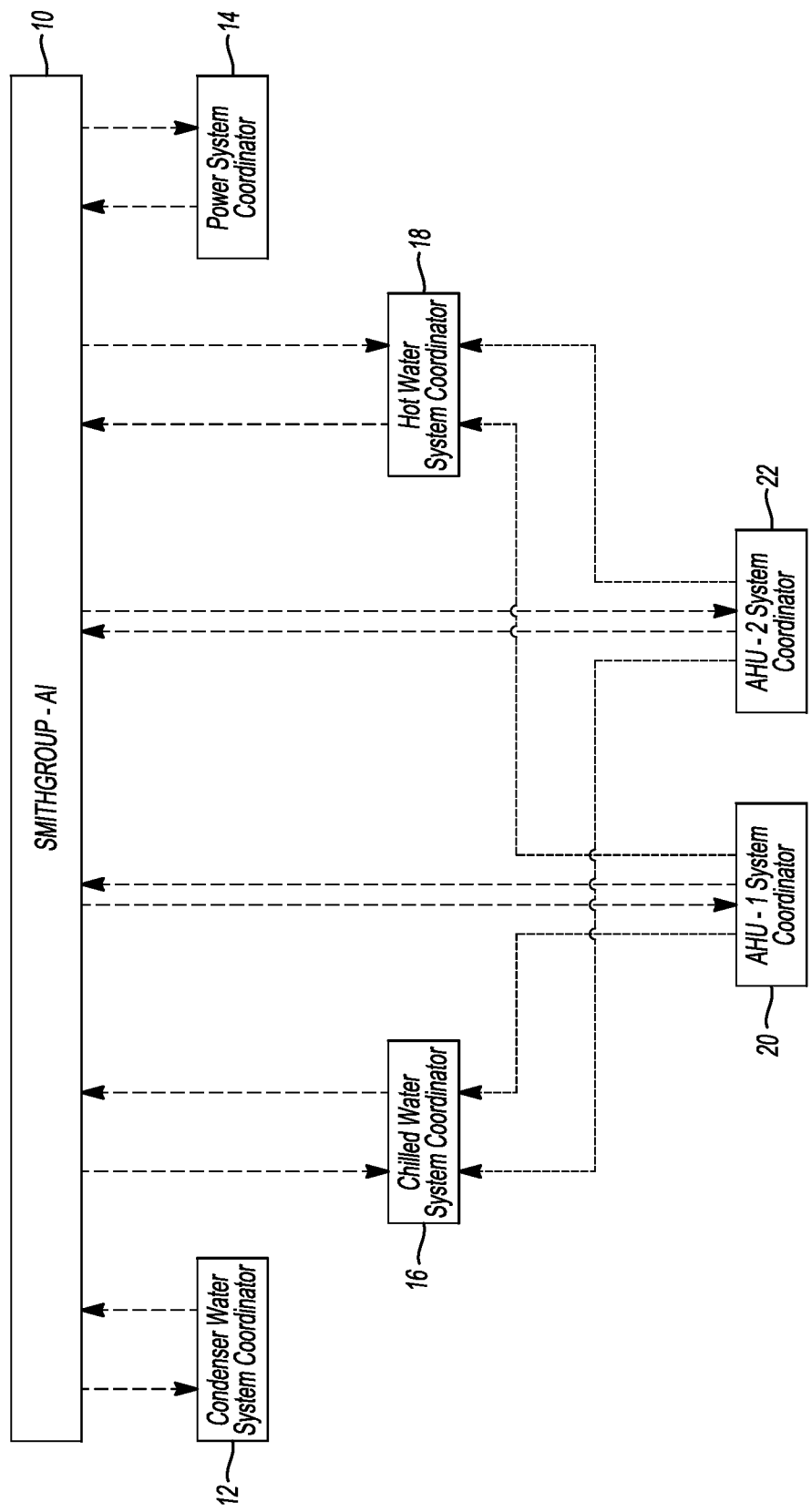
FIG. 1 shows the communication architecture between SMITHGROUP-AI and various system coordinators.

FIG. 1 shows the communication architecture between SMITHGROUP-AI 10 and the various system coordinators 12, 14, 16, 18, 20, 22.

2. Internal Structure

Figure 2:
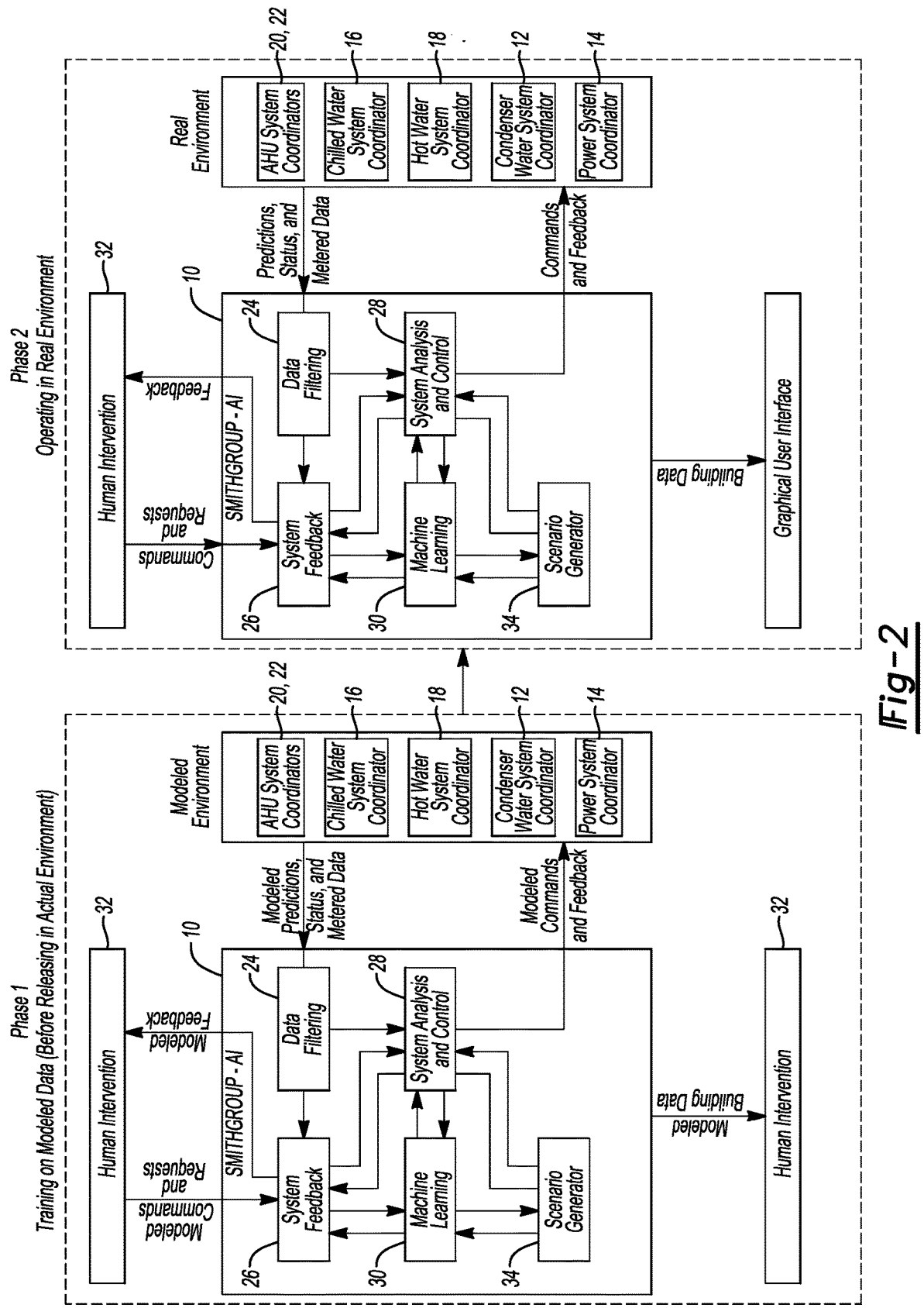
FIG. 2 shows the internal structure of SMITHGROUP-AI and its related environment.

Referring to FIG. 2, the internal structure of SMITHGROUP-AI 10 and its related environment is shown. The environment for SMITHGROUP-AI 10 is comprised of all system coordinators 12, 14, 16, 18, 20, 22 that it monitors and controls.

SMITHGROUP-AI 10 is comprised of five modules, each with its own dedicated algorithms and controls logic. The data filtering module 24 is responsible for separating the data received from the various coordinators 12, 14, 16, 18, 20, 22. For example, the actual building energy consumption and energy cost levels may be sent to the system feedback module 26, while energy consumption predictions and associated scenarios from the system coordinators 12, 14, 16, 18, 20, 22 will be sent to the system analysis and control module 28.

The system feedback module 26 is responsible for the following:
  Collection of information from the system coordinators 12, 14, 16, 18, 20, 22; the information may represent status (e.g. failed, maintenance), or actual agent energy consumption and energy cost levels. A failed status may indicate that a system coordinator may no longer control its environment and should be excluded from the overall building energy consumption and energy cost level predictions that the machine learning module 30 is making. A maintenance status may indicate that a system coordinator has entered or may enter a maintenance mode and that the machine learning module 30 needs to update its predictions accordingly. The information may also represent predictions related to the energy consumption levels of each agent.

Analysis of predictions related to the total building energy consumption and energy cost levels; the actual energy consumption levels from the various agents will be compared against their own predictions and also against the predictions made by the machine learning module 30. Any large discrepancies between the predicted and actual energy consumption and energy cost levels could mean that the associated scenarios that SMITHGROUP-AI 10 has directed the system coordinators 12, 14, 16, 18, 20, 22 to execute are no longer valid. This could also indicate that, due to various events (e.g. equipment failures, sensor failures etc.) some agents within the system may conflict with their own internal laws. Further, this could also indicate that the difference in the error or accuracy of the predictions made by the machine learning module 30 or by each system coordinator 12, 14, 16, 18, 20, 22 and the actual outcome might have exceeded critical limits, which in turn has affected the overall energy consumption and energy cost levels of the building. The system feedback module 26 may then send the actual energy consumption and energy cost levels to the machine learning module 30 such that the machine learning module 30 can update its internal learning algorithms.

An internal law for an agent may be one (or both) of the following (i) a physical property (e.g. maximum air flow through a fan, maximum water flow through a pump) of a system that the agent is controlling and/or responsible for, (ii) a software or hardware (e.g. computing power) limitation of the agent; e.g. a coordinator may ask an agent to provide predictions for a significantly large (and maybe unrealistic) number of scenarios within a limited/short amount of time. This request may impede the agent's ability to control the system that it serves. Agents may report their internal laws to their coordinators such that the coordinators can determine whether certain scenarios generated by one agent violates the internal laws of another agent, etc.

Receiving requests from the HUMAN INTERVENTION Application Programming Interface (API) 32. For example, the system feedback module 26 may receive a request to simulate what will the total building energy cost (e.g. natural gas or electricity) be if the cost of electricity will increase by 20% starting two months from the current date. The system feedback module 26 will then send this scenario to the machine learning module 30, which in turn may use its own internal algorithms to make predictions regarding the total building energy costs; the machine learning module 30 will then send these predictions back to the system feedback module 26, which in turn will send them to the HUMAN INTERFACE API 32. The machine learning module 30 may also determine that, to make the requested predictions, it needs inputs (e.g. energy consumption predictions) from the various system coordinators 12, 14, 16, 18, 20, 22; as such, it may ask the system analysis and control module 28 to direct the various system coordinators 12, 14, 16, 18, 20, 22 to make the associated predictions and send them back to SMITHGROUP-AI 10 to be processed and analyzed.

Further, the system feedback module 26 may receive a request to simulate what will happen (e.g. what systems are affected and by what degree) if a major piece of equipment (e.g. chiller, boiler) will fail at a certain moment in time. The system feedback module 26 and the machine learning module 30 will then follow a process as described in the previous example.

Receiving commands from the HUMAN INTERVENTION API 32. For example, the system feedback module 26 may receive a command to run the entire chilled water plant at 50% capacity or to put a certain piece of equipment (e.g. chiller, boiler, AHU, etc.) in maintenance mode. The system feedback module 26 will then send this command to the system analysis and control module 28 to be analyzed. Before executing the command, the system analysis and control module 28 will direct the system coordinators 12, 14, 16, 18, 20, 22 to simulate what will be the outcomes (e.g. unable to maintain zone temperatures, warmer chilled water temperature, colder hot water temperature, etc.) associated with the command. The system analysis and control module 28 will then send these outcomes to the system feedback module 26, which in turn will send them back to the HUMAN INTERVENTION API 32 for confirmation. Once it receives confirmation from the HUMAN INTERVENTION API 32, via the system feedback module 26, the system analysis and control module 28 will then direct the system coordinators 12, 14, 16, 18, 20, 22 to execute the command.

The machine learning module 30 is responsible for the following:

Collection of information from the system feedback module 26. The type of information that this module will collect is described under the system feedback module 26.

Collection of information from the system analysis and control module 28. This information may represent prediction scenarios from system coordinators 12, 14, 16, 18, 20, 22 regarding energy consumption levels associated with each system.

receiving prediction requests from the system analysis and control module 28. For example, the system analysis and control module 28, after it analyzed and established what combination of system coordinator scenarios will need to be executed, may send these scenarios to the machine learning module 30. The machine learning module 30, using machine learning algorithms and historical data, may predict that the combination of system coordinator scenarios selected by the system analysis and control module 28 will not result in the lowest possible energy consumption and energy cost levels for the entire building. The machine learning module 30 will then send this output to the system analysis and control module 28 for analysis.

Making predictions, using machine learning algorithms, based on the data received from the system analysis and control module 28, for the overall building energy consumption or energy cost levels. In addition, the machine learning module 30 may also make predictions related to the peak electricity demand for the entire building. For example, by analyzing the electricity peak demand charge rate schedule from the utility provider, and with input from the system analysis and control module 28, the machine learning module 30 may predict that, at a certain time in the day, the facility peak electricity demand may exceed a value after which the facility will incur significant surcharges. The machine learning module 30 may then send this prediction to the system analysis and control module 28, which in turn may direct the system coordinators 12, 14, 16, 18, 20, 22 to analyze various scenarios for their related systems and agents to minimize the overall peak facility electricity demand at that time in the day. The systems coordinators 12, 14, 16, 18, 20, 22 will then send back their associated predictions, together with any system constraints or laws that they might not be able to meet should they be directed to implement the associated scenarios. For example, AHU-1 system coordinator 20 may determine that, to reduce the energy consumption of the AHU fans, some zones, based on their importance factor, may have to have their temperature setpoints increased or decreased. (Zone and system are sometimes used interchangeably herein.) This approach could put a zone agent in conflict with its own internal laws. The system analysis and control module 28 will then analyze the predicted scenarios received from the AHU-1 system coordinator 20 and it may decide to direct the system coordinators 12, 14, 16, 18, 20, 22 to execute the scenarios associated with the combination that result in a peak facility electricity demand lower than the critical value, even though this command may put various agents in conflict with their own internal laws.

Sending the predictions to the system analysis and control module 28 and to the scenario generator module 34.

The system analysis and control module 28 is responsible for the following:

Monitoring and control of all system coordinators 12, 14, 16, 18, 20, 22.

Collection of information from the data filtering module 24. The type of information that this module will collect is described under the data filtering module 24. The system analysis and control module 28 may then analyze all possible system coordinator scenario combinations and select the combination that will result in the lowest possible building energy consumption or energy cost levels. After establishing the combination that will result in the lowest possible building energy consumption or energy cost levels, the system analysis and control module 28 may direct the system coordinators 12, 14, 16, 18, 20, 22 to execute the scenarios associated with that specific combination.

Collection of information from the system feedback module 26. The type of information that this module will collect is described under the system feedback module 26.

Receiving predictions made by the machine learning module 30. The type of predictions that the machine learning module 30 may send to the system analysis and control module 28 is described in the machine learning module 30 section above. Based on the input (e.g. equipment failures, unoccupied zones previously predicted to be occupied zones, etc.) provided by the system coordinators 12, 14, 16, 18, 20, 22, the system analysis and control module 28 may decide to override the predictions made by the machine learning module 30 and direct the system coordinators 12, 14, 16, 18, 20, 22 to implement the combination of scenarios previously established. The system analysis and control module 28 may also decide to direct the system coordinators 12, 14, 16, 18, 20, 22 to update their predictions and send them back to SMITHGROUP-AI 10 for analysis.

The scenario generator module 34 is responsible for continuously looking for ways to improve the overall energy or energy cost performance of the building. For example, the scenario generator module 34 may create a series of scenarios which will then be sent to the system analysis and control module 28 to analyze and validate; the system analysis and control module 28 may ask the system coordinators 12, 14, 16, 18, 20, 22 to make predictions on the scenarios generated by the scenario generator module 34. Once the associated system coordinator predictions are received and validated, the system analysis and control module 28 will establish which combinations of scenarios may result in the lowest energy consumption or energy cost level. The system analysis and control module 28 will then send these combinations to the machine learning module 30 to make predictions, as previously described, or it may send them back to the scenario generator module 34 for analysis. After analyzing the predictions made by the machine learning module 30 or the system coordinator combination scenarios received from the system analysis and control module 28, the scenario generator module 34 may decide to direct the system analysis and control module 28 to implement a specific combination of system coordinator scenarios. The system analysis and control module 28 will then direct the system coordinators 12, 14, 16, 18, 20, 22 to execute the scenarios associated with that specific combination.

The scenario generator module 34 may create scenarios by modelling zone agents under different conditions (e.g. various zone temperature setpoints, various supply airflow setpoints and associated temperature, various lighting loads, various plug loads, etc.), by modelling AHUs as delivering various airflows at various temperatures, by modelling the chilled water plant as delivering various chilled water temperatures and various associated chilled water flows, by modelling the condenser water plant as delivering various condenser water temperatures and condenser water flows, or by modeling the hot water plant as delivering various hot water temperatures and associated water flows, etc.

B. Zone Agent

1. General Description

The zone agent is an independent, multifunctional software agent responsible for management of zones throughout the building. A "zone" can be comprised of one or more rooms, one or more lighting control zones, one or more receptacle control zones, and one or more heating/cooling terminal units. The functions and responsibilities of the zone agent include but are not limited to:

Prediction of current and future heating and cooling loads.

Measurement of current occupancy and prediction of future occupancy.

Prediction of terminal unit reheat coil performance under various combinations of entering air temperature, entering water temperature, etc.

Prediction of terminal unit cooling coil performance under various combinations of entering air temperature, entering water temperature, etc.

Prediction of terminal unit energy consumption under various combinations of entering air temperature, entering water temperatures, etc.

Modulation of terminal unit actuators to satisfy room heating and cooling as directed by SMITHGROUP-AI 10.

Zone lighting control.

Zone receptacle control for switched receptacle circuits.

Monitoring of total zone power consumption.

Monitoring of zone receptacle power consumption and prediction of future zone receptacle power consumption.

Operation of motorized shading.

Airflow/Ventilation optimization.

2. Internal Structure

Figure 3:
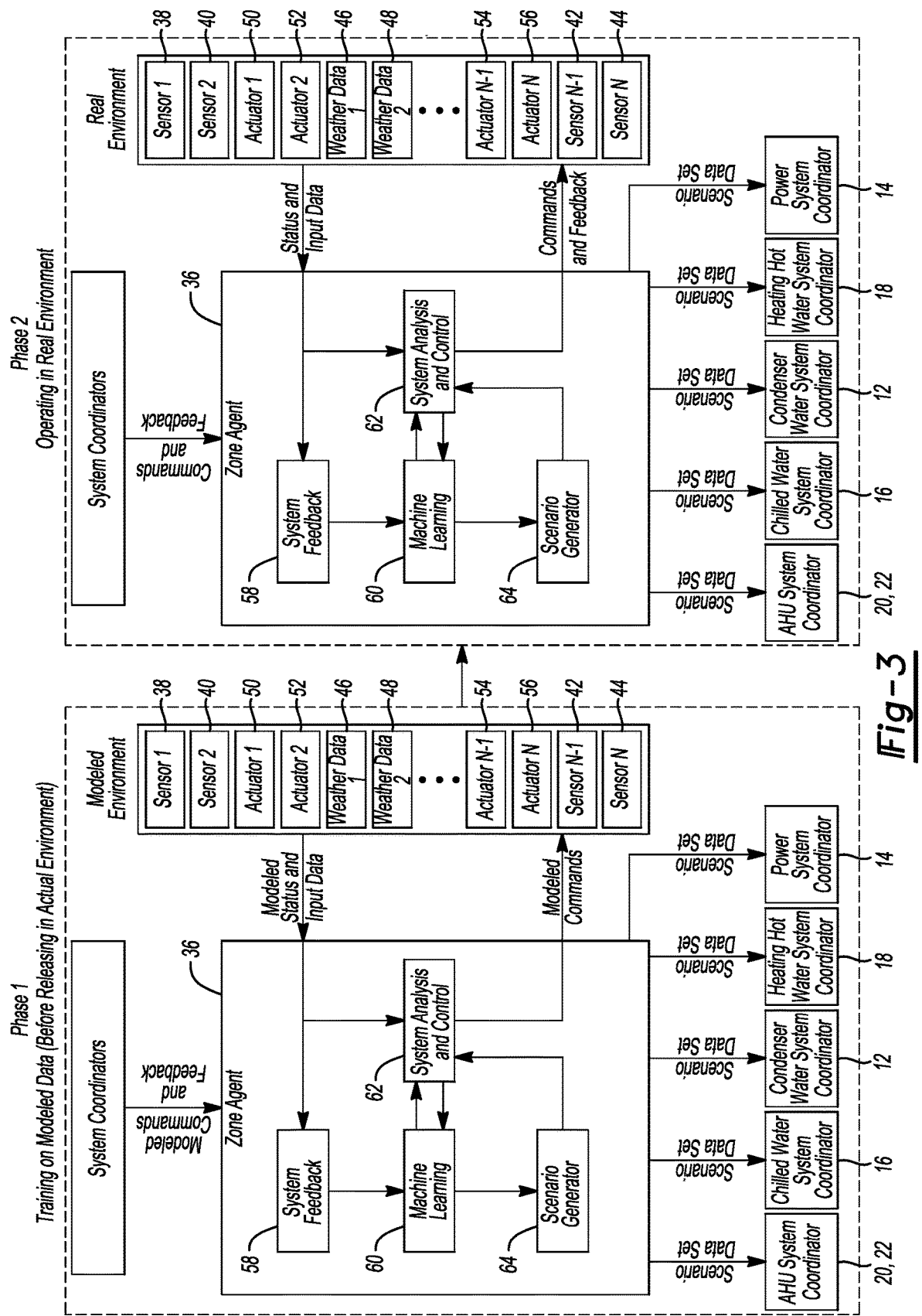
FIG. 3 shows the internal structure of the zone agent and its related environment.

Referring to FIG. 3, the internal structure of the zone agent 36 and its related environment is shown. The environment for the zone agent 36 is comprised of the sensors 38, 40, 42, 44 within the zone, global sensors, weather data from an internet source (API) 46, 48, and effectors 50, 52, 54, 56 within the zone. The agent 36 is comprised of four modules, each with its own dedicated algorithms and controls logic.

The system feedback module 58 is responsible for the following:

Collection of information from all associated sensors 38, 40, 42, 44, data sources 46, 48, and effectors 50, 52, 54, 56; the data received will be compared against the predictions made by the machine learning module 60. Where appropriate, a time delay will be implemented when comparing the measured data to predictions; data will also be compared to historical data to allow for the filtering of outlier data that may be caused by a malfunctioning sensor or atypical temporary conditions. Once the implementation of appropriate time delays and filtering is complete, the system feedback module 58 will then send the measured values to the machine learning module 60 such that the machine learning module 60 can update its internal learning algorithms.

The machine learning module 60 is responsible for the following:

Collection of information from the system feedback module 58.

Making predictions using machine learning algorithms.

Sending predictions to the system analysis and control module 62, and associated higher level coordinators where applicable.

The machine learning module 60 will contain numerous machine learning algorithms, including, but not limited to the following.

1. Current sensible heating/cooling load prediction algorithm. This algorithm will predict the current sensible heating or cooling load in Btu/hr for the zone. Data inputs used may include, but not be limited to the following: zone temperature setpoint, zone temperature, zone relative humidity setpoint, zone relative humidity, daylighting, total lighting heat output, outdoor air temperature, outdoor air dew point, outdoor air wind speed, outdoor air wind direction, current motorized shade position, current number of occupants, and current plug load. Initially, a data set produced using a load simulation software will be used to train a machine learning algorithm. This will be referred to as a "pre-trained algorithm." Upon implementation, the agent 36 will build a new data set using real operational data to train a new machine learning algorithm which will be referred to as an "operational algorithm." The feedback used to train the operational algorithm will be zone temperature drift after a specified period. The agent 36 will continue to use the pre-trained algorithm until the operational algorithm has achieved a specified level of accuracy—at which point the transition will occur. If the operational algorithm data should become inaccurate, the agent 36 will revert to the pre-trained algorithm. For example, if SMITHGROUPAI 10 is implemented during a period of warm weather, the operational algorithm may become accurate enough to take over from the pre-trained algorithm within one to two months. However, the temperature may drop after several months at which point the algorithm may become inaccurate due to not having accrued enough training data for periods of cold weather. Should this occur, the agent 36 may revert to using the pre-trained algorithm, until such a time that the operational algorithm has built up enough training data and achieved the specified level of accuracy. Note that the data sets for the pre-trained algorithm, and operational algorithm will never be mixed—this transition type will be referred to as a "hand-off transition."

2. Current latent dehumidification/humidification load prediction algorithm: this algorithm will predict the current latent dehumidification/humidification load in Btu/hr for the zone. Data inputs used may include, but not be limited to the following: zone relative humidity setpoint, zone relative humidity, outdoor air dew point, outdoor air wind speed, outdoor air wind direction, current number of occupants, and current plug load. Initially, a data set produced using load simulation software will be used to train a machine learning algorithm. This will be referred to as a "pre-trained algorithm." Upon implementation, the agent 36 will build a new data set using real operational data to train a new machine learning algorithm that will be referred to as the "operational algorithm." The feedback used to train the operational algorithm will be zone relative humidity drift after a period of time. The transition from the pre-trained algorithm to the operational algorithm shall be a hand-off transition. Refer to machine learning algorithm one for additional information.

3. Future sensible heating/cooling load prediction algorithm. This algorithm will predict future sensible heating/cooling load in Btu/hr for the zone. Data inputs used may include, but not be limited to the following: predicted zone temperature setpoint, predicted number of occupants, predicted total lighting heat output, predicted plug load, future outdoor air temperature (via API), future outdoor air wind speed (via API), future outdoor air wind direction (via API), future solar azimuth (via API), future solar altitude (via API), future cloud cover (via API), and predicted motorized shade position. Initially, a data set produced using load simulation software will be used to train a machine learning algorithm. This will be referred to as a "pre-trained algorithm." Upon implementation, the agent 36 will build a new data set using real operational data to train a new machine learning algorithm which will be referred to as the "operational algorithm." The feedback used to train the operational algorithm will be the actual cooling load. This process represents an indirect feedback loop in which each prediction the algorithm makes will not necessarily receive feedback. For example, if the operational algorithm predicts that a zone cooling load will be 10,000 Btu/hr in five hours based on the forecasted weather data in which total cloud cover is expected, but in five hours' time, the cloud cover is minimal, the prediction will be inaccurate. However, the cause of the inaccuracy was the uncertainty of the weather forecast rather than an issue with the algorithm. For this reason, the algorithm will monitor real time cooling load and the data inputs described above that occur simultaneous to the real time cooling load to build the data set. The transition from the pre-trained algorithm to the operational algorithm will be a hand-off transition. Refer to machine learning algorithm one for additional information.
4. Future latent dehumidification/humidification load prediction algorithm. This algorithm will predict the future latent dehumidification/humidification load in Btu/hr for the zone. Data inputs used may include, but not be limited to the following: predicted zone relative humidity setpoint, predicted number of occupants, future outdoor air dew point (via API), future outdoor air wind speed (via API), future outdoor air wind direction, and predicted plug load. Initially, a data set produced using load simulation software will be used to train a machine learning algorithm. This will be referred to as a "pre-trained algorithm." Upon implementation, the agent 36 will build a new data set using real operational data to train a new machine learning algorithm that will be referred to as the "operational algorithm." The feedback used to train the operational algorithm will be the actual latent dehumidification/humidification load. This process represents an indirect feedback loop. Refer to machine learning algorithm three for additional information on feedback. The transition from pre-trained algorithm to the operational algorithm will be a hand-off transition. Refer to machine learning algorithm one for additional information.
5. Future temperature setpoint prediction algorithm. This algorithm will predict the future temperature setpoint for any given time. Data inputs used may include, but not be limited to the following: day of the week, day type (holiday/non-holiday), and time. Initially, a setpoint schedule will be produced to train a machine learning algorithm. This will be referred to as a "pre-trained algorithm." Upon implementation, the agent 36 will build a new data set using real operational data to train a new machine learning algorithm that will be referred to as the "operational algorithm." The feedback used to train the operational algorithm will be actual setpoint data. A complete transition from the pre-trained algorithm to the operational algorithm will take place after a specified period. Both the pre-trained and operational algorithm may be overridden by user intervention or in coordination with a room scheduling platform.
6. Future relative humidity setpoint prediction algorithm. This algorithm will predict the future relative humidity setpoint for any given time. Data inputs used may include, but not be limited to the following: day of the week, day type (e.g. holiday/non-holiday), and time. Initially, a setpoint schedule will be produced to train a machine learning algorithm. This will be referred to as a "pre-trained algorithm." Upon implementation, the agent will build a new data set using real operational data to train a new machine learning algorithm that will be referred to as the "operational algorithm." The feedback used to train the operational algorithm will be actual setpoint data. A complete transition from the pre-trained algorithm to the operational algorithm will take place after a specified period. Both the pre-trained and operational algorithm may be overridden by user intervention or in coordination with a room scheduling platform.
7. Predicted number of occupants algorithm. This algorithm will predict the future number of occupants for any given time. Data inputs used may include, but not be limited to the following: day of the week, day type (e.g. holiday/non-holiday), and time. Initially, a setpoint schedule will be produced to train a machine learning algorithm. This will be referred to as a "pre-trained algorithm." Upon implementation, the agent 36 will build a new data set using real operational data to train a new machine learning algorithm that will be referred to as the "operational algorithm." The feedback used to train the operational algorithm will be actual number of occupants as sensed by a people counter or as calculated using room $CO_2$ levels. A complete transition from the pre-trained algorithm to the operational algorithm will take place after a specified period. Both the pre-trained and operational algorithm may be overridden by user intervention or in coordination with a room scheduling platform.
8. Predicted plug load. This algorithm will predict the future plug load for any given time. Data inputs used may include, but not be limited to the following: day of the week, day type (e.g. holiday/non-holiday), predicted number of occupants, and time. Initially, a setpoint schedule will be produced to train a machine learning algorithm. This will be referred to as a "pre-trained algorithm." Upon implementation, the agent 36 will build a new data set using real operational data to train a new machine learning algorithm that will be referred to as the "operational algorithm." The feedback used to train the operational algorithm will be the actual plug load as sensed by the meter on the associated receptacle circuit. The transition from the pre-trained algorithm to the operational algorithm will be a hand-off transition. Refer to machine learning algorithm one for additional information.
9. Future perimeter zone lighting control signal. This algorithm will predict the future lighting control signal for the exterior lighting control zone within a zone for any given time. Data inputs used may include, but not be limited to the following: predicted number of occupants, future solar azimuth, future solar altitude, future cloud cover, and future motorized shade position. Each lighting circuit will be sub metered. Upon building start up, the scenario generator module 64 in combination with the system analysis and control module 62 will turn off all but one lighting zone at a time and modulate from minimum to maximum a lighting control signal while the system feedback module 58 records the metered wattage associated with each lighting control signal. Therefore, the predicted perimeter zone lighting control signal can be used to predict exterior zone lighting heat output in Btu/hr. The process described above also applies to the middle, and interior lighting control zones.
10. Future middle zone lighting control signal. This algorithm will predict the future lighting control signal for the middle lighting control zone within a zone for any given time. Refer to machine learning algorithm nine for additional information.
11. Future interior zone lighting control signal. This algorithm will predict the future lighting control signal for the interior lighting control zone within a zone for any given time. Refer to machine learning algorithm nine for additional information.
12. Future total lighting heat output: this algorithm will predict the total lighting heat output for any given time. Data inputs may include but not be limited to the following: future perimeter zone lighting control signal, future middle zone lighting control signal, interior zone lighting control signal. Initially, a data set produced using load simulation software will be produced to train a machine learning algorithm. This will be referred to as a "pre-trained algorithm." Upon implementation, the agent 36 will build a new data set using real operational data to train a new machine learning algorithm that will be referred to as the "operational algorithm." The feedback used to train the operational algorithm will be the actual lighting control signals. This process represents an indirect feedback loop. Refer to machine learning algorithm three for additional information on feedback. The transition from the pre-trained algorithm to the operational algorithm will be a hand-off transition. Refer to machine learning algorithm one for additional information.

13. Predicted change in temperature rate. This algorithm will predict the rate at which the temperature in the zone will change. Data inputs used may include, but not be limited to airflow (CFM), and a differential between predicted zone load (Btu/hr) and the heating/cooling provided to the zone (Btu/hr). Initially, a data set produced using mathematical formulas and the volume of the space will be produced to train a machine learning algorithm. This will be referred to as a "pre-trained algorithm." Upon implementation, the agent will build a new data set using real operational data to train a new machine learning algorithm that will be referred to as the "operational algorithm." The feedback used to train the operational algorithm will be the actual change in temperature rate. The scenario generator module 64, in combination with the system analysis and control module 62 will be responsible for changing the airflow and Btu/hr offset to the space during unoccupied periods to build the training set for the operational algorithm. The transition from the pre-trained algorithm to the operational algorithm will be a hand-off transition. Refer to machine learning algorithm one for additional information.

14. Predicted change in relative humidity rate. This algorithm will predict the rate at which the relative humidity in the zone will change. Data inputs used may include, but not be limited to airflow (CFM), and a differential between predicted zone load (Btu/hr) and the dehumidification/humidification provided to the zone (Btu/hr). Initially, a data set produced using mathematical formulas and the volume of the space will be produced to train a machine learning algorithm. This will be referred to as a "pre-trained algorithm." Upon implementation, the agent will build a new data set using real operational data to train a new machine learning algorithm that will be referred to as the "operational algorithm." The feedback used to train the operational algorithm will be the actual change in relative humidity rate. The scenario generator module 64, in combination with the system analysis and control module 62 will be responsible for changing the airflow and Btu/hr offset to the space during unoccupied periods to build the training set for the operational algorithm. The transition from pre-trained algorithm to the operational algorithm will be a hand-off transition. Refer to machine learning algorithm one for additional information.

15. Hydronic coil characteristics. This algorithm will predict the leaving water temperature, and flow rate. Data inputs used may include, but not be limited to airflow, entering water temperature, entering air temperature, and leaving air temperature. Initially, a data set produced by mapping coil characteristics using manufacturer's data will be used to train a machine learning algorithm. This will be referred to as a "pre-trained algorithm." Upon implementation, the agent will build a new data set using real operational data to train a new machine learning algorithm that will be referred to as the "operational algorithm." The feedback used to train the operational algorithm will be the actual leaving water temperature and flow rate. The transition from the pre-trained algorithm to the operational algorithm will be a hand-off transition. Refer to machine learning algorithm one for additional information.

16. Energy consumption. This algorithm will predict the terminal unit energy consumption for various operating scenarios. Data inputs used may include, but not be limited to the following: primary airflow (CFM) and fan airflow (CFM). Initially, a data set produced using manufacturer's data will be used to train a machine learning algorithm. This will be referred to as a "pre-trained algorithm." Upon implementation, the agent will build a new data set using real operational data to train a new machine learning algorithm that will be referred to as the "operational algorithm." The feedback used to train the operational algorithm will be the actual terminal unit energy consumption. The transition from the pre-trained algorithm to the operational algorithm will be a hand-off transition. Refer to machine learning algorithm one for additional information.

17. Airflow algorithm. This algorithm will determine the amount of airflow the zone will receive for each potential entering air temperature. Data inputs used may include, but not be limited to the following: zone heating/cooling load, zone humidification/dehumidification load, entering air temperature, entering air dew point, number of occupants, zone $CO_2$ concentration, zone VOC concentration, zone airborne particulate concentration, and air handling unit system ventilation efficiency. The algorithm will produce a single airflow value for each potential entering air temperature. Initially, a data set produced using load simulation software will be used to train a machine learning algorithm. This will be referred to as a "pre-trained algorithm." Upon implementation, the agent 36 will build a new data set using real operational data to train a new machine learning algorithm that will be referred to as the "operational algorithm." The feedback used to train the operational algorithm will be zone relative humidity drift after a period. The transition from the pre-trained algorithm to the operational algorithm shall be a hand-off transition. Refer to machine learning algorithm one for additional information. The algorithm will be constrained by high and low limits—referred to as laws which can be reset through user intervention or by direction from SMITHGROUP-AI 10, the SCENARIO GENERATOR module 64, and the system analysis and control module 62.

18. Predicted zone receptacle power consumption. This algorithm will predict the total zone receptacle power consumption for any given time. The purpose of this algorithm is to predict the energy consumption of various equipment such as kitchen appliances, computers, data servers, etc. Data inputs used may include, but not be limited to the following: number of occupants, time, day of week, and day type (e.g. holiday or non-holiday). Initially, a data set produced using load simulation software will be used to train a machine learning algorithm. This will be referred to as a "pre-trained algorithm." Upon implementation, the agent 36 will build a new data set using real operational data to train a new machine learning algorithm that will be referred to as the "operational algorithm." The feedback used to train the operational algorithm will be actual zone receptacle power consumption as measured by the meter on the associated receptacle circuit. The transition from the pre-trained algorithm to the operational algorithm shall be a hand-off transition. Refer to machine learning algorithm one for additional information.

Various algorithms described above can be limited to a specific range using lower, and higher limit laws.

The machine learning algorithm outputs will form a data set of potential operating scenarios which will be shared with the AHU system coordinators 20, 22, chilled water system coordinator 16, condenser water system coordinator 12, heating hot water system coordinator 18, and power system coordinator 14, where applicable. For example, if a zone agent 36 is responsible for the control of a chilled water fan coil unit, the zone agent 36 will send data sets to the appropriate one of the AHU system coordinators 20, 22, and chilled water system coordinator 16; if the zone agent 36 is responsible for the control of a VAV box with a heating hot water reheat coil, the zone agent 36 will send data to the appropriate one of the AHU system coordinators 20, 22 and the heating hot water system coordinator 18.

In addition to the algorithms described above, zones which feature frequent dry bulb temperature/dew point temperature setpoint changes will include the following algorithms. The algorithms below can be used in combination with scheduled/predicted future setpoints.

19. Temperature setpoint change. this algorithm will predict the amount of time required to heat or cool a zone between two temperature setpoints. Data inputs may include, but not be limited to the following: initial setpoint, final setpoint, airflow (CFM), current sensible heating/cooling load, future sensible heating/cooling load, number of occupants, and discharge air temperature. Initially, a data set produced using mathematical formulas (e.g. HVAC formulas, differential equations etc.) and the volume of the room will be used to train a machine learning algorithm. This will be referred to as a "pre-trained algorithm." Upon implementation, the agent 36 will build a new data set using real operational data to train a new machine learning algorithm which will be referred to as the "operational algorithm." The feedback used to train the operational algorithm will be the actual amount of time required to heat or cool the zone from the initial or final temperature. The scenario generator module 64, in combination with the system analysis and control module 62 will be responsible for running test scenarios where the temperature setpoint is changed during unoccupied periods. The tests will be conducted using various airflows and discharge air temperatures to build the operational algorithm's data set. Once the operational algorithm is implemented, the scenario generator module 64 in combination with SMITHGROUP-AI 10 and the system analysis and control module 62 will calculate various scenarios for heating/cooling the room from the initial to final setpoint and determine which method is most economical. For example, consider a room scheduled or predicted to be occupied from 8:00 AM to 9:30 AM with a setpoint of 80° F., scheduled or predicted to be unoccupied from 9:30 AM to 10:00 AM, and scheduled or predicted to be occupied from 10:00 AM to 11:00 AM with a setpoint of 60° F. Therefore, the system will have 30 minutes to cool the room from 80° F. to 60° F. The scenario generator module 64 in combination with SMITHGROUP-AI 10 and the system analysis and control module 62 will evaluate whether it is more economical to cool the room slowly over a longer period of time (up to 30 minutes) or quickly over a short period of time—and when that short period of time should be—for example, if the cloud cover is expected to clear at 9:45 AM—thus increasing the cooling loads and energy associated with meeting the loads—then it may be more energy or energy cost efficient to cool the room quickly between 9:30 AM and 9:45 AM, then maintain the temperature for the following 15 minutes. The transition from the pre-trained algorithm to the operational algorithm shall be a hand-off transition. Refer to machine learning algorithm one for additional information. The strategies described above also apply to machine learning algorithm twenty.

20. Dew point temperature setpoint change. This algorithm will predict the amount of time required to heat or cool a zone between two dew point temperature setpoints. Note that dew point is used as opposed to relative humidity as the dew point setpoint change will often coincide with a dry bulb temperature change. Data inputs may include, but not be limited to the following: initial setpoint, final setpoint, airflow (CFM), current latent dehumidification/humidification load, future latent dehumidification/humidification load, number of occupants, and entering air dew point temperature. Initially, a data set produced using mathematical formulas and the volume of the room will be used to train a machine learning algorithm. This will be referred to as a "pre-trained algorithm." Upon implementation, the agent 36 will build a new data set using real operational data to train a new machine learning algorithm which will be referred to as the "operational algorithm." The feedback used to train the operational algorithm will be the actual amount of time required to humidity or dehumidify the zone from the initial or final dew point temperature. Refer to machine learning algorithm nineteen for additional information. The transition from the pre-trained algorithm to the operational algorithm shall be a hand-off transition. Refer to machine learning algorithm one for additional information.

The system analysis and control module 62 is responsible for the following:

Monitoring and control of all sensors 38, 40, 42, 44 and actuators 50, 52, 54, 56 related to the zone agent 36.

Analyzing the data from each sensor and actuator. For example, the system analysis and control module 62 may determine that due to a flex duct being kinked, higher end airflow values can no longer be provided, and update the high limit airflow law for the airflow algorithm.

Sending the valid system scenarios to the machine learning module 60 for predictions.

Sending commands to the various zone effectors 50, 52, 54, 56. The commands could be valve position, lighting control signal, damper position, or shade position.

Analyzing the scenarios proposed by the scenario generator module 64. For example, if SMITHGROUP-AI 10 determines that the zone in question is considered critical (e.g. is the zone preventing the HVAC system from operating at a more energy efficient condition), then the scenario generator 64 shall create scenarios to be analyzed by the system analysis and control module 62 such as relaxing the temperature or relative humidity set point or lowering the motorized shades. The system analysis and control module 62 shall evaluate the created options and determine if they are acceptable based on the current zone occupant number, and the zone importance factor: a numerical value between 0-10 indicating how important space temperature and lighting levels are. For zones with high importance factors such as main conference rooms etc., the system analysis and control module 62 may determine that certain scenarios such as relaxing temperature setpoints are not acceptable. If determined to be acceptable, the system analysis and control module 62 will send the scenario to the machine learning module 60 for predictions.

The scenario generator module 64 is responsible for receiving data from SMITHGROUP-AI 10, via its associated system coordinator, and generating new operating scenarios for the zone in response. For example, SMITHGROUP-AI 10 may determine that the zone is the most critical from a ventilation standpoint. In response, the scenario generator module 64 may request that the system analysis and control module 62 raise the airflow algorithm minimum airflow law to provide more airflow to the zone.

3. Sample Process

Refer to AHU System, chilled water system, and heating hot water system for examples of the data sets produced by the zone agent 36 and how they are used.

C. Power and Lighting Systems

1. General Description

Considering a power monitoring and controls system, the electricity consumption of each zone circuit within the lighting panelboard and within the power panelboard is monitored via a dedicated meter. Further, the power for each zone circuit within the lighting panelboard and within the power panelboard may be turned on and off via the dedicated circuit breaker. All sensors and actuators are connected directly to the network, without the use of proprietary controllers that operate with programmed sequences of operation. In some instances, an open source non-proprietary input/output module or a gateway may be required to convert the signal from a sensor or an actuator such that it can be communicated via open source networks such as BACnet, LONworks, Modbus, etc.

Considering a renewable energy power monitoring and controls system, the controls of the wind turbines and of the solar panels are done through the manufacturer provided proprietary control panels. The control panels are connected to the network through integration via open source non-proprietary input/output modules or gateways. In some instances, the sensors and actuator associated with the wind turbine controls systems and solar panel controls systems may be connected directly to the network thru non-proprietary input/output modules or gateways.

Figure 4:
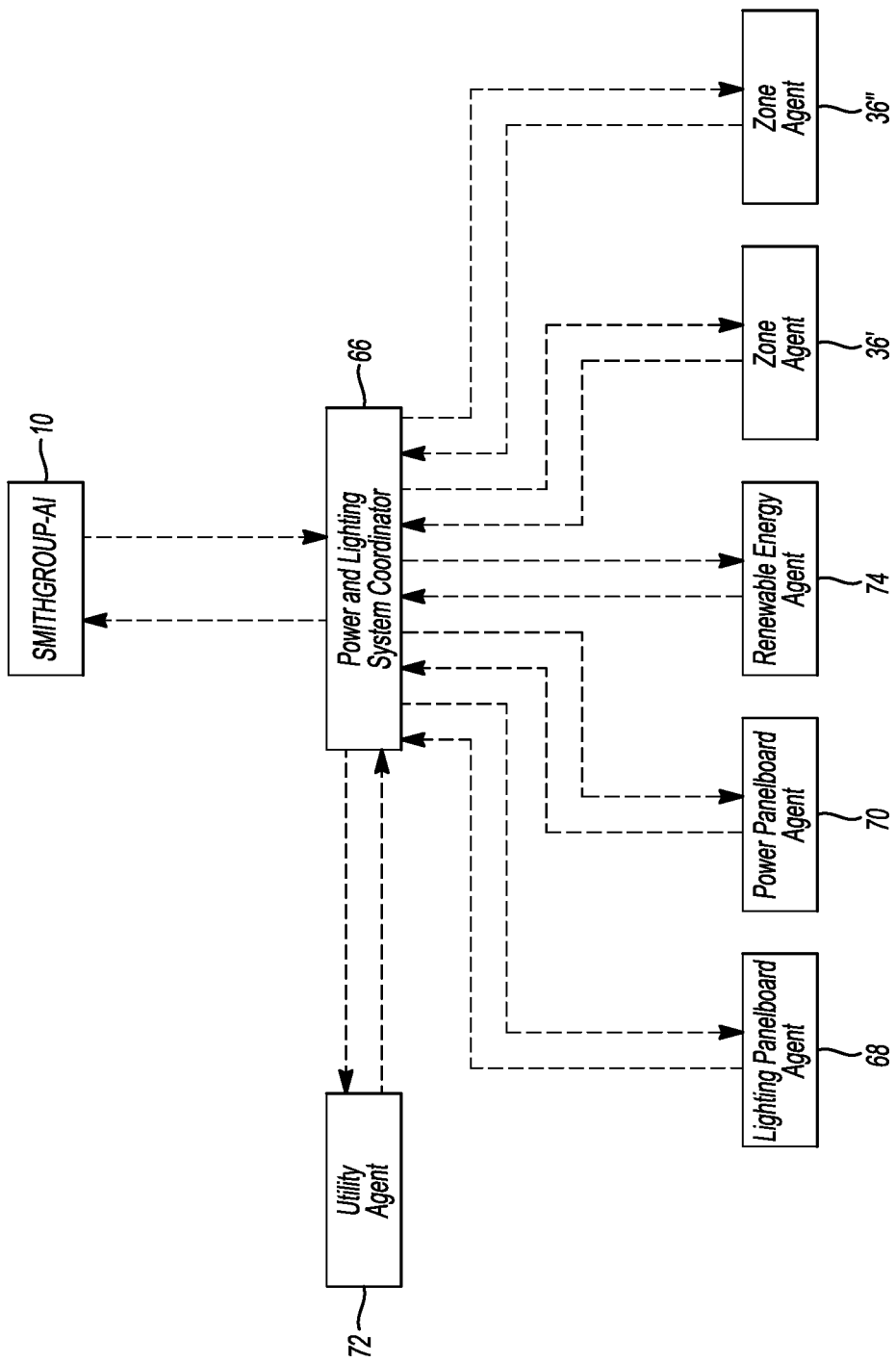
FIG. 4 shows the communication architecture between the various agents and coordinators.

The control of the entire power system is performed through a series of independent software agents such as the power and lighting system coordinator 66, lighting and power panelboard agents 68, 70, utility agent 72, renewable energy agent 74, and zone agents 36', 36". The communication architecture between the various agents and coordinators is shown in FIG. 4.

2. Power and Lighting System Coordinator a. Purpose

The power and lighting system coordinator 66 is an independent software agent that monitors and controls all agents associated with the power and lighting control systems. Further, the power and lighting system coordinator 66 is responsible for the following:

Prediction of the energy use of all building systems.
Prediction of the energy generation from the renewable systems.
Communication with SMITHGROUP-AI 10: sends overall power use and power available predictions and receives commands from SMITHGROUP-AI 10.
Communication with the panelboard agents 68, 70: requests power use predictions and status from the panel agents 68, 70.
Communication with the renewable energy agent 74: request power available predictions and status from the renewable energy agent 74.
Communication with the zone agents 36', 36": receives commands and feedback from the zone agents 36', 36".
Communication with the utility agent 72: receives utility status (e.g. loss of power).

b. Internal Structure

Figure 5:
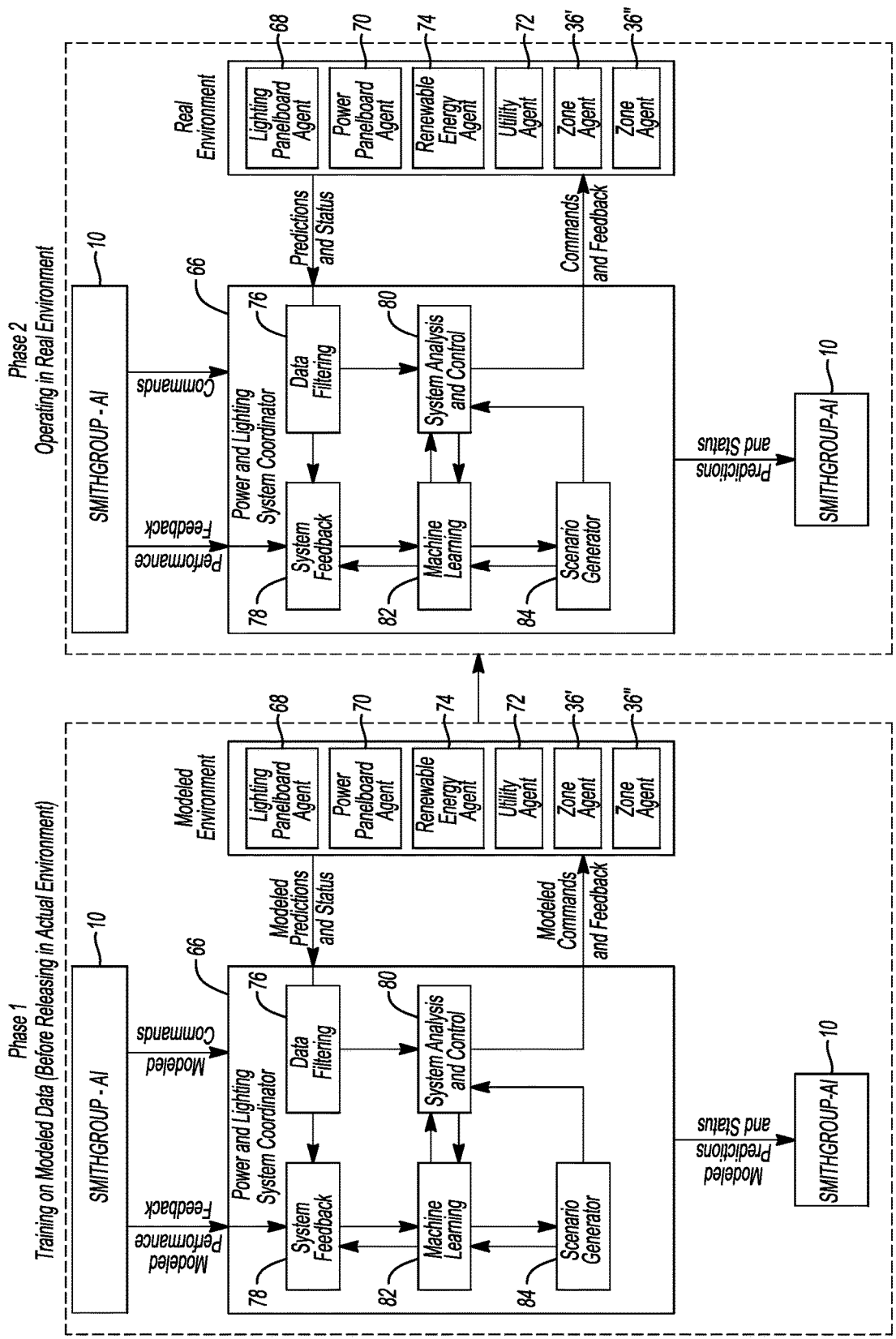
FIG. 5 shows the internal structure of the power and lighting system coordinator and its related environment.

Referring to FIG. 5, the internal structure of the power and lighting system coordinator 66 and its related environment is shown. The environment for the lighting and power system coordinator 66 is comprised of all the agents that it monitors and controls. The agent is comprised of five modules, each with its own dedicated algorithms and controls logic.

The data filtering module 76 is responsible for separating the data received from the various agents 36', 36", 68, 70, 72, 74. For example, the actual agent power consumption levels will be sent to the system feedback module 78, while predictions from the agents 36', 36", 68, 70, 72, 74 will be sent to the system analysis and control module 80.

The system feedback module 78 is responsible for the following:

Collection of information from the zone agents 36', 36", panelboard agents 68, 70, utility agent 72, and renewable energy agent 74; the information may represent status (e.g. failed, maintenance) or predictions related to the energy that may be generated by the renewable energy agent 74. A failed status may indicate that an agent may no longer control its environment and should be excluded from the overall power system predictions that the machine learning module 82 is making. A maintenance status may indicate that an agent has entered or may enter into a maintenance mode and that the machine learning module 82 needs to update its overall power system predictions accordingly.
Analysis of predictions related to the total power system consumption. The actual meter data from the various agents 36', 36", 68, 70, 72, 74 will be compared against their own predictions and against the predictions made by the machine learning module 82. Any large discrepancies between the predicted and actual power usage could mean that the previous command that one of the zone agents 36', 36" or the renewable energy agent 74 received from the power coordinator 66 has placed one of the zone agents 36', 36" or the renewable energy agent 74 in conflict with its own internal laws (e.g. not able to meet the various power requirements). This could indicate that the difference in the error or accuracy of the predictions made by the machine learning module 82 and the actual outcome might have exceeded critical limits, which in turn has affected the overall performance of the renewable energy system. The system feedback module 78 will then send the actual meter data to the machine learning module 82 such that the machine learning module 82 can update its internal learning algorithms.

Collection of information from SMITHGROUP-AI 10. The information may represent commands that need to be distributed to the various associated agents 36', 36", 68, 70, 72, 74. The information may also represent feedback regarding the predictions that the lighting and power system coordinator 66 has made; for example, the predicted energy performance of the scenario that SMITHGROUP-AI 10 has directed the lighting and power system coordinator 66 to implement is significantly different that the real outcome. As such the system feedback module 78 will pass this feedback to the machine learning module 82 to update its machine learning algorithms accordingly such that the accuracy or error of its predictions self-improve.

Collection of information from the utility agent 72. The information may represent status of the available utility power. For example, should the building experience a loss of power, the lighting and power system coordinator 66 will need to notify SMITHGROUP-AI 10 of such condition. SMITHGROUP-AI 10 may then direct all system coordinators to operate under an emergency power mode until the utility agent 72 notifies that utility power is available.

The machine learning module 82 is responsible for the following:

Collection of information from the system feedback module 78. The type of information that this module will collect is described under the system feedback module 78.

Collection of information from the system analysis and control module 80. This information may represent predictions from the various agents 36', 36", 68, 70, 72, 74 regarding available power or used power.

Making predictions, using machine learning algorithms, based on the data received from the system analysis and control module 80, for the overall energy consumption of the entire system or for the total energy that the renewable power agent 74 may need to deliver or can deliver.

Sending the predictions to the system analysis and control module 80 and to the scenario generator module 84.

The system analysis and control 80 module is responsible for the following:

Monitoring and control of all the agents 36', 36", 68, 70, 72, 74 associated with the power and lighting system coordinator 66.

Collection of information from the data filtering module 76. The type of information that this module will collect is described under the data filtering module 76.

Analyzing the data from each agent, and filtering and compiling the data into valid system scenarios.

Sending the valid system scenarios to the machine learning module 82 for predictions.

Receiving the predictions from the machine learning module 82 and sending commands to the various agents 36', 36", 68, 70, 72, 74. The commands that the system analysis and control module 80 may send to the agents 36', 36", 68, 70, 72, 74 could be battery storage setpoints, energy use setpoints, requests for predictions, or switching on and off various circuits within the lighting and power panelboards 68, 70.

Analyzing the scenarios proposed by the scenario generator module 84. For each scenario received, the system analysis and control module 80 may decide to direct the various agents 36', 36", 68, 70, 72, 74 to make predictions and then compile these predictions into valid system scenarios for the machine learning module 82 to make predictions on.

The scenario generator module 84 is responsible for continuously looking for ways to improve the overall energy performance of the entire power distribution system. For example, the scenario generator module 84 may create a series of scenarios which will then be sent to the system analysis and control module 80 to analyze and validate; the system analysis and control module 80 may ask the agents 36', 36", 68, 70, 72, 74 to make predictions on the scenarios. Once the scenarios are validated, they may be sent to the machine learning module 82 to make predictions on. The predictions made by the machine learning module 82 will then be sent back to the scenario generator module 84 for analysis. After analyzing the predictions, the scenario generator module 84 may decide to send such predictions to SMITHGROUP-AI 10, which in turn may direct the power and lighting system coordinator 66 to implement one of the scenarios created by the scenario generator module 84.

The scenario generator module 84 may create scenarios by modelling the renewable energy agent 74 as delivering various power and by modelling the zone agents 36', 36" as satisfying their zone power conditions under various conditions.

3. Panelboard Agents a. Purpose

A panelboard agent is an independent software agent that monitor and controls all sensors and actuators associated with a panelboard (e.g. lighting panelboard, power panelboard etc.). Each panelboard within the power distribution system is monitored and controlled by a dedicated panelboard agent 68, 70.

The panelboard agents 68, 70 are responsible for the following:

Prediction of the energy use of each zone. The panelboard agents 68, 70 will communicate, via the power and lighting system coordinator 66, with each zone such that its predictions are coordinated and validated based on the specific zone data and predictions.

Prediction of the energy use of the entire panelboard.

Communication with the power and lighting system coordinator 66. Sends panelboard energy use predictions (for the entire panelboard and for each zone) and receives commands from the power and lighting system coordinator 66.

b. Internal Structure

Figure 6:
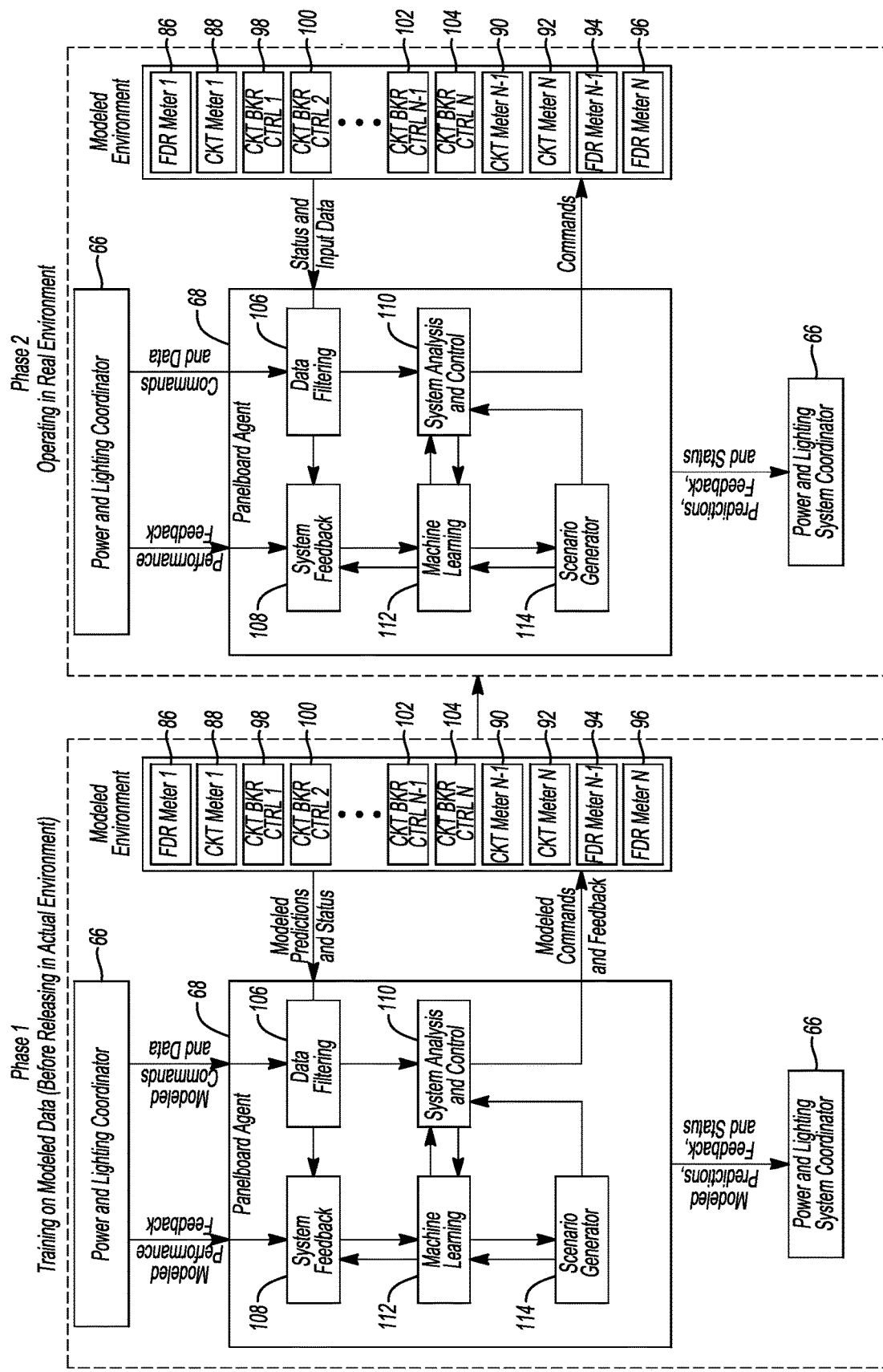
FIG. 6 shows the internal structure of the panelboard agent and its related environment.

Referring to FIG. 6, the internal structure of a panelboard agent 68 and its related environment is shown. The environment for the panelboard agent 68 is comprised of all the sensors 86, 88, 90, 92, 94, 96 and actuators 98, 100, 102, 104 that are located within a panelboard. In some instances, an open source non-proprietary input/output module or a gateway may be required to convert the signal from a sensor or an actuator such that it can be communicated via open source networks such as BACnet, LONworks, Modbus etc. The agent 68 is comprised of five modules, each with its own dedicated algorithms and controls logic.

The data filtering module 106 is responsible for separating the data received from sensors 86, 88, 90, 92, 94, 96 and actuators 98, 100, 102, 104. For example, the actual energy consumption levels of each circuit may be sent to the system feedback module 108, while data (e.g. sensor or actuator status, etc.) will be sent to the system analysis and control module 110. Further, zone data (e.g. predictions) received from the power and lighting system coordinator 66 may be sent to the system analysis and control module 110. The data filtering module 106 may also send to the system analysis and control module 110 the same data that was sent to the system feedback module 108. A sensor within the panelboard may represent an electricity meter or a status signal from a circuit breaker. An actuator within the panelboard may represent a circuit breaker that can be commanded on or off.

The system feedback module 108 is responsible for the following:

- Collection of information from the various sensors 86, 88, 90, 92, 94, 96 and actuators 98, 100, 102, 104. The type of information that the system feedback module 108 may collect is described in the data filtering module 106.
- Analysis of predictions related to the energy level consumption levels for each zone. The data received from the various sensors 86, 88, 90, 92, 94, 96 and actuators 98, 100, 102, 104 will be compared against the predictions made by the machine learning module 112. Any large discrepancies between the predicted and measured values could mean that the previous commands could indicate that the difference in the error or accuracy of the predictions made by the machine learning module 112 and the actual outcome might have exceeded critical limits, which in turn has affected the performance of the power system. The system feedback module 108 will then send the measured values to the machine learning module 112 such that the machine learning module 112 can update its internal learning algorithms.
- Collection of information from the power and lighting system coordinator 66. The information may represent feedback regarding the predictions that the panelboard agent 68 has made.

The machine learning module 112 is responsible for the following:

- Collection of information from the system feedback module 108. The type of information that this module will collect is described under the system feedback module 108.
- Collection of information from the system analysis and control module 110. This information may represent data from the various sensors 86, 88, 90, 92, 94, 96 and actuators 98, 100, 102, 104, such as airflows and associated temperatures.
- Making predictions, using machine learning algorithms, based on the data received from the system analysis and control module 110 or from the system feedback module 108.
- Sending the predictions to the system analysis and control module 110 and to the scenario generator module 114.

The system analysis and control module 110 is responsible for the following:

- Monitoring and control of all sensors 86, 88, 90, 92, 94, 96 and actuators 98, 100, 102, 104 related to the panelboard. Control of actuators 98, 100, 102, 104 may represent switching on and off a circuit breaker, and thus power, associated with a specific zone agent. For example, a zone agent may predict that the power to the "switched" receptacles can be turned off at a specific time. The zone agent may communicate this event to the power and lighting system coordinator 66, which in turn may direct the panelboard agent 68 to switch off the associated circuit breaker.
- Collection of information from the data filtering module 106. The type of information that this module will collect is described under the data filtering module 106.
- Analyzing the data from each sensor and actuator. For example, the system analysis and control module 110 may determine that a zone is consuming significantly more energy than what was predicted (by both the machine learning module of the zone agent and by the machine learning module 112 of the panelboard agent 68). As such, the system analysis and control module 110 may ask that specific zone agent, via the power and lighting system coordinator 66, to verify the accuracy of its sensors and predictions.
- Analyzing the scenarios proposed by the scenario generator module 114. For each scenario received, the system analysis and control module 110 will analyze the status of the sensors 86, 88, 90, 92, 94, 96 and actuators 98, 100, 102, 104 and will determine which scenario is valid. For example, one of the scenarios that the scenario generator module 114 may generate will require some of the zones to consume 15% less energy than usual. The system analysis and control module 110 may determine, after communication with the associated zone agents (via the power and lighting system coordinator 66), that such scenario is no longer valid and that the machine learning module 112 will not make a prediction on the referenced scenario.

The scenario generator module 114 is responsible for continuously looking for ways/scenarios to improve the overall energy performance of the power systems associated with it. For example, the scenario generator module 114 may create a series of scenarios that will then be sent to the system analysis and control module 110 to analyze and validate. Once the scenarios are validated, they may be sent to the various zone agents (for analysis and predictions), via the power and lighting system coordinator 66, or to the machine learning module 112 to make its own predictions. The predictions made by the machine learning module 112 will then be sent back to the scenario generator module 114 for analysis. After analyzing the predictions, the scenario generator module 114 may decide to send such predictions to the power and lighting system coordinator 66, which may send them to SMITHGROUP-AI 10, which in turn may direct the power and lighting system coordinator 66 to implement one of the scenarios created by the scenario generator module 66.

The scenario generator module 114 may create scenarios by turning on and off various receptacle, lighting, and equipment circuits at a certain time. Each such scenario will have an impact on the energy performance of the power system and on the heating and cooling loads within a zone.

4. Renewable Energy Agent a. Purpose

The renewable energy agent 74 is an independent software agent that monitors and controls all renewable energy systems connected to the power distribution system. The control of wind turbines and solar panels, for example, is done through the manufacturer provided proprietary control panels. The control panels are connected to the network thru integration via open source non-proprietary input/output modules or gateways. In some instances, the sensors and actuator associated with the wind turbine control systems and solar panel control systems may be connected directly to the network through non-proprietary input/output modules or gateways.

The sensors that the renewable energy agent 74 may monitor are battery levels, status of solar panels, status of windmills, weather data, etc. The actuators that the renewable energy agent 74 may control are turning on/off the renewable energy systems, various circuit breakers located in the distribution panel, etc.

The renewable energy agent 74 is responsible for the following:

Prediction of the energy generation from the renewable systems.

Communication with the power and lighting system coordinator 66. It sends energy generation predictions and receives commands from the power and lighting system coordinator 66.

b. Internal Structure

Figure 7:
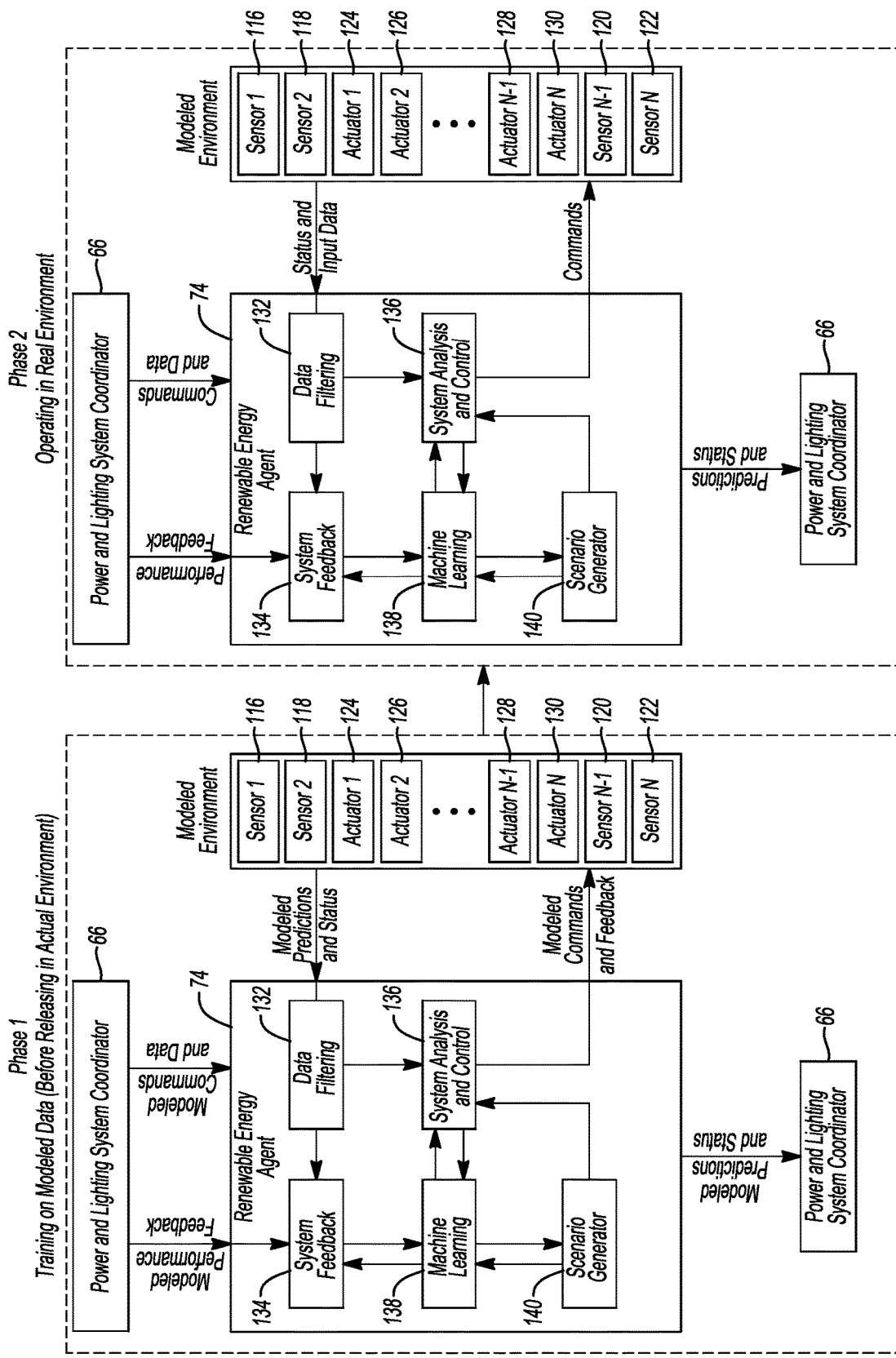
FIG. 7 shows the internal structure of the renewable energy agent and its related environment.

Referring to FIG. 7, the internal structure of the renewable energy agent 74 and its related environment is shown. The environment for the renewable energy agent 74 is comprised of all the sensors 116, 118, 120, 122, actuators 124, 126, 128, 130, and renewable energy systems. The agent 74 is comprised of five modules, each with its own dedicated algorithms and control logic.

The data filtering module 132 is responsible for separating the data received from sensors 116, 118, 120, 122 and actuators 124, 126, 128, 130. For example, the amount of stored or generated data will be sent to the system feedback module 134, while data from other various sensors (e.g. alarms, battery levels etc.) will be sent to the system analysis and control module 136. The data filtering module 132 may also send to the system analysis and control module 136 the same data that was sent to the system feedback module 134.

The system feedback module 134 is responsible for the following:

Collection of information from the various sensors 116, 118, 120, 122 and actuators 124, 126, 128, 130. The type of information that the system feedback module 134 may collect is described in the data filtering module 132.

Analysis of predictions related to the energy generated or stored. The data received from the various sensors 116, 118, 120, 122 and actuators 124, 126, 128, 130 will be compared against the predictions made by the machine learning module 138. Any large discrepancies between the predicted and measured values could mean that the previous commands could indicate that the difference in the error or accuracy of the predictions made by the machine learning module 138 and the actual outcome might have exceeded critical limits, which in turn has affected the overall energy and energy performance of the renewable energy system. The system feedback module 134 will then send the measured values to the machine learning module 138 such that the machine learning module 138 can update its internal learning algorithms.

Collection of information from the power and lighting system coordinator 66. The information may represent feedback regarding the predictions that the renewable energy agent 74 has made or regarding the commands that the power and lighting system coordinator 66 might have previously sent. For example, the machine learning module 138 might have predicted that a certain amount of renewable energy will be available for use by the power systems. However, the actual amount of generated energy is greater than what was predicted. Once it detects this difference, the power and lighting system coordinator 66 may command the renewable energy agent 74 to improve its internal learning algorithms such that the error of its predictions is minimized to the greatest extent possible.

The machine learning module 138 is responsible for the following:

Collection of information from the system feedback module 134. The type of information that this module will collect is described under the system feedback module 134.

Collection of information from the system analysis and control module 136. This information may represent data from the various sensors 116, 118, 120, 122 and actuators 124, 126, 128, 130.

Making predictions, based on the data received from the system analysis and control module 136 or from the system feedback module 134. For example, the machine learning module 138, using weather data and data from the renewable energy systems (e.g. generation capacity, storage capacity, etc.) may be able to predict the rate at which energy will be generated or stored by the renewable energy systems. Further, the machine learning module 138 may predict how much energy will be generated in the next hour, next day, week or month.

Sending the predictions to the system analysis and control module 136 and to the scenario generator module 140.

The system analysis and control module 136 is responsible for the following:

Monitoring and control of all sensors 116, 118, 120, 122 and actuators 124, 126, 128, 130 related to the renewable energy systems.

Collection of information from the data filtering module 132. The type of information that this module will collect is described under the data filtering module 132.

Analyzing the data from each sensor and actuator. For example, the system analysis and control module 136 may determine that a solar panel or an array of solar panels is no longer capable of functioning as required. As such, the system analysis and control module 136 may need to send this feedback to the machine learning module 138 for predictions.

Analyzing the scenarios proposed by the scenario generator module 140. For each scenario received, the system analysis and control module 136 will analyze the status of the sensors and actuators and will determine which scenario is valid. For example, one of the scenarios that the scenario generator module 140 may generate is to predict how much energy the renewable systems can generate if there are clear sky conditions and if 90% of the solar panels are not available for use. The system analysis and control module 136 may determine that, due to additional solar panel failures, such scenario is no longer valid and that the machine learning module 138 will not make a prediction on the referenced scenario.

The scenario generator module 140 is responsible for continuously looking for ways/scenarios to improve the overall energy performance renewable energy systems. For example, the scenario generator module 140 may create a series of scenarios that will then be sent to the system analysis and control module 136 to analyze and validate. Once the scenarios are validated, they may be sent to the machine learning module 138 to make predictions on. The predictions made by the machine learning module 138 will then be sent back to the scenario generator module 140 for analysis. After analyzing the predictions, the scenario generator module 140 may decide to send such predictions to the power and lighting system coordinator 66, which may send them to SMITHGROUP-AI 10, which in turn may direct the power and lighting system coordinator 66 to implement one of the scenarios created by the scenario generator module 140.

The scenario generator module 140 may create scenarios by simulating the amount of energy generated or stored by the renewable energy system, by simulating the demand that the power system is exercising on the renewable energy system, by simulating various outdoor conditions (e.g. cloudy sky, wind speeds, etc.), by simulating various rates of energy generation (e.g. how much kWh are being generated in the next 3 hours), or by simulating various system settings (e.g. angle and direction of the solar panels, direction of the windmill.)

5. Utility Agent

The utility agent's sole responsibility is to monitor the status of the utility power (e.g. loss of power) or receive information from the utility company to enter into demand response mode and notify the power and lighting system coordinator 66 of such events.

D. AHU System

1. General Description

Figure 8:
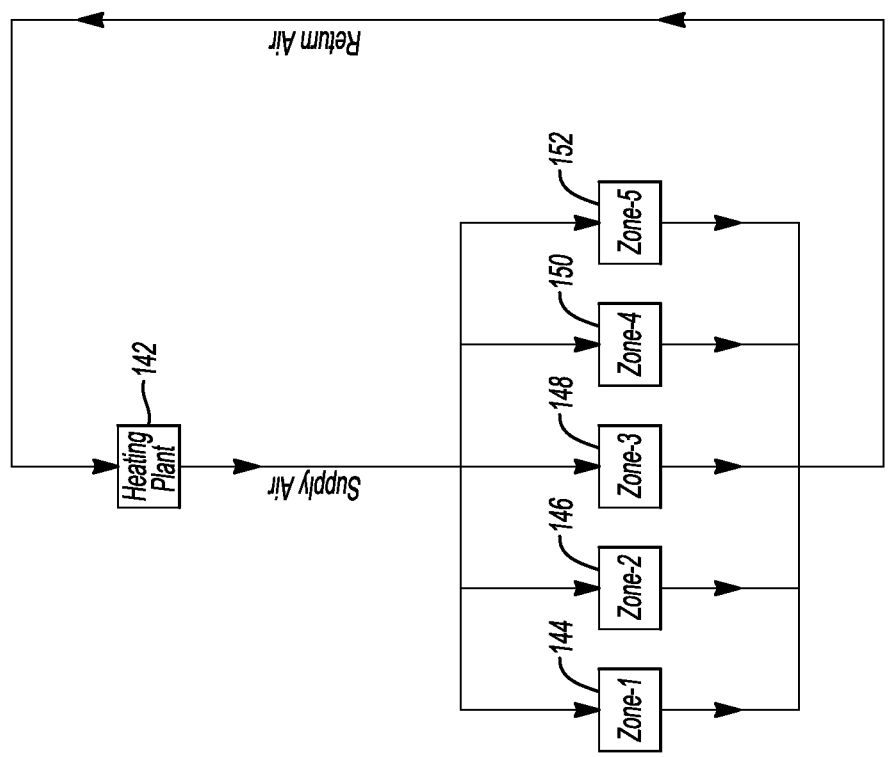
FIG. 8 shows an airside system as having one air handling unit delivering a mixture of outside air and return air to five zones.

Referring to FIG. 8, an airside system is shown as having one air handling unit 142 delivering a mixture of outside air and return air to five zones 144, 146, 148, 150, 152. The control of the entire airside system is performed through a series of independent software agents such as the AHU system coordinator 20, AHU agent 154, and zone agents 156, 158, 160, 162, 164.

Figure 9:
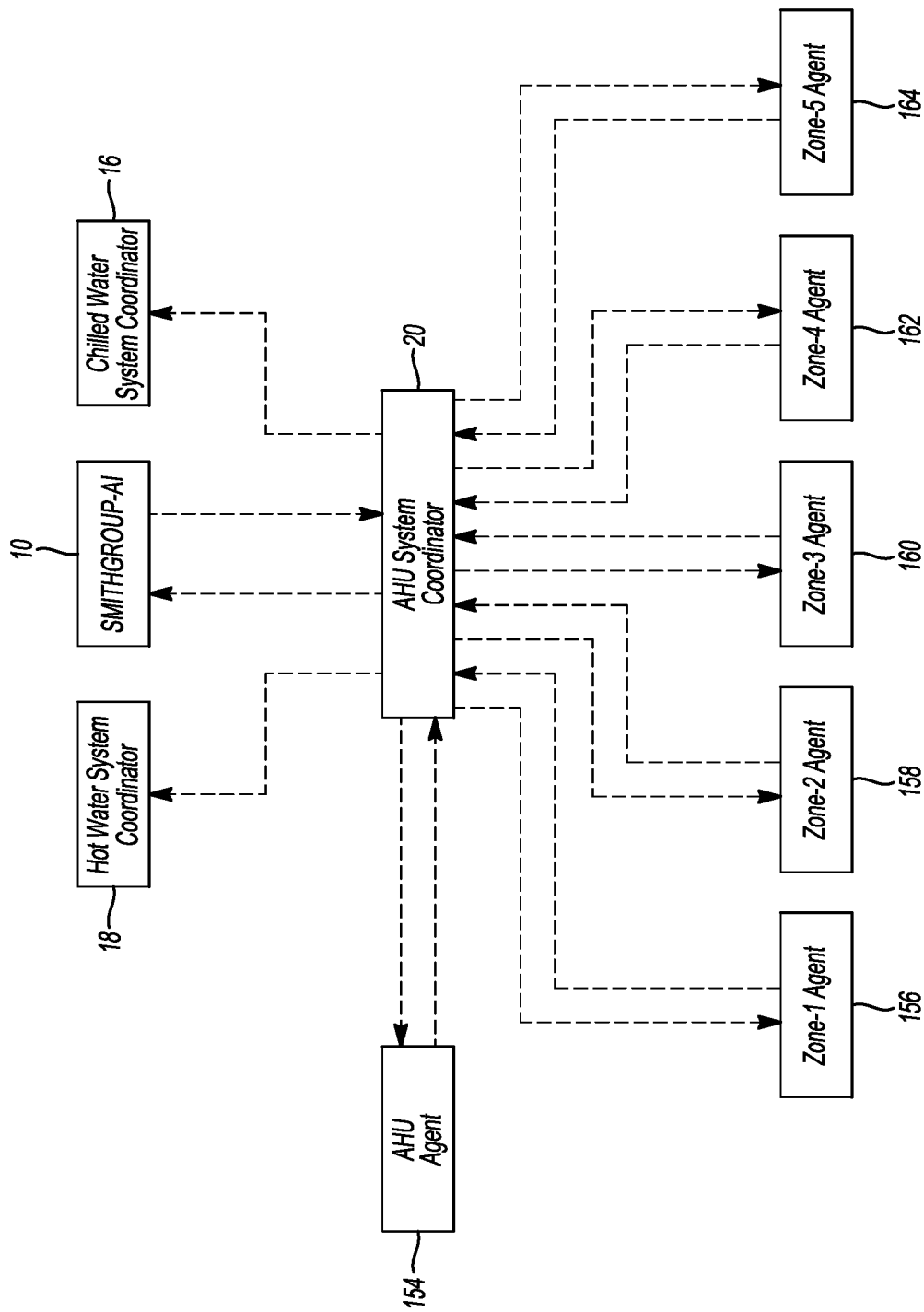
FIG. 9 shows the communication architecture between the various airside system agents.

FIG. 9 shows the communication architecture between the various airside system agents. Considering the network architecture of the sensors and actuators associated with an AHU, all sensors and actuators are connected directly to the network, without the use of proprietary controllers that operate with programmed sequences of operation. In some instances, an open source non-proprietary input/output module or a gateway may be required to convert the signal from a sensor or an actuator such that it can be communicated via open source networks such as BACnet, LONworks, Modbus etc.

2. AHU System Coordinator a. Purpose

The AHU system coordinator 20 is an independent software agent that monitors and controls all agents 154, 156, 158, 160, 162, 164 associated with its respective airside system. Further, the AHU system coordinator 20 is responsible for the following:

Prediction of the energy use of the entire airside system.

Communication with SMITHGROUP-AI 10. It sends overall airside system energy use predictions and receives commands from SMITHGROUP-AI 10.

Communication with the AHU Agent 154. It requests energy consumption predictions and status from the AHU Agent 154 and sends predictions (e.g. total system supply airflow, total system return air flow, total system outside airflow) such that the AHU agent 154 can make associated predictions related to the energy performance of the AHU 142.

Communication with the hot water system coordinator 18 and the chilled water system coordinator 16. The type of information that the AHU system coordinator 20 communicates to the hot water system coordinator 18 and the chilled water system coordinator 16 may represent cooling load and heating load predictions from each zone agent 156, 158, 160, 162, 164 and AHU agent 154.

b. Internal Structure

Figure 10:
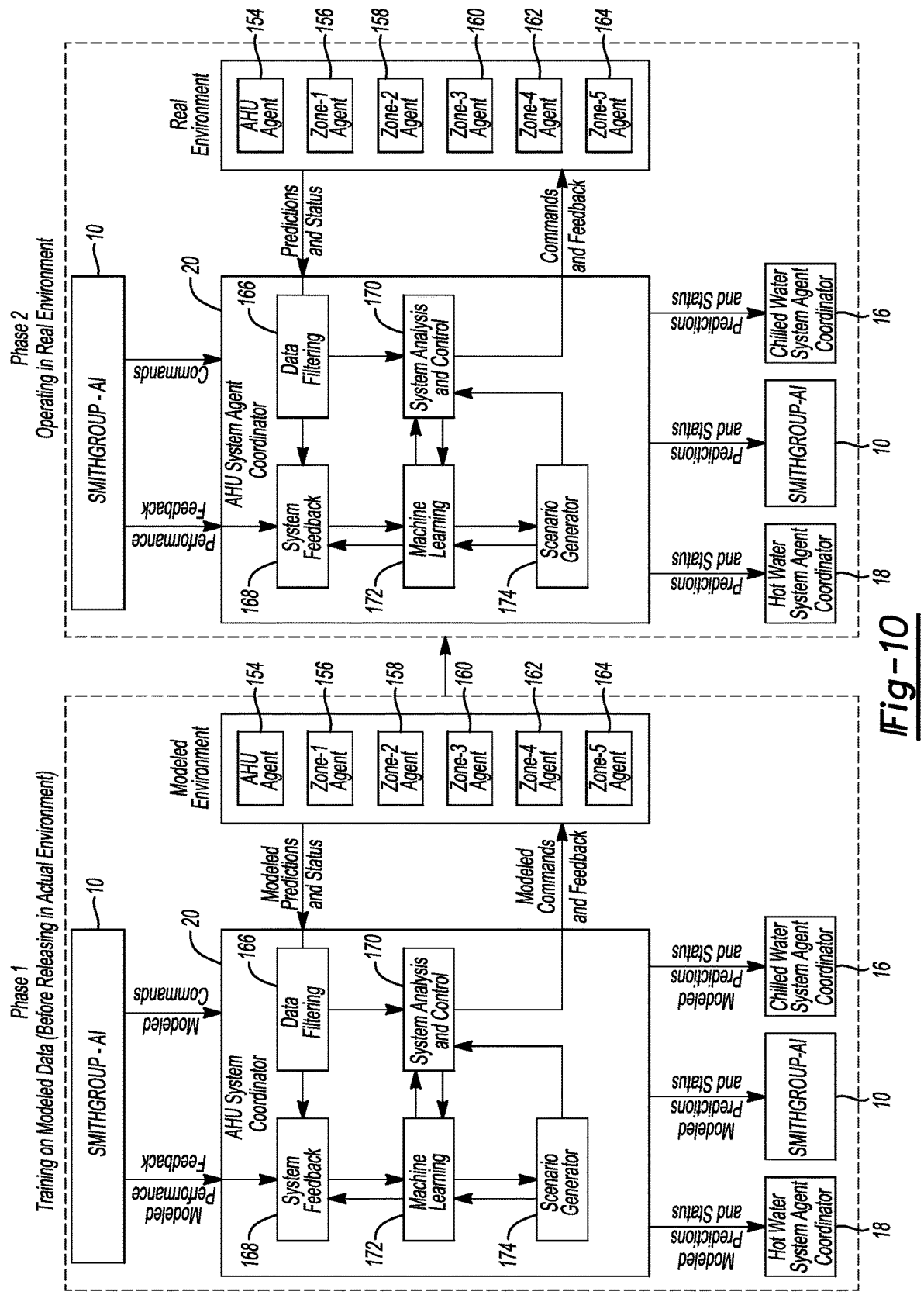
FIG. 10 shows the internal structure of the AHU system coordinator and its related environment.

Referring to FIG. 10, the internal structure of the AHU system coordinator 20 and its related environment is shown. The environment for the AHU system coordinator 20 is comprised of all the agents that it monitors and controls. The agent is comprised of five modules, each with its own dedicated algorithms and control logic.

The data filtering module 166 is responsible for separating the data received from the various agents 154, 156, 158, 160, 162, 164. For example, the actual agent energy consumption levels or actual agent airflows will be sent to the system feedback module 168, while predictions from the agents 154, 156, 158, 160, 162, 164 will be sent to the system analysis and control module 170.

The system feedback module 168 is responsible for the following:

Collection of information from the zone agents 156, 158, 160, 162, 164 and AHU agent 154. The information may represent status (e.g. failed, maintenance), or actual agent energy consumptions levels from the various agents. A failed status may indicate that a zone agent 156, 158, 160, 162, 164 or an AHU agent 154 no longer controls its environment and should be excluded from the overall airside system predictions that the machine learning module 172 is making. A maintenance status may indicate that a zone agent 156, 158, 160, 162, 164 or an AHU agent 154 has entered or may enter into a maintenance mode and that the machine learning module 172 needs to update its overall airside system predictions accordingly. The information may also represent predictions related to the energy consumption levels of each agent.

Analysis of predictions related to the total airside system airflow. The actual airflows from the various agents 154, 156, 158, 160, 162, 164 will be compared against their own predictions but also against the predictions made by the machine learning module 172. Any large discrepancies between the predicted and actual airflows could mean that the previous command that a zone agent 156, 158, 160, 162, 164 or AHU agent 154 received from the AHU system coordinator 20 has placed a zone agent 156, 158, 160, 162, 164 or AHU agent 154 in conflict with its own internal laws (e.g. not able to meet the various zone thermal requirements). This could indicate that the difference in the error or accuracy of the predictions made by the machine learning module 172 and the actual outcome might have exceeded critical limits, which in turn has affected the overall energy and thermal performance of the airside system. The system feedback module 168 will then send the actual airflows to the machine learning module 172 such that the machine learning module 172 can update its internal learning algorithms.

Collection of information from SMITHGROUP-AI 10: the information may represent commands that need to be distributed to the various associated zone agents 154, 156, 158, 160, 162, 164 and AHU agents 154. The information may also represent feedback regarding the predictions that the AHU system coordinator 20 has made; for example, the predicted energy performance of the scenario that SMITHGROUP-AI 10 has directed the AHU system coordinator 20 to implement is significantly different that the real outcome. As such the system feedback module 168 will pass this feedback to the machine learning module 172 to update its machine learning algorithms accordingly such that the accuracy or error of its predictions self-improves.

The machine learning module 172 is responsible for the following:

- Collection of information from the system feedback module 168. The type of information that this module will collect is described under the system feedback module 168.
- collection of information from the system analysis and control module 170. This information may represent predictions from zone agents 156, 158, 160, 162, 164 and AHU agent 154 regarding airflows, temperature, cooling loads, heating loads, etc.
- Making predictions, using machine learning algorithms, based on the data received from the system analysis and control module 170, for the overall energy consumption of the entire airside system or for the total airflow that the AHU agent 154 will need to deliver.
- Sending the predictions to the system analysis and control module 170 and to the scenario generator module 174.

The system analysis and control module 170 is responsible for the following:

- Collection of information from the data filtering module 166. The type of information that this module will collect is described under the data filtering module 166.
- Analyzing the data from each agent, and filtering and compiling the data into valid system scenarios. A more detailed description of this process is presented in the sample process paragraph.
- Sending the valid system scenarios to the machine learning module 172 for predictions.
- Receiving the predictions from the machine learning module 172 and sending commands to the various agents 154, 156, 158, 160, 162, 164. The commands that the system analysis and control module 170 may send to the agents could be airflow setpoints, temperature setpoints or requests for predictions.
- Analyzing the scenarios proposed by the scenario generator module 174. For each scenario received, the system analysis and control module 170 may decide to direct the various agents to make predictions and then compile these predictions into valid system scenarios for the machine learning module 172 to make predictions on.

The scenario generator module 174 is responsible for continuously looking for ways to improve the overall energy performance of the entire airside system. For example, the scenario generator module 174 may create a series of scenarios that will then be sent to the system analysis and control module 170 to analyze and validate. The system analysis and control module 170 may ask the agents to make predictions on the scenarios. Once the scenarios are validated, they may be sent to the machine learning module 172 to make predictions on. The predictions made by the machine learning module 172 will then be sent back to the scenario generator module 174 for analysis. After analyzing the predictions, the scenario generator module 174 may decide to send such predictions to SMITHGROUP-AI 10, which in turn may direct the AHU system coordinator 20 to implement one of the scenarios created by the scenario generator module 174.

The scenario generator module 174 may create scenarios by modelling the AHU agent 154 as delivering various airflows and various temperatures and by modelling the zone agents 156, 158, 160, 162, 164 as satisfying their zone thermal load conditions under various conditions.

c. Sample Process

Each zone agent 156, 158, 160, 162, 164 will send to the AHU system coordinator 20 a series of predictions and status information. The predictions that each zone agent 156, 158, 160, 162, 164 will send to the AHU system coordinator 20 are related to the airflow requirements and various temperatures that the zone agent could use to satisfy its zone requirements. Further, each zone agent 156, 158, 160, 162, 164 will send to the AHU system coordinator 20 the associated zone predictions for the hot water system coordinator 18 and for the chilled water system coordinator 16.

The system analysis and control module 170 will first compile all airside system related predictions from the zone agents 156, 158, 160, 162, 164. The system analysis and control module 170, based on the laws of each zone agent 156, 158, 160, 162, 164, will then eliminate any zone agent predictions that will make other zone agents incapable of meeting their internal laws. The system analysis and control module 170 will then compile and sort all valid predictions made by the zone agents 156, 158, 160, 162, 164. For example, as a first step, the system analysis and control module 170 may sort the predictions based on a common AHU discharge air temperature. In a second step, the system analysis and control module may then choose the lowest dew point temperature required by a zone agent 156, 158, 160, 162, 164. The system analysis and control module 170 will then establish a series of valid airside system scenarios. These scenarios will then be sent to the machine learning module 172 to make predictions regarding the total system supply airflow, return airflow return air temperature, and outside airflow. For example, by analyzing the various zone ventilation efficiencies and the outside air-dry bulb temperature and relative humidity, the machine learning module 172 may predict that an air side economizer (e.g. an artificial increase in outside air flow) is better suited than delivering the lowest required amount of outside air flow. The machine learning module 172 will send these predictions back to the system analysis and control module 170, which in turn will send them to the AHU agent 154 to make its own predictions regarding AHU energy consumption. Once it receives the predictions from the AHU agent 154, it will then send the overall airside system predictions to SMITHGROUP-AI 10 and the associated zone agent and AHU agent load predictions to the hot water system coordinator 18 and the chilled water system coordinator 16. The AHU system coordinator 20 will send to the hot water system coordinator 18 only the zone agent predicted heating loads that correspond to valid scenarios analyzed by the system analysis and control module 170. The AHU system coordinator 20 will send to the chilled water system coordinator 16 only the AHU agent predicted cooling loads that correspond to total system airflow predictions performed by the machine learning module 172.

In further detail, each zone agent creates a series of scenarios associated with the zone that it is serving and sends these scenarios to a system coordinator (e.g. AHU system coordinator 20). These scenarios are given a unique ID number (Table 1 below) based on a specific airflow supply air temperature (SAT) and a specific entering water temperature (EWT).

TABLE 1

| | Zone Agent 1 | | | | | | |
|---|---|---|---|---|---|---|---|
| | Zone Data | | | | Predictions | | |
| | | | | | | Primary | |
| Zone Prediction ID | Zone Load Btu/Hr | Temperature Setpoint OF | Coil EAT OF | Dew Point DP OF | Zone Airflow CFM | Outdoor Air Fraction Zp | Energy Predictions kWh |
| Agent_1-1 | 20000 | 72 | 50 | 48 | 1000 | 0.76 | 0.10 |
| Agent_1-2 | 20000 | 72 | 51 | 49 | 1200 | 0.92 | 0.36 |
| Agent_1-3 | 20000 | 72 | 52 | 50 | 1400 | 0.95 | 0.37 |
| Agent_1-4 | 20000 | 72 | 53 | 51 | 1600 | 0.67 | 0.43 |
| Agent_1-5 | 20000 | 72 | 54 | 52 | 1800 | 0.81 | 0.18 |
| Agent_1-6 | 20000 | 72 | 55 | 53 | 2000 | 0.91 | 0.40 |
| Agent_1-7 | 20000 | 72 | 56 | 54 | 2200 | 0.78 | 0.39 |
| Agent_1-8 | 20000 | 72 | 57 | 55 | 2400 | 0.70 | 0.24 |
| Agent_1-9 | 20000 | 72 | 58 | 56 | 2600 | 0.68 | 0.29 |
| Agent_1-10 | 20000 | 72 | 59 | 57 | 2800 | 0.81 | 0.12 |

The AHU system coordinator 20 then filters/validates the scenarios received from the zone agents (Table 2 below). The validation process could be based on the physical limitation of the air handling unit. In some instances, even though a zone may be able to be cooled with a very cold air temperature (e.g. 50° F.), due the operating conditions at that time or physical limitations of the internal components of the air handling unit, the air handling unit may not be able to cool the air to 50° F. As such the AHU system coordinator 20 may label the associated scenarios as invalid (in bold below).

TABLE 2

| | Zone Agent 1 | | | | | | |
|---|---|---|---|---|---|---|---|
| | Zone Data | | | | Predictions | | |
| | | | | | | Primary | |
| Zone Prediction ID | Zone Load BTU/Hr | Temperature Setpoint OF | Coil EAT OF | Dew Point DP OF | Zone Airflow CFM | Outdoor Air Fraction Zp | Energy Prediction kWh |
| Agent_1-1 | 2000 | 72 | 50 | 48 | 1000 | .76 | .10 |
| Agent_1-2 | 2000 | 72 | 51 | 49 | 1200 | .92 | .36 |
| Agent_1-3 | 2000 | 72 | 52 | 50 | 1400 | .95 | .37 |
| Agent_1-4 | 2000 | 72 | 53 | 51 | 1600 | .67 | .43 |
| Agent_1-5 | 2000 | 72 | 54 | 52 | 1800 | .81 | .18 |
| Agent_1-6 | 2000 | 72 | 55 | 53 | 2000 | .91 | .40 |
| Agent_1-7 | 2000 | 72 | 56 | 54 | 2200 | .78 | .39 |
| Agent_1-8 | 2000 | 72 | 57 | 55 | 2400 | .70 | .24 |
| Agent_1-9 | 2000 | 72 | 58 | 56 | 2600 | .68 | .29 |
| Agent_1-10 | 2000 | 72 | 59 | 57 | 2800 | .81 | .12 |

The AHU system coordinator 20 will then start creating combinations of agent scenarios (Table 3 below). Each combination of scenarios is then given a unique ID number (e.g. AHU_1-1). For each combination of agent scenarios there is a corresponding set of air handling unit conditions that need to be achieved (e.g. total airflow, coil dew point, etc.).

TABLE 3

| | AHU-1 System Predictions | | | | | | |
|---|---|---|---|---|---|---|---|
| System Identification Data | | | | | Zone Predictions | | |
| | | | | | | Primary | |
| AHU System Scenario ID | Zone Prediction ID | Temperature Setpoint OF | Coil EAT OF | Dew Point DP OF | Zone Airflow CFM | Outdoor Air Fraction Zp | Energy Predictions kWh |
| AHU_1-1 | Agent_1-3 | 72 | 52 | 50 | 1400 | 0.95 | 0.37 |
| | Agent_2-3 | 70 | 52 | 50 | 700 | 0.95 | 0.37 |

TABLE 3-continued

| AHU-1 System Predictions | | | | | | | |
|---|---|---|---|---|---|---|---|
| System Identification Data | | | | Zone Predictions | | | |
| | | | | | Primary | | |
| AHU System Scenario ID | Zone Prediction ID | Temperature Setpoint °F | Coil EAT °F | Dew Point DP °F | Zone Airflow CFM | Outdoor Air Fraction Zp | Energy Predictions kWh |
| | Agent_3-1 | 73 | 52 | 48 | 300 | 0.76 | 0.10 |
| | Agent_4-3 | 71 | 52 | 50 | 1200 | 0.95 | 0.37 |
| | Agent_5-3 | 75 | 52 | 50 | 1400 | 0.95 | 0.37 |
| | Totals | | | | 5000 | | |

The AHU system coordinator 20 will then send these combinations of agent scenarios (Table 4 below) to the AHU agent 154 to make predictions on the total system supply airflow, return airflow, and outside air flow.

TABLE 4

| AHU-1 SYSTEM PREDICTIONS | | | | | | | |
|---|---|---|---|---|---|---|---|
| AHU SYSTEM SCENARIOS | | | | PREDICTIONS | | | |
| AHU System Prediction ID | Supply Air Temperature SAT °F | Dew Point DP °F | Total Zone Supply Airflow CFM | Total System Supply Airflow CFM | Total System Return Airflow CFM | System Return Air Temperature °F | Outside Airflow CFM |
| AHU_1-1 | 52 | 48 | 5000 | 5300 | 4900 | 71 | 1000 |
| AHU_1-2 | 53 | 49 | 5700 | 5700 | 5000 | 73 | 2000 |
| AHU_1-3 | 54 | 50 | 6400 | 6900 | 6000 | 75 | 3000 |
| AHU_1-4 | 55 | 51 | 7100 | 7800 | 7000 | 74 | 4000 |

After receiving the predictions from the AHU agent 154, the AHU system coordinator 20 will then make predictions on the overall energy consumption levels for each combination of agent scenarios (Table 5 below) and will send these predictions to SMITHGROUP-AI 10.

TABLE 5

| AHU-1 AGENT PREDICTIONS | | | | | | | |
|---|---|---|---|---|---|---|---|
| | | | RECEIVED DATA | | | | |
| AHU-1 SYSTEM SCENARIOS | | | Total | Total | | | PREDICTION |
| AHU System Prediction ID | Supply Air Temperature SAT °F | Dew Point DP °F | System Supply Airflow CFM | System Return Airflow CFM | System Return Air Temperature °F | Outside Airflow CFM | AHU-1 Energy Consumption kWh |
| AHU_1-1 | 52 | 48 | 5300 | 4900 | 71 | 1000 | 10 |
| AHU_1-2 | 53 | 49 | 5700 | 5000 | 73 | 2000 | 15 |
| AHU_1-3 | 54 | 50 | 6900 | 6000 | 75 | 3000 | 20 |
| AHU_1-4 | 55 | 51 | 7800 | 7000 | 74 | 4000 | 25 |

3. AHU Agent a. Purpose

The AHU agent 154 is an independent software agent that monitors and controls all sensors and actuators associated with an AHU. Each AHU is controlled and monitored by a dedicated AHU agent. Further, the AHU agent 154 is responsible for the following:

Prediction of the energy use of the entire airside system.
Prediction of the required heating coil loads and cooling coil loads.
Prediction of the air pressure drop through each of the AHU components.
Prediction of the supply fan array energy consumption.
Prediction of the return fan array energy consumption.
Communication with the AHU system coordinator 20. It sends overall AHU energy use predictions and receives commands from the AHU system coordinator 20.

b. Internal Structure

Figure 11:
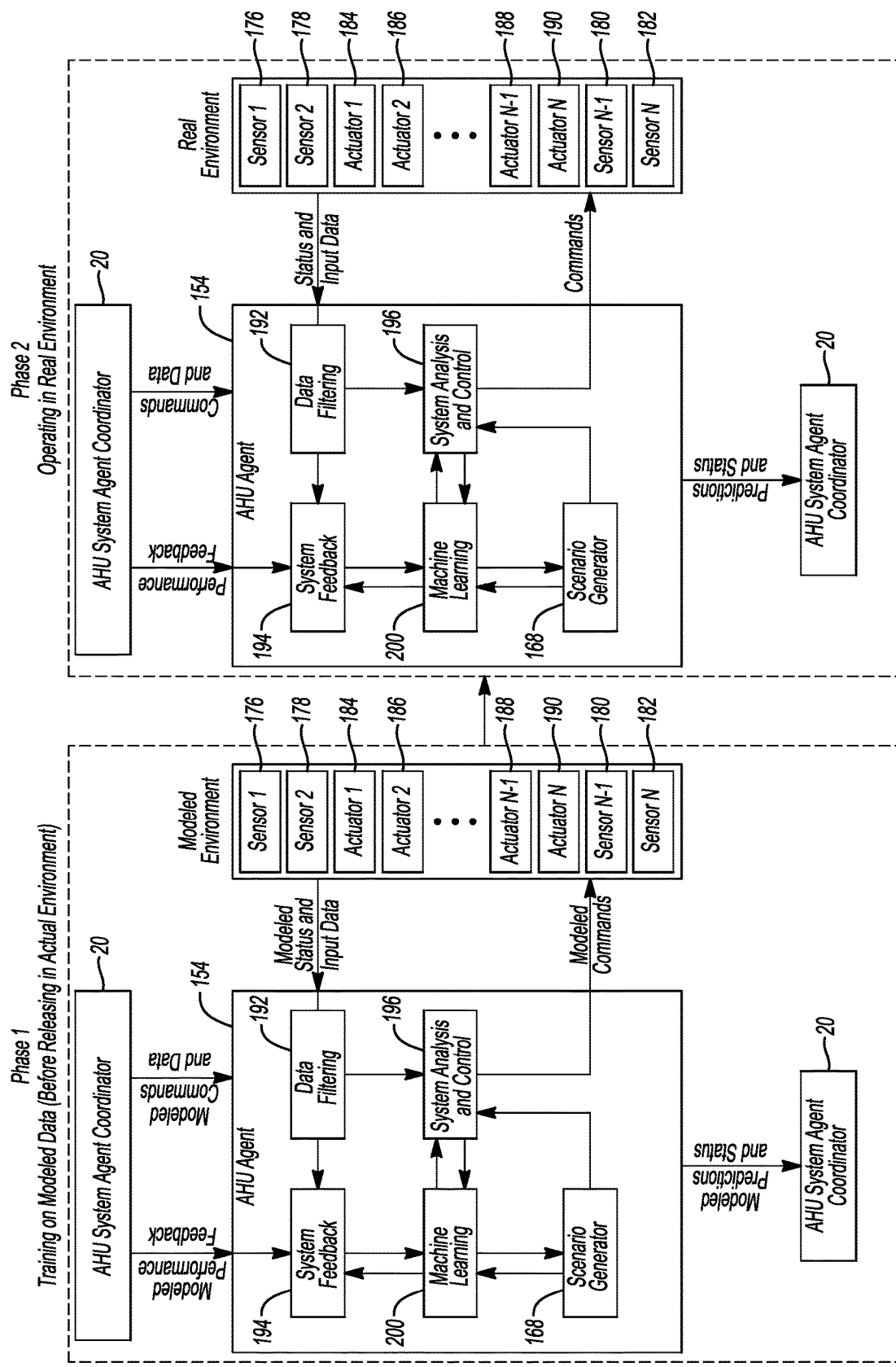
FIG. 11 shows the internal structure of the AHU agent and its related environment.

Referring to FIG. 11, the internal structure of the AHU agent 154 and its related environment is shown. The environment for the AHU agent 154 is comprised of the sensors 176, 178, 180, 182 and actuators 184, 186, 188, 190 that are used to monitor and control the AHU 142. The agent 154 is comprised of five modules, each with its own dedicated algorithms and control logic.

The data filtering 192 module is responsible for separating the data received from sensors 176, 178, 180, 182 and actuators 184, 186, 188, 190. For example, the energy consumption levels of fans (measured by their related variable frequency drives (VFD)), actual fan airflows (measured by the associated airflow stations), or various temperatures (e.g. cooling coil leaving air temperature, unit leaving air temperature, etc.) will be sent to the system feedback module 194, while data from other various sensors (e.g. alarms, temperatures, etc.) will be sent to the system analysis and control module 196. The data filtering module 192 may also send to the system analysis and control module 196 the same data that was sent to the system feedback module 194.

The system feedback 194 module is responsible for the following:
Collection of information from the various sensors and actuators. The type of information that the system feedback module 194 may collect is described in the data filtering module 192.
Analysis of predictions related to various temperatures (e.g. mixed air temperatures, coil leaving air temperature, unit leaving air temperature, etc.). The data received from the various sensors 176, 178, 180, 182 and actuators 184, 186, 188, 190 will be compared against the predictions made by the machine learning module 198. Any large discrepancies between the predicted and measured values could mean that the previous commands could indicate that the difference in the error or accuracy of the predictions made by the machine learning module 198 and the actual outcome might have exceeded critical limits, which in turn has affected the overall energy and energy performance of the air handling unit 142. The system feedback module 194 will then send the measured values to the machine learning module 198 such that the machine learning module 198 can update its internal learning algorithms.
Collection of information from the AHU system coordinator 20. The information may represent feedback regarding the predictions that the AHU agent 154 has made. For example, the AHU 142 might deliver a certain amount of supply air to the zones 144, 146, 148, 150, 152 and at the same time its internal airflow sensors are confirming that the measured supply airflow is equal to or close to what was predicted. However, some zones, as measured by the sensors of the zone agents 156, 158, 160, 162, 164 might not receive sufficient airflow. This could be indication that the AHU airflow sensors are defective or that they might need recalibration.

The machine learning module 198 is responsible for the following:
Collection of information from the system feedback module 194. The type of information that this module will collect is described under the system feedback module 194.
Collection of information from the system analysis and control module 196. This information may represent data from the various sensors 176, 178, 180, 182 and actuators 184, 186, 188, 190, such as airflows and associated temperatures.
Making predictions, using machine learning algorithms, based on the data received from the system analysis and control module 196 or from the system feedback module 194.
Sending the predictions to the system analysis and control module 196 and to the scenario generator module 200.

For each component (e.g. coil, filter bank, fans, etc.) of the AHU 142, the machine learning module 198 will use various machine learning algorithms to predict its performance (e.g. Btu/hr, leaving water temperature, water flow, etc.), air pressure drop, energy consumption (e.g. kWh). For example, a coil has fixed properties (e.g. width, height, number of fins, tube diameter, etc.). As such, a machine learning algorithm may be trained, via the use of manufacturer's rated coil performance data at various conditions (e.g. various entering air temperatures, entering water temperatures and flow), to predict what the coil leaving air temperature and water temperature may be at other conditions not included in the training data set.

Similarly, using fan laws and manufacturer's rated fan performance data as a training set, a machine learning algorithm may be trained to predict what the fan energy consumption will be at various system conditions (e.g. various airflows and various associated fan static pressures). Once released into the real environment, the machine learning module 198, via the feedback received from the system feedback module 194, may update its internal machine learning algorithms and related predictions (e.g. fan motor energy consumption, static pressure setpoints, etc.) to account for system effects and for the measurement errors of the various sensors.

Using an approach similar to the above, the machine learning module 198 may also use each individual component prediction as a data set and/or training set to make predictions for the energy consumption of the entire AHU 142. For example, the machine learning module 194 may build a training set comprised of the supply fan airflow, return fan airflow, return static pressure, supply static pressure, and associated fan motor energy consumption. Once the training set is of considerable size, the machine learning module 198 may use it to predict fan motor energy consumption on new data that is not a part of the training set.

The machine learning module 198 may also inform the system analysis and control module 196 on what coil (e.g. preheat coil or cooling coil) can be used for preheating. For example, the machine learning module 198, using various sensors (e.g. return air and outside temperature sensors), may predict that the mixed air temperature resulted from the mixing of the return air flow and outside airflow is 37° F., while the required AHU supply air temperature is 52° F. A typical approach would be to enable the preheat coil to warm up the mixed air around 50° F., and then, by picking up the heat from the fan motors, the AHU supply air temperature will be 52° F. However, the machine learning module 198, by analyzing the properties of the cooling coil and the related chilled water temperatures and flow, may predict that the preheat coil is required to only preheat the mixed air to 47° F. and then the chilled water coil can be used to preheat the air to 50° F. In the case when preheating is not required, the machine learning module 198 may predict that an artificial increase in the amount of outside air that the AHU 142 is delivering may lower the mixed air return air temperature enough to require preheating using the cooling coil. This approach may result in significant energy savings for both the AHU 142 and the chilled water plant. The predictions described above will then be sent to the AHU system coordinator 20, which in turn will send the predictions to the chilled water system coordinator 16. See chilled water system coordinator description for additional information.

The system analysis and control module 196 is responsible for the following:

Monitoring and control of all sensors and actuators related to the AHU 142.

Collection of information from the data filtering module 192. The type of information that this module will collect is described under the data filtering module 192.

Analyzing the data from each sensor and actuator. For example, the system analysis and control module 196 may determine that a fan is no longer capable of running (e.g. the motor has burned out). As such, the system analysis and control module 196 may need to update its valid scenario (e.g. how many fans need to operate and at what speed) to deliver the required amount of airflow to the zones 144, 146, 148, 150, 152.

Sending the valid system scenarios to the machine learning module 198 for predictions.

Receiving the predictions from the machine learning module 198 and sending commands to the various actuators 184, 186, 188, 190. The commands that the system analysis and control module 196 may send to the actuators 184, 186, 188, 190 could be valve position, damper position or fan speed.

Analyzing the scenarios proposed by the scenario generator module 200. For each scenario received, the system analysis and control module 196 will analyze the status of the current sensors 176, 178, 180, 182 and actuators 184, 186, 188, 190 and will determine which scenario is valid. For example, one of the scenarios that the scenario generator module 200 may generate, will require the AHU 142 to deliver 10,000 cfm to the zones 144, 146, 148, 150, 152. The system analysis and control module 196 may determine that, due to a fan failure, such scenario is no longer valid and that the machine learning module 198 will not make a prediction on the referenced scenario.

The scenario generator module 200 is responsible for continuously looking for ways/scenarios to improve the overall energy performance of the AHU 142. For example, the scenario generator module 200 may create a series of scenarios which will then be sent to the system analysis and control module 196 to analyze and validate. Once the scenarios are validated, they may be sent to the machine learning module 198 to make predictions on. The predictions made by the machine learning module 198 will then be sent back to the scenario generator module 200 for analysis. After analyzing the predictions, the scenario generator module 200 may decide to send such predictions to the AHU system coordinator 20, which may send them to SMITHGROUP-AI 10, which in turn may direct the AHU system coordinator 20 to implement one of the scenarios created by the scenario generator module 200.

The scenario generator module 200 may create scenarios by varying the AHU air flows (e.g. outside air flow, return airflow, etc.) and related temperatures. Each such scenario will have an impact on the energy performance of fan motors and on the AHU coil heating and cooling loads.

E. Heating Hot Water System

1. General Description

Figure 12:
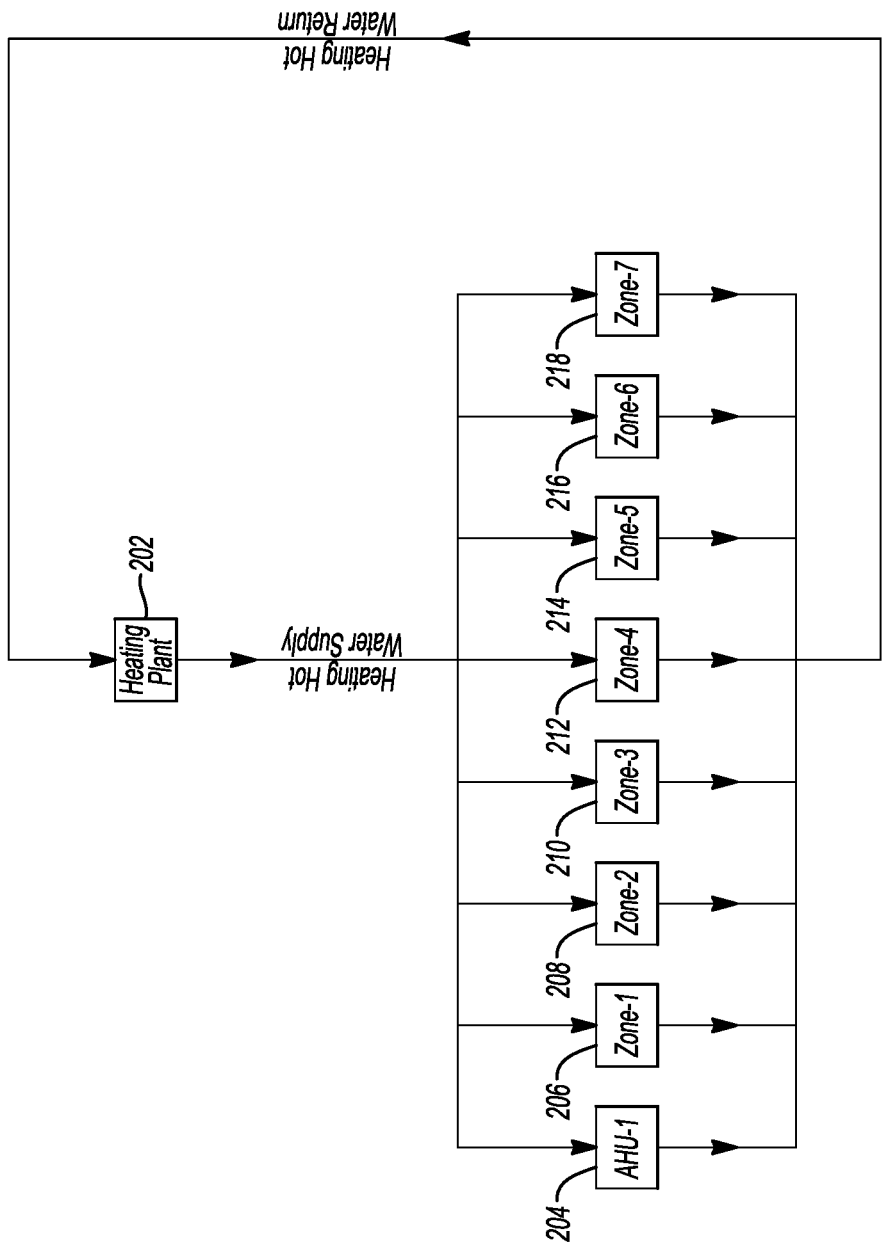
FIG. 12 shows the heating plant providing heating hot water to one air handling unit and seven thermal zones.
Figure 13:
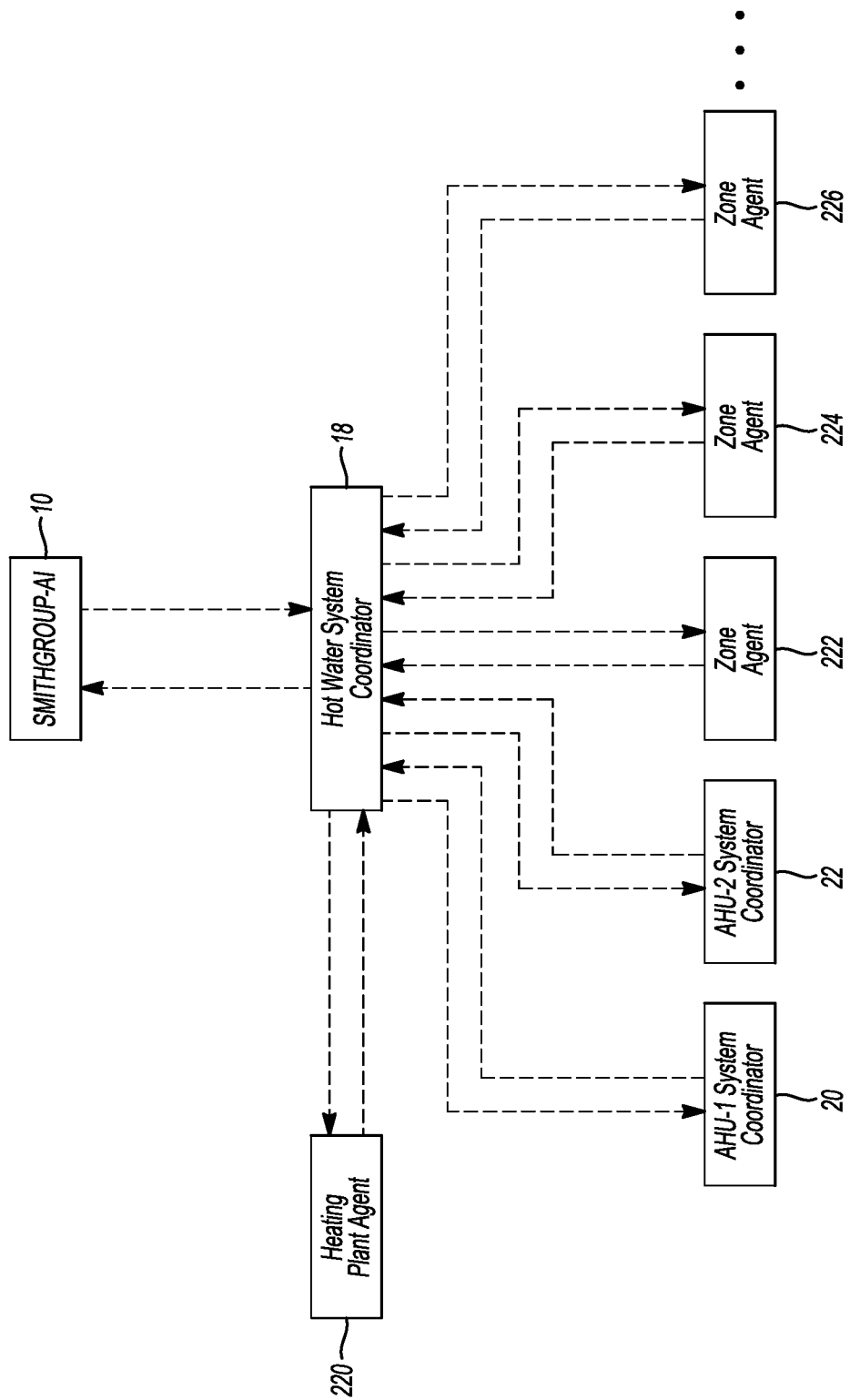
FIG. 13 shows the communication architecture between the various hot water system agents.

FIG. 12 represents the heating plant 202 providing heating hot water to one air handling unit 204 and seven thermal zones 206, 208, 210, 212, 214, 216, 218. The control of the entire hot water system is performed through a series of independent software agents such as the hot water system coordinator 18, heating plant agent 220, and zone agents 222, 224, 226. The communication architecture between the various agents and coordinators is shown in FIG. 13.

2. Hot Water System Coordinator a. Purpose

The hot water system coordinator 18 is an independent software agent that monitors and controls all agents associated with its respective heating system. By coordinating and predicting the energy usage of the entire heating system, the hot water system coordinator 18 will inform SMITHGROUP-AI 10 with the necessary information for it to optimize the overall building energy use.

The hot water system coordinator 18 is responsible, but not limited to the following:

Satisfy and maintain all building heating loads requirements.

Optimize the energy use of the heating system.

Predict the energy use of the heating system.

Communication with SMITHGROUP-AI 10. It sends overall heating system energy use predictions and receives commands from SMITHGROUP-AI 10.

Communication with the hot water plant agent 220. It requests energy consumption predictions and status from the hot water plant agent 220 and sends predictions (e.g. total heating hot water system water flow, heating hot water supply temperature, heating hot water return temperature) such that the heating plant agent 220 can make associated predictions related to the energy performance of the heating water plant 220.

b. Internal Structure

Figure 14:
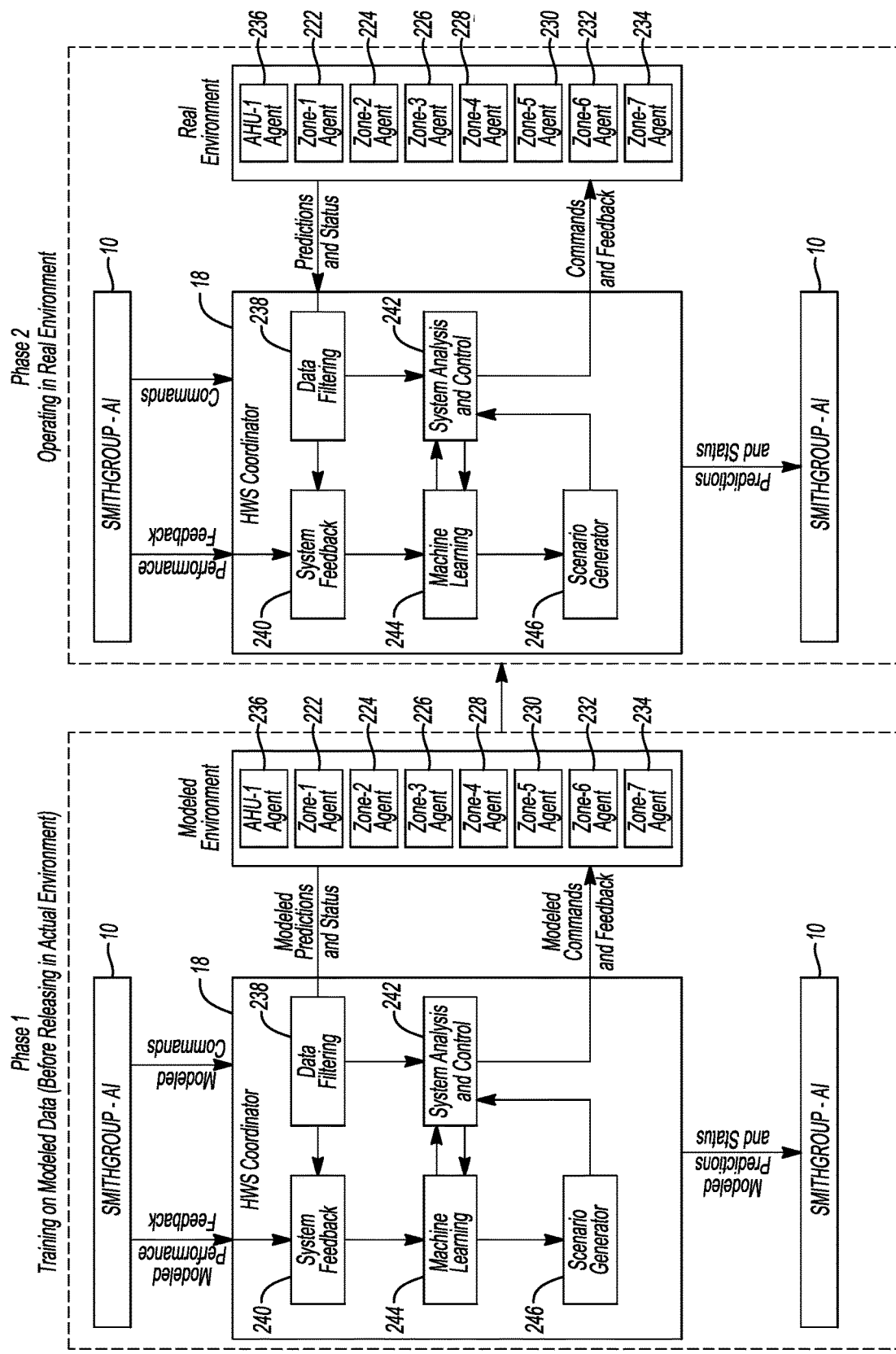
FIG. 14 shows the internal structure of the hot water system (HWS) coordinator and its environment.

FIG. 14 represents the internal structure of the hot water system (HWS) coordinator 18 and its environment. The environment of the HWS coordinator 18 is comprised of all agents 222, 224, 226, 228, 230, 232, 234, 236 that it monitors and controls. The agents that the HWS coordinator 18 controls are all zones and AHUs that contain a hot water coil and require hot water from the heating plant. The agent is comprised of five unique modules that have its own dedicated algorithm.

The data filtering module 238 is responsible for separating the data received from the various associated agents 222, 224, 226, 228, 230, 232, 234, 236. For example, the actual agent energy consumption levels or actual agent hot water flow may be sent to the system feedback module 240, while predictions from the agents will be sent to the system analysis and control module 242.

The system feedback module 240 is responsible for the following:

Collection of information from the zone agents 222, 224, 226, 228, 230, 232, 234 and the heating plant agent 220; the information may represent status (e.g. failed, maintenance), or actual agent energy consumptions levels from the various agents. A failed status may indicate that a zone agent 222, 224, 226, 228, 230, 232, 234 may no longer control its environment and should be excluded from the overall condenser water system predictions that the machine learning module 244 is making. A maintenance status may indicate that a zone agent 222, 224, 226, 228, 230, 232, 234 has entered or may enter into a maintenance mode and that the machine learning module 244 needs to update its overall chilled water system predictions accordingly. The information may also represent predictions related to the energy consumption levels of each agent.

Analysis of predictions related to the total heating hot water flow. The actual heating hot water flow from the various agents will be compared against their own predictions but also against the predictions made by the machine learning module 244. Any large discrepancies between the predicted and actual heating hot water flows could mean that the previous command that a zone agent 222, 224, 226, 228, 230, 232, 234 or the heating plant agent 220 received from the hot water system coordinator 18 has placed an agent 222, 224, 226, 228, 230, 232, 234, 236 in conflict with its own internal laws (e.g. not able to meet the various zone thermal requirements or expected chilled water system flow). This could indicate that the difference in the error or accuracy of the predictions made by the machine learning module 244 and the actual outcome might have exceeded critical limits, which in turn has affected the overall energy and thermal performance of the heating system. The system feedback module 240 will then send the actual chilled water flows to the machine learning module 244 such that the machine learning module 244 can update its internal learning algorithms.

Collection of information from SMITHGROUP-AI 10. The information may represent commands that need to be distributed to the various associated agents. The information may also represent feedback regarding the predictions that the hot water system coordinator 18 has made; for example, the predicted energy performance of the scenario that SMITHGROUP-AI 10 has directed the hot water system coordinator 10 to implement is significantly different than the real outcome. As such the system feedback module 240 will pass this feedback to the machine learning module 244 to update its machine learning algorithms accordingly such that the accuracy or error of its predictions self-improves.

The machine learning module 244 will be responsible for the following:

Collect information from the data filtering 238 and system analysis and control module 242.

Predict the overall energy consumption of the entire hot water system or for the total water flow that the heating plant agent 220 must deliver based on the data received from the system analysis and control module 242.

Send predictions back to the system analysis and control module 242 and to the scenario generator module 246.

The system analysis and control module 242 is responsible for the following:

Collect information from the data filtering module 238. the type of information that this module may collect is described under the data filter module 238.

Analyze data received from each agent, and filtering and compiling the data into valid system scenarios. A more detailed description of this process is presented in the sample process.

Send valid system scenarios to the machine learning module 244 for predictions.

Receiving the predictions from the machine learning module 244 and send commands to the various agents. The commands that the system analysis and control module 242 may send to the agents 222, 224, 226, 228, 230, 232, 234, 236 could be chilled water entering and leaving setpoints, heating hot water flows, or requests for predictions.

Analyzing the scenarios proposed by the scenario generator module 246. For each scenario received, the system analysis and control module 242 may decide to direct the various agents to make predictions and then compile these predictions into valid system scenarios for the machine learning module 244 to make predictions on.

The scenario generator module 246 is responsible for continuously looking for ways to improve the overall energy performance of the entire heating hot water system. For example, the scenario generator module 246 may create a series of scenarios which will then be sent to the system analysis and control module 242 to analyze and validate. The system analysis and control module 242 may ask the associated agents to make predictions on the scenarios. Once the scenarios are validated, they may be sent to the machine learning module 244 to make predictions on. The predictions made by the machine learning module 244 will then be sent back to the scenario generator module 246 for analysis. After analyzing the predictions, the scenario generator module 246 may decide to send such predictions to SMITHGROUP-AI 10, which in turn may direct the hot water system coordinator 18 to implement one of the scenarios created by the scenario generator module 246.

The scenario generator module 246 may create scenarios by modelling the heating plant agent 220 as delivering various heating hot water flows and associated temperatures and by modelling the zone agents 222, 224, 226, 228, 230, 232, 234 or AHU agents 236 as satisfying their load conditions under various conditions.

3. Heating Plant Agent a. Purpose

The heating plant agent 220 is an independent agent that monitors and controls all sensors 248, 250, 252, 254 and actuators 256, 258, 260, 262, associated with the heating plant 202. Further, the heating plant agent 220 is responsible for the following:

Prediction of the energy use of the entire heating plant.
Prediction of the boiler's energy consumption.
Prediction of firing rates of each boiler.
Prediction of the hot water pumps energy consumption.
Prediction of the water pressure drop through each of the hot water system piping components (e.g. control valve, heat exchanger, coil).
Communication with the hot water system coordinator 18. It receives valid scenario predictions (e.g. total hot water coil loads, hot water supply temperature, hot water return temperature, total hot water flow) such that the hot water agent can make associated energy predictions to send back to the hot water system coordinator 18.

b. Internal Structure

Figure 15:
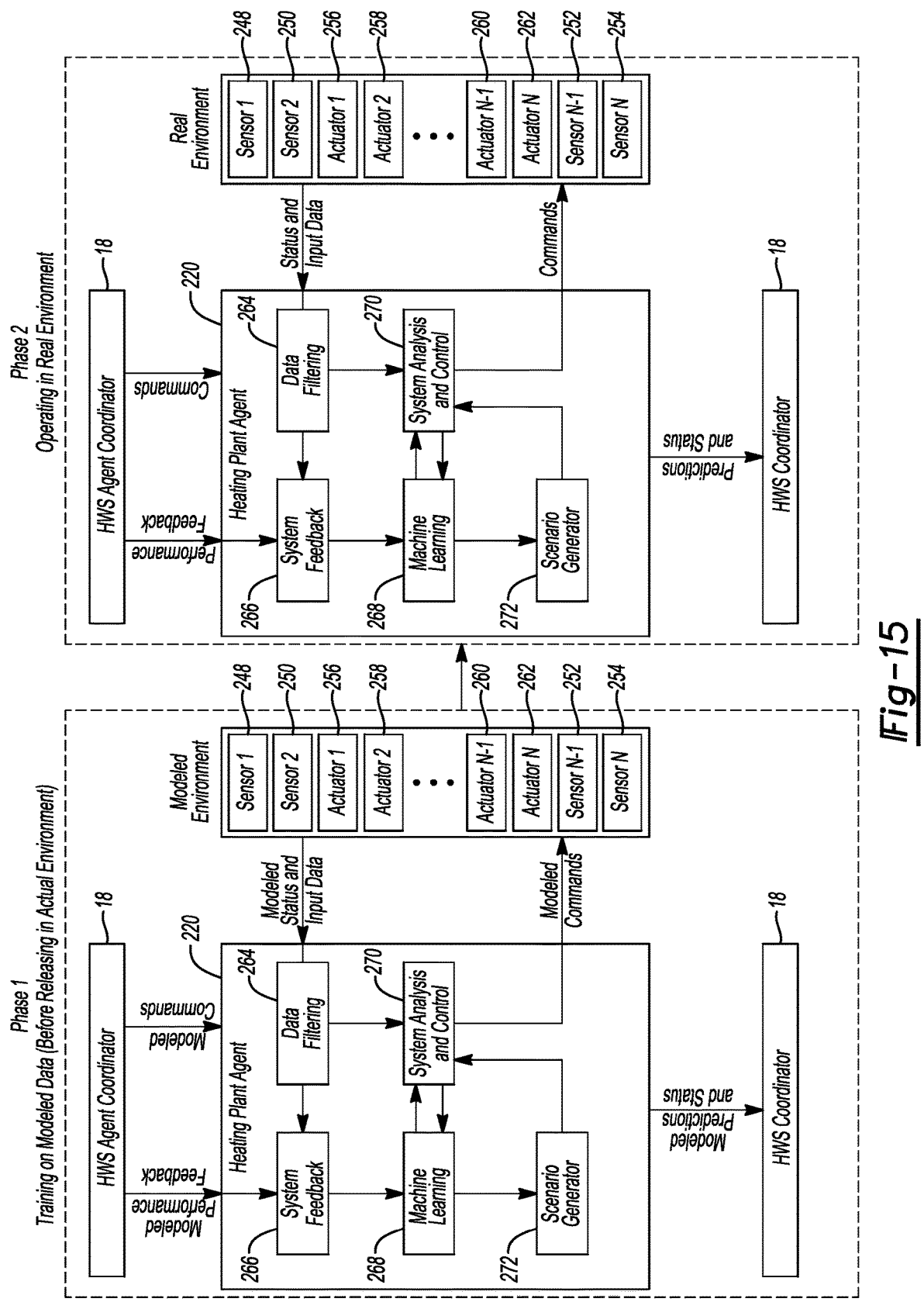
FIG. 15 shows the internal structure of the heating plant agent and its related environment.

As shown in FIG. 15 the internal structure of the heating plant agent 220 includes five modules: data filtering 264, system feedback 266, machine learning 268, system analysis and controls 270, and scenario generators 272. The environment for the heating plant agent 220 is comprised of all the sensors 248, 250, 252, 254 and actuators 256, 258, 260, 262 of the equipment that it monitors and controls. The sensors 248, 250, 252, 254 and actuators 256, 258, 260, 262 that are part of the heating plant agent's environment are connected directly to the network, without the use of proprietary controllers that operate with programmed sequences of operation. In some instances, an open source non-proprietary input/output module or a gateway may be required to convert the signal from a sensor or an actuator such that it can be communicated via open source networks such as BACnet, LONworks, Modbus etc.

The data filtering module 264 is responsible for separating the data received from the sensors 248, 250, 252, 254 and actuators 256, 258, 260, 262. For instance, the energy consumption levels of the hot water pumps (measured by the variable frequency drives (VFD)), actual heating hot water flows (measured by the associated flow meters), actual natural gas consumption (measured by the associated boiler natural gas flow meters), or the actual plant hot water return temperature may be sent to the system feedback module 266. Other data such as status and alarms may be sent to the system analysis and control module 270. The data filtering module 264 may also send to the system analysis and control module 270 the same data that was sent to the system feedback module 266.

The system feedback module 266 is tasked with the following:
  Collection of information from the various sensors 248, 250, 252, 254 and actuators 256, 258, 260, 262. The type of information that the system feedback module 266 may collect is described in the data filtering module 264.
  Analysis of predictions related to various temperatures (e.g. plant heating hot water leaving temperature, plant heating hot water return temperature, etc.). The data received from the various sensors 248, 250, 252, 254 and actuators 256, 258, 260, 262 will be compared against the predictions made by the machine learning module 268. Any large discrepancies between the predicted and measured values could mean that the previous commands could indicate that the difference in the error or accuracy of the predictions made by the machine learning module 268 and the actual outcome might have exceeded critical limits, which in turn has affected the overall energy and energy performance of the heating plant. The system feedback module 266 will then send the measured values to the machine learning module 268 such that the machine learning module 268 can update its internal learning algorithms.
  Collection of information from the hot water system coordinator 18. The information may represent feedback regarding the predictions that the heating plant agent 220 has made. For example, the heating plant 202 might deliver a certain heating hot water flow to the zones 206, 208, 210, 212, 214, 216, 218 or to the AHUs 204 in the same time its internal flow meters are confirming that the measured heating hot water flow is equal to or close to what was predicted. However, some Zones 206, 208, 210, 212, 214, 216, 218 or AHUs 204, as measured by their associated flow meters, might not receive sufficient heating hot water; this could be indication that the plant heating hot water flow meters are defective or that they may need recalibration.

The machine learning module 268 is tasked with the following:
  Collect information from the data filtering 264 and system analysis and control module 270.
  Predict the overall energy consumption of the entire heating plant or the total heating hot water flow that the heating plant agent 220 will need to deliver based on the data received from the system analysis and control module 270.
  Send the predictions back to the system analysis and control module 270 and to the scenario generator module 272.
  Predict heating energy consumption, leaving water temperature, water flows for each major component (e.g. boiler, pumps etc).

Using manufacturers rated boiler performance and boiler curves data as a training set, a machine learning algorithm may be trained to predict the boiler energy consumption at various system conditions (e.g. entering and leaving hot water temperatures, hot water flows etc.). Once released into the real environment, the machine learning module 268, via the feedback received from the system feedback module 266, may update its internal machine learning algorithms and related predictions to account for system effects and the measurement errors of the various sensors.

Pump data will also be updated similarly. Using pump laws and manufacturer's rated pump performance data as a training set, a machine learning algorithm may be trained to predict what the pump energy consumption will be at various system conditions, water flow, and pump head conditions. Once released into the environment, the machine learning module 268 will update its internal machine learning algorithms and related predictions (e.g. pump motor energy consumption, pump differential sensor pressure setpoints, etc.) based on the feedback received from the system feedback module 266.

Using an approach similar to the above, the machine learning module 268 may also use each individual component prediction as a data set and/or training set to make predictions for the energy consumption of the entire heating plant. For example, the machine learning module 268 may build a training set comprised of the plant heating hot water flow, plant entering heating hot water temperature, plant leaving heating hot water temperature, pump head and associated pump motor energy consumption. Once the training set is of useful size, the machine learning module 268 may use it to predict pump motor energy consumption on new data that is not a part of the training set.

The machine learning module 268 may use the training sets described above to operate the heating plant as efficiently as possible. The machine learning module 268 may predict the entering water temperatures, leaving water temperatures, hot water flow, quantity of boilers, quantity and speed of pumps required to operate to satisfy building loads based on the predictions received from the hot water system coordinator 18.

The system analysis and control module 270 is responsible for the following:
  Monitoring and control of all sensors and actuators related to the hot water system.
  Collection of information from the data filtering module 264. The type of information that this module will collect is described under the data filtering module 264.
  Analyzing the data from each sensor and actuator. For example, the system analysis and control module 270 may determine that a pump is no longer capable of running (e.g. the motor has burned out). As such, the system analysis and control module 270 may need to update its valid scenario (e.g. how many pumps need to operate and at what speed) to deliver the required amount of water flow to the zones.
  Sending the valid system scenarios to the machine learning module 268 for predictions.
  Receiving the predictions from the machine learning module 268 and sending commands to the various actuators. The commands that the system analysis and control module 270 may send to the actuators could be valve position, damper position or fan speed.

Analyzing the scenarios proposed by the scenario generator module 272. For each scenario received, the system analysis and control module 270 will analyze the status of the current sensors and actuators and will determine which scenario is valid.

The scenario generator module 272 is responsible for continuously looking for ways/scenarios to improve the overall energy performance of the heating system. For example, the scenario generator module 272 may create a series of scenarios which will then be sent to the system analysis and control module 270 to analyze and validate. Once the scenarios are validated, they may be sent to the machine learning module 268 to make predictions on. The predictions made by the machine learning module 268 will then be sent back to the scenario generator module 272 for analysis. After analyzing the predictions, the scenario generator module 272 may decide to send such predictions to the hot water system coordinator 18, which will then be sent to SMITHGROUP-AI 10, which in turn may direct the hot water system coordinator 18 to implement one of the scenarios created by scenario generator module 246 of the hot water system coordinator 18.

The scenario generator module 268 may create scenarios by varying the heating hot water flow and related temperatures through the boilers or by varying the number of operating pumps. Each such scenario will have an impact on both pump motor energy performance and boiler efficiency.

4. Sample Process

A sample process through which the hot water system coordinator 18 makes predictions related to the overall heating hot water system energy consumption levels or heating hot water system flows and associated temperatures is discussed below.

- AHU system coordinators 20, 22 and zone agents 222, 224, 226, 228, 230, 232, 234 filter the predicted scenarios that are achievable within their own system. zone agents 222, 224, 226, 228, 230, 232, 234 may then send heating scenario setpoints (e.g. heating loads, entering water temperatures) to the hot water system coordinator 18, through the associated AHU system coordinator 18. This will be considered "raw data" for the hot water system coordinator 18.
- The hot water system coordinator 18 may group all scenarios by the entering water temperature, also known as the temperature the heating plant must provide. During this step, scenarios with temperatures that cannot satisfy all zones will be eliminated.
- The hot water system coordinator 18 will create each scenario that could occur at the same time. For instance, zones 1, 2, 3, 4, and 5 must have the same supply air temperature (SAT) as it will be served by the same air handling unit. The hot water system coordinator 18 will create these grouped scenarios and assign a hot water system ID to each one.
- The hot water system coordinator 18 will summarize all grouped scenarios and may predict the overall heating hot water system flow and heating hot water plant return temperature associated with each scenario. These predictions may then be sent to the heating plant agent 220. The heating plant agent 220 will then make predictions on the heating plant energy consumption for each scenario and will send these predictions back to the hot water system coordinator 18.
- The hot water system coordinator 18 may then predict the overall heating hot water system energy consumption levels for each scenario and may send these predictions to SMITHGROUP-AI 10. See SMITHGROUP-AI narrative for additional information.

In further detail, each zone agent creates a series of scenarios associated with the zone that it is serving and sends these scenarios to a system coordinator (e.g. hot water system coordinator 18). These scenarios are given a unique ID number (Table 6 below) based on a specific airflow supply air temperature (SAT) and a specific entering water temperature (EWT).

TABLE 6

| Zone Prediction ID | Supply Air Temperature SAT [° F.] | Heating Coil Load Btu/hr | EWT [° F.] | LWT [° F.] | GPM |
|---|---|---|---|---|---|
| Agent_1-3_10 | 52 | 7500 | 100 | 153 | 2.14 |
| Agent_2-3_10 | 52 | 12500 | 160 | 153 | 3.57 |
| Agent_3-3_10 | 52 | 6000 | 160 | 153 | 1.71 |
| Agent_4-3_10 | 52 | 15000 | 160 | 153 | 4.29 |
| Agent_5-3_10 | 52 | 9800 | 160 | 153 | 2.80 |
| Agent_1-4_10 | 53 | 5000 | 160 | 153 | 1.43 |
| Agent_2-4_10 | 53 | 11000 | 160 | 153 | 3.14 |
| Agent_3-4_10 | 53 | 5500 | 160 | 153 | 1.57 |
| Agent_4-4_10 | 53 | 13000 | 160 | 153 | 3.71 |
| Agent_5-4_10 | 53 | 9200 | 160 | 153 | 2.63 |

Each system agent that serves a system that uses hot water creates a series of scenarios associated with the system that it is serving and sends these scenarios to a system coordinator (e.g. hot water system coordinator 18). These scenarios are given a unique ID number based on a specific airflow supply air temperature (SAT) and a specific entering water temperature (EWT).

The hot water system coordinator then filters the scenarios that it receives (Table 7 below). The filtering process is intended to eliminate scenarios that are not valid for the hot water system at a point in time. For example, an agent may accept a certain cooler hot water temperature (e.g. 155° F. or below), however due to various system conditions, the heating water plant may not be able to achieve such a cooler hot water temperature. This will render the associated scenarios as invalid.

TABLE 7

| Zone Prediction | Supply Air Temperature SAT [° F.] | Heating Coil Load Btu/hr | EWT [° F.] | LWT [° F.] | GPM |
|---|---|---|---|---|---|
| Agent_1-3_10 | 52 | 7500 | 160 | 153 | 2.14 |
| Agent_2-3_10 | 52 | 12500 | 160 | 153 | 3.57 |
| Agent_3-3_10 | 52 | 6000 | 160 | 153 | 1.71 |
| Agent_4-3_6 | 52 | 15000 | 140 | 132 | 3.75 |
| Agent_5-3_6 | 52 | 9800 | 140 | 132 | 2.45 |
| Agent_1-4_6 | 53 | 5000 | 140 | 133 | 1.43 |

The hot water system coordinator 18 will then start creating combinations of agent scenarios (Table 8 below). Each combination of scenarios is then given a unique ID number (e.g. HWS_160-1). For each combination of agent scenarios there is a corresponding set of hot water plant conditions that need to be achieved (e.g. total heating load, entering water temperature (EWT), leaving water temperature (LWT)m and hot water flow (in GPM)).

TABLE 8

| Zone Prediction ID | Hot Water System ID | Supply Air Temperature SAT [° F.] | Heating Coil Load Btu/hr | EWT [° F.] | LWT [° F.] | GPM |
|---|---|---|---|---|---|---|
| Agent_1-3_10 | HWS_160-1 | 52 | 7500 | 160 | 153 | 2.14 |
| Agent_2-3_10 | | 52 | 12500 | 160 | 153 | 3.57 |
| Agent_3-3_10 | | 52 | 6000 | 160 | 153 | 1.71 |
| Agent_4-3_10 | | 52 | 15000 | 160 | 153 | 4.29 |
| Agent_5-3_10 | | 52 | 9800 | 160 | 153 | 2.80 |
| Zone_6-1_3 | | 80 | 2100 | 160 | 150 | 0.42 |
| Zone_7-1_1 | | 84 | 1100 | 160 | 155 | 0.44 |
| | Total | | 54000 | 160 | 153.0 | 15.37 |

The hot water system coordinator 18 then makes hot water system energy consumptions predictions for each combination of agent scenarios (Table 9 below).

TABLE 9

| | RECEIVED DATA | | | | PREDICTION |
|---|---|---|---|---|---|
| Hot Water System ID | Heating Coil Load Btu/hr | EWT [° F.] | LWT [° F.] | GPM | Energy Consumption [kWh] |
| HWS_160-1 | 54000 | 160 | 153.0 | 15.37 | |
| HWS_160-2 | 46900 | 160 | 153.0 | 13.35 | |
| HWS_160-3 | 41900 | 160 | 152.8 | 7.90 | |
| HWS_160-4 | 36200 | 160 | 153.0 | 7.46 | |
| HWS_160-5 | 54300 | 160 | 153.0 | 15.45 | |
| HWS_160-6 | 54400 | 160 | 152.8 | 15.19 | |
| HWS_160-7 | 54400 | 160 | 153.0 | 15.45 | |
| HWS_160-8 | 54500 | 150 | 153.0 | 15.49 | |
| HWS_160-9 | 54600 | 160 | 152.8 | 15.23 | |
| HWS_180-10 | 36200 | 180 | 174.0 | 12.04 | |
| HWS_180-11 | 36400 | 180 | 174.0 | 12.12 | |
| HWS_180-12 | 36600 | 180 | 174.0 | 12.2 | |

F. Chilled Water System

1. General Description

Figure 16:
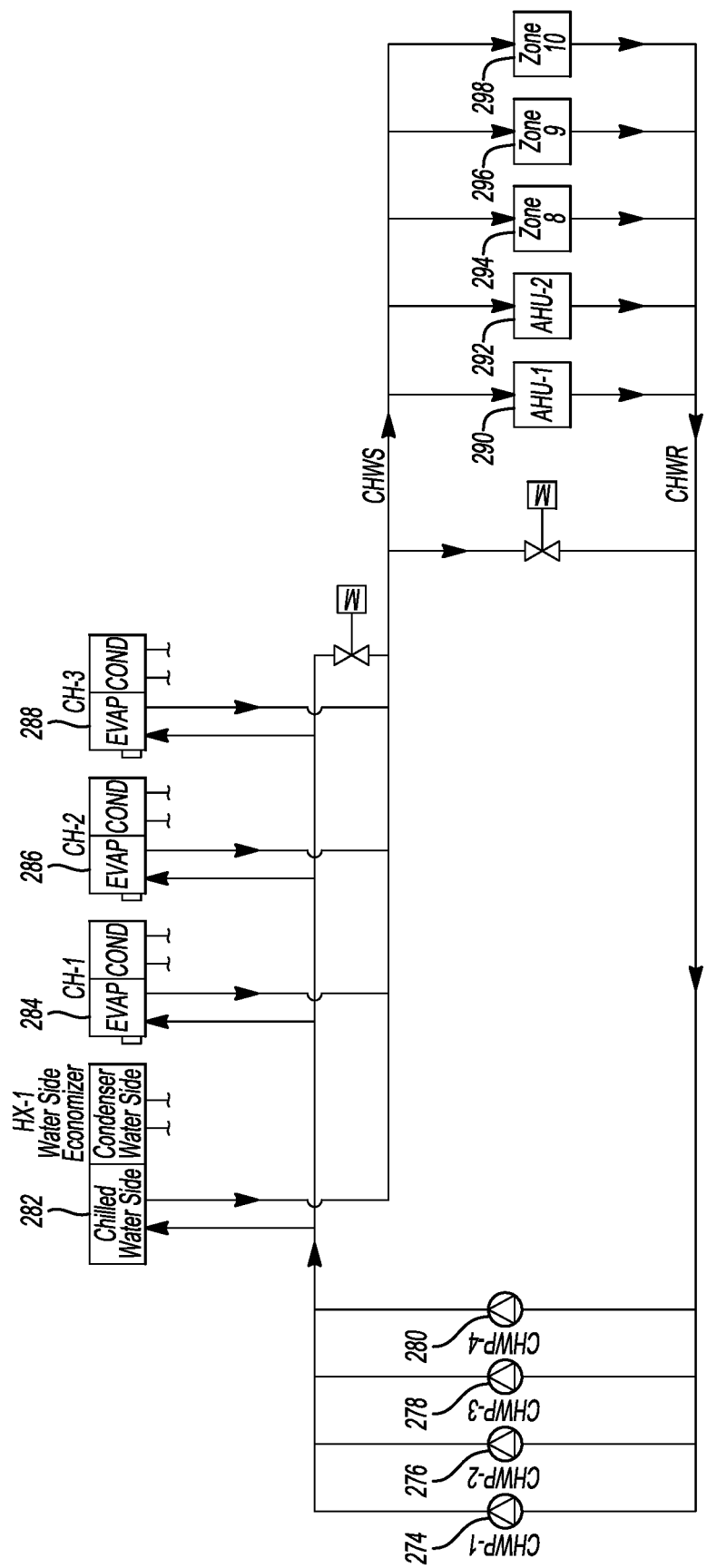
FIG. 16 shows a chilled water system including four chilled water pumps, pumped in parallel, one waterside economizer heat exchanger, and three chillers.

Referring to FIG. 16, a chilled water system is shown consisting of four chilled water pumps 274, 276, 278, 280, pumped in parallel, one waterside economizer heat exchanger 282, and three chillers 284, 286, 288. The distribution piping system consists of two air handling units 290, 292 and three thermal zones 294, 296, 298 with chilled water coils.

The control of the entire chilled water system is performed through a series of independent software agents such as the chilled water system coordinator 16, chilled water plant agent 300, and zone agents 302, 304, 306.

2. Chilled Water System Coordinator a. Purpose

Figure 17:
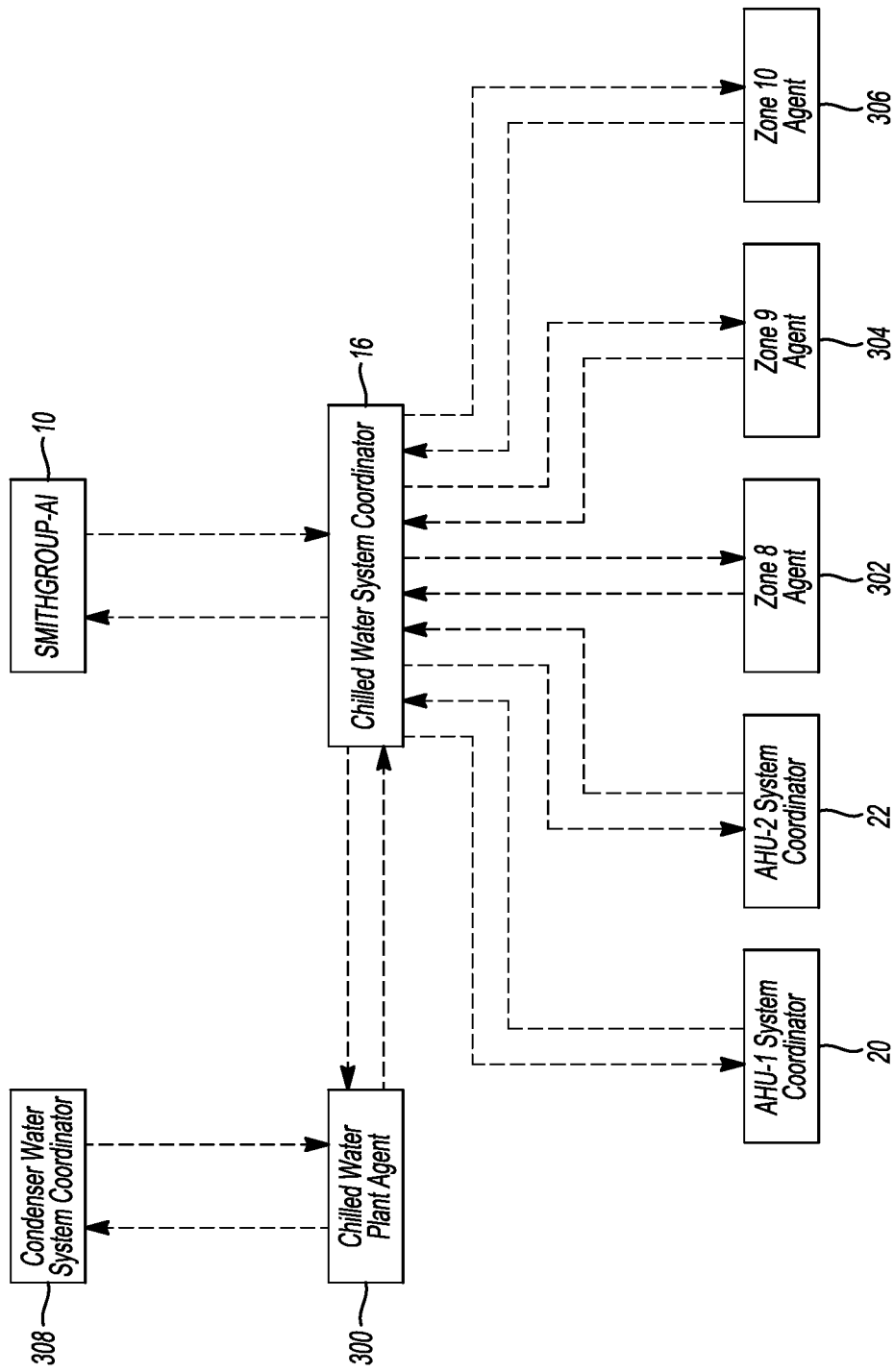
FIG. 17 shows the communication architecture between the various chilled water system agents.

The chilled water system coordinator 16 is an independent software agent that monitors and controls all agents associated with the chilled water system. FIG. 17 shows the communication architecture between the various chilled water system agents.

The chilled water system coordinator 16 is responsible for, but not limited to, the following:

Satisfy and maintain all building cooling load requirements.

Optimize chilled water system energy usage.

Predict energy use of the entire chilled water system.

Communication with SMITHGROUP-AI 10. It sends overall chilled water system energy use predictions and receives commands from SMITHGROUP-AI 10.

Communication with the chilled water plant agent 300. It requests energy consumption predictions and status from the chilled water plant agent 300 and sends predictions (e.g. total chilled water system water flow, chilled water supply temperature, chilled water return temperature) such that the chilled water plant agent 300 can make associated predictions related to the energy performance of the chilled water plant.

Further, the chilled water system coordinator 16, by analyzing the cooling load, water flow and temperature predictions received from the various zone agents 304, 306, 308 and AHU system coordinators 20, 22, may predict that the chillers are not required to be enabled and that the cooling coils from each AHU 290, 292 may be used to reject the heat absorbed by the chilled water system from the various zones 294, 296, 298. The chilled water system coordinator 16 will then send these predictions to SMITH-GROUP-AI 10. For example, by analyzing the predictions from each zone agent 302, 304, 306 and AHU system coordinator 20, 22, the chilled water system coordinator 16 may determine that a 65° F. temperature will be sufficient to satisfy all cooling loads, without requiring the use of a chiller to cool the water. This can be accomplished by using the chilled water coils from the AHU 290, 292 as heating coils. The energy absorbed by the chilled water coils serving the zone agents 302, 304, 306 is transferred to the airstream within each AHU 290, 292 via its associated chilled water coils. Similarly, the chilled water system coordinator 16, by analyzing the cooling load, water flow and temperature predictions received from the various zone agents 302, 304, 306 and AHU system coordinators 20, 22, may predict that the chillers are only partially required to cool the chilled water.

b. Internal Structure

Figure 18:
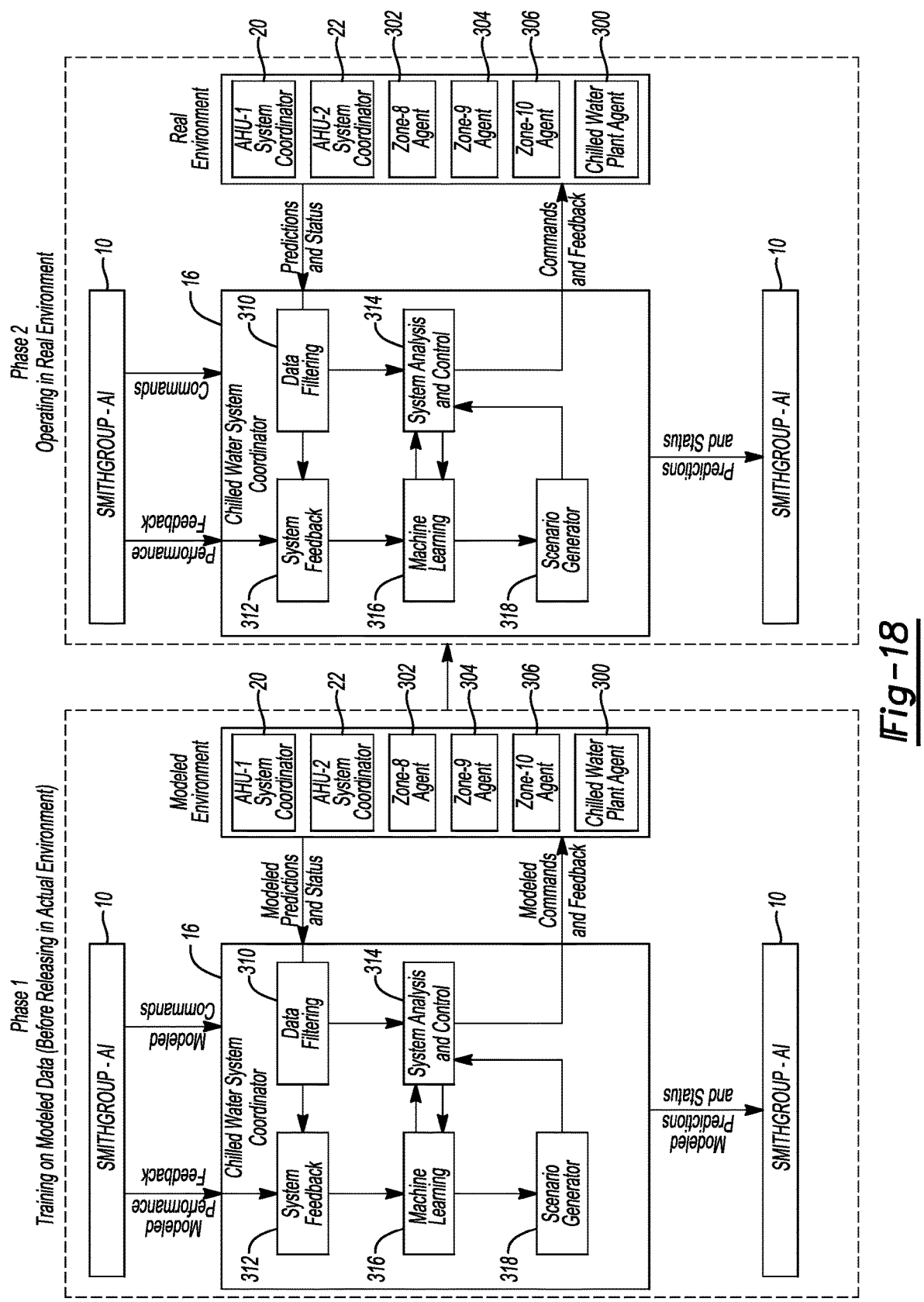
FIG. 18 shows the internal structure of the chilled water system coordinator and its related environment.

Referring to FIG. 18, the internal structure of the CHWS coordinator 16 and its related environment is shown. The environment for the chilled water system coordinator 16 consists of all the agents that it monitors and controls. The agents that the chilled water system coordinator 16 controls are all zones/AHUs that contain a chilled water coil and require chilled water from the chilled water system 16. For example, two air handling unit agents 20, 22 and three zone agents 302, 304, 306 are shown. The agent is comprised of five modules, each with dedicated algorithms and control logic.

The data filtering module 310 is responsible for separating the data received from the various associated agents 20, 22, 302, 304, 306. For example, the actual agent energy consumption levels or actual agent chilled water flow may be sent to the system feedback module 312, while predictions from the agents will be sent to the system analysis and control module 314.

The system feedback module 312 is responsible for the following:

Collection of information from the zone agents 302, 304, 306 and the chilled water plant agent 300; the information may represent status (e.g. failed, maintenance), or actual agent energy consumptions levels from the various agents. A failed status may indicate that a zone agent 302, 304, 306 may no longer control its environment and should be excluded from the overall condenser water system predictions that the machine learning module 316 is making. A maintenance status may indicate that a zone agent 302, 304, 306 has entered or may enter into a maintenance mode and that the machine learning module 316 needs to update its overall chilled water system predictions accordingly. The information may also represent predictions related to the energy consumption levels of each agent 300, 302, 304, 306.

Analysis of predictions related to the total chilled water flow. The actual chilled water flow from the various agents 300, 302, 304, 306 will be compared against their own predictions but also against the predictions made by the machine learning module 316. Any large discrepancies between the predicted and actual chilled water flows could mean that the previous command that a zone agent 302, 304, 306 or the chilled water plant agent 300 received from the chilled water system coordinator 310 has placed an agent in conflict with its own internal laws (e.g. not able to meet the various zone thermal requirements or expected chilled water system flow). This could indicate that the difference in the error or accuracy of the predictions made by the machine learning module 316 and the actual outcome might have exceeded critical limits, which in turn has affected the overall energy and thermal performance of the chilled water system. The system feedback module 312 will then send the actual chilled water flows to the machine learning module 316 such that the machine learning module 316 can update its internal learning algorithms.

Collection of information from SMITHGROUP-AI 10. The information may represent commands that need to be distributed to the various associated agents. The information may also represent feedback regarding the predictions that the chilled water system coordinator 16 has made. For example, the predicted energy performance of the scenario that SMITHGROUP-AI 10 has directed the chilled water system coordinator 310 to implement is significantly different that the real outcome. As such the system feedback module 312 will pass this feedback to the machine learning module 316 to update its machine learning algorithms accordingly such that the accuracy or error of its predictions self-improves.

The machine learning module 316 is responsible for the following:

Collection of information from the system feedback module 312. The type of information that this module will collect is described under the system feedback module 312.

Collection of information from the system analysis and control module 314. This information may represent predictions from zone agents 302, 304, 306 and chilled water plant agent 300 regarding chilled water flows, temperatures, etc.

Making predictions, using machine learning algorithms, based on the data received from the system analysis and control module 314, for the overall energy consumption of the entire chilled water system or for the total chilled water flow that chilled water plant agent 300 will need to deliver.

Sending the predictions to the system analysis and control module 314 and to the scenario generator module 318.

The system analysis and control module 314 is responsible for the following:

Collection of information from the data filtering module 310. The type of information that this module will collect is described under the data filtering module 310.

Analyzing the data from each agent, and filtering and compiling the data into valid system scenarios.

Sending the valid system scenarios to the machine learning module 316 for predictions.

Receiving the predictions from the machine learning module 316 and sending commands to the various agents. The commands that the system analysis and control module 314 may send to the agents could be chilled water flows and associated temperatures or requests for predictions.

Analyzing the scenarios proposed by the scenario generator module 318. For each scenario received, the system analysis and control module 314 may decide to direct the various agents to make predictions and then compile these predictions into valid system scenarios for the machine learning module 316 to make predictions on.

The scenario generator module 318 is responsible for continuously looking for ways to improve the overall energy performance of the entire chilled water system. For example, the scenario generator module 318 may create a series of scenarios which will then be sent to the system analysis and control module 314 to analyze and validate. The system analysis and control module 314 may ask the associated agents to make predictions on the scenarios. Once the scenarios are validated, they may be sent to the machine learning module 316 to make predictions on. The predictions made by the machine learning module 316 will then be sent back to the scenario generator 314 module for analysis. After analyzing the predictions, the scenario generator module 318 may decide to send such predictions to SMITHGROUP-AI 10, which in turn may direct the chilled water system coordinator 16 to implement one of the scenarios created by the scenario generator module 318.

The scenario generator module 318 may create scenarios by modelling the chilled water plant agent 300 as delivering various chilled water flows and associated temperatures, by modelling the zone agents 302, 304, 306 or AHU agents as satisfying their load conditions under various conditions, or by modelling the condenser water plant equipment as being able to support the chillers to generate such chilled water flows and associated temperatures.

3. Chilled Water Plant Agent a. Purpose

The chilled water plant agent 300 is an independent software agent that monitors and controls the equipment in the chilled water plant equipment (e.g. chillers, water side economizer, chilled water pumps) as energy efficient as possible while satisfying all cooling load requirements. Further, the chilled water plant agent 300 is responsible for the following:

a. Prediction of the energy use of the entire chilled water plant.

b. Prediction of the chillers' energy consumption.

c. Prediction of the chilled water pumps energy consumption.

d. Prediction of the water pressure drop through each of the chilled water system piping components (e.g. control valve, heat exchanger, coil).
e. Communication with the chilled water system coordinator 16. It receives valid scenario predictions (e.g. total chilled water coil loads, chilled water supply temperature, chilled water return temperature, total chilled water flow) such that the chilled water plant agent 300 can make associated energy predictions to send back to the chilled water system coordinator 16.
f. Communication with the condenser water coordinator 308. The type of information that the chilled water plant agent 300 may communicate with the condenser water system coordinator 308 may represent valid scenarios or conditions (e.g., minimum and maximum condenser water return temperature, minimum and maximum condenser water supply temperature, minimum and maximum condenser water flow) that the chilled water plant agent 300 needs to account for when making its own energy consumption predictions. Other information that the condenser water system coordinator 308 may communicate with the chilled water plant agent 300 are predictions related to the condenser water flow, and condenser water return temperature associated with each piece of equipment that is a part of the chilled water plant (e.g. chiller, water side economizer).

b. Internal Structure

Figure 19:
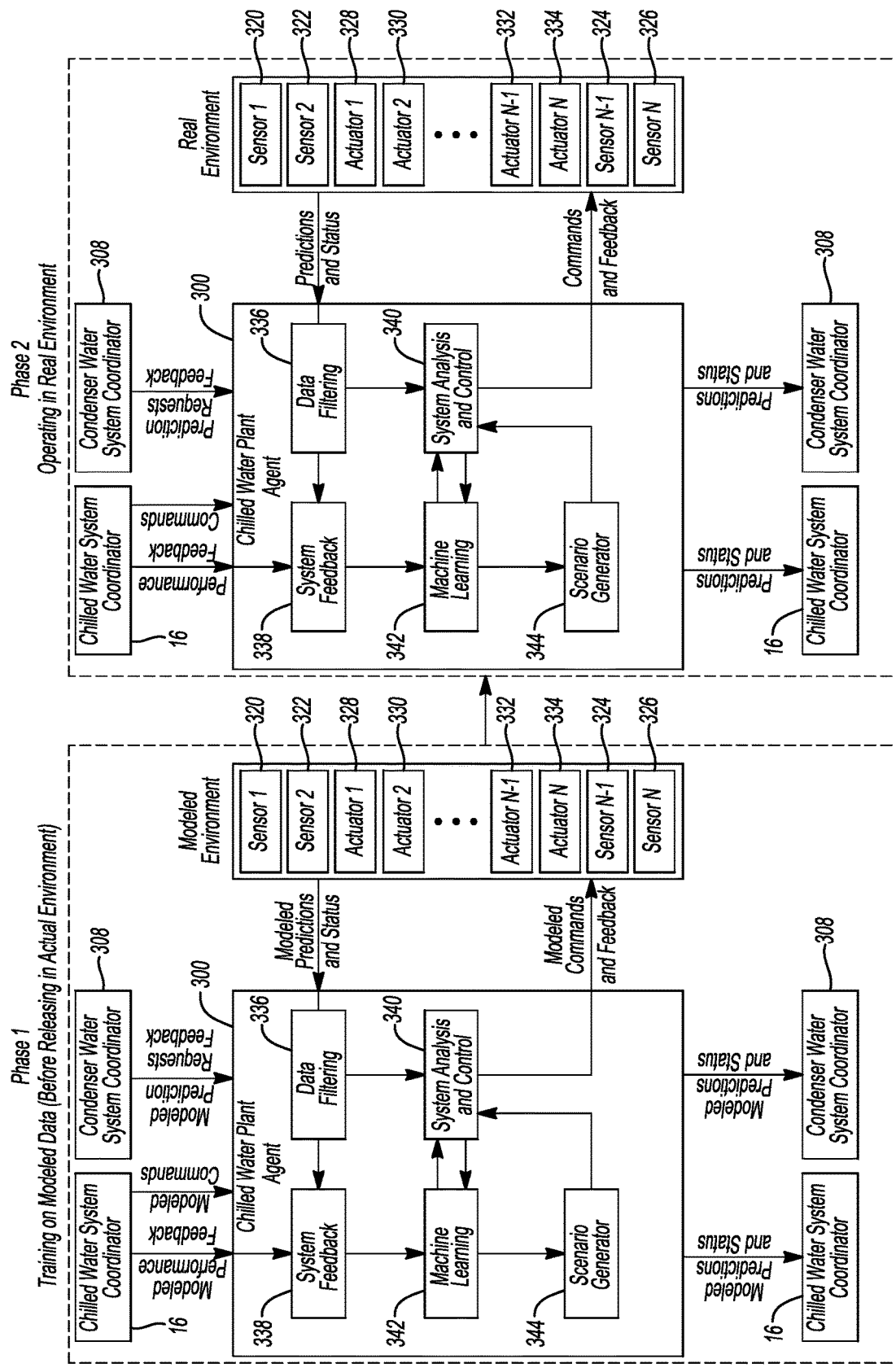
FIG. 19 shows the internal structure of the chilled water plant agent and its related environment.

Referring to FIG. 19, the internal structure of the chilled water plant agent 300 and its related environment is shown. The environment for the chilled water system agent 300 is comprised of all the sensors 320, 322, 324, 326 and actuators 328, 330, 332, 334 of the equipment that it monitors and controls. Sensors 320, 322, 324, 326 and actuators 328, 330, 332, 334 that are part of the chilled water system agent's environment are connected directly to the network, without the use of proprietary controllers that operate with programmed sequences of operation. In some instances, an open source non-proprietary input/output module or a gateway may be required to convert the signal from a sensor or an actuator such that it can be communicated via open source networks such as BACnet, LONworks, Modbus, etc. The agent 300 is comprised of five modules, each with its own dedicated algorithms and controls logic.

The data filtering module 336 is responsible for separating the data received from sensors 320, 322, 324, 326 and actuators 328, 330, 332, 334. For example, the actual energy consumption levels of the chillers and pumps (measured by their related variable frequency drives (VFDs)), actual pump water flows (measured by the associated flow meters) or various temperatures will be sent to the system feedback module 338, while data from other various sensors 320, 322, 324, 326 and actuators (e.g. temperatures, status, valve position, differential pressures etc.) 328, 330, 332, 334 will be sent to the system analysis and control module 340.

The system feedback module 338 is responsible for the following:

Collection of information from the various sensors 320, 322, 324, 326 and actuators 328, 330, 332, 334. The type of information that the system feedback module 338 may collect is described in the data filtering module 336.

Analysis of predictions related to various water temperatures and flows (e.g. entering and leaving chilled water temperatures, entering and leaving condenser water temperatures, chilled water flow, condenser water flow, etc.). The data received from the various sensors 320, 322, 324, 326 and actuators 328, 330, 332, 334 will be compared against the predictions made by the machine learning module 342. Any large discrepancies between the predicted and measured values could mean that the previous commands could indicate that the difference in the error or accuracy of the predictions made by the machine learning module 342 and the actual outcome might have exceeded critical limits, which in turn has affected the overall energy and energy performance of the chilled water system. The system feedback module 338 will then send the measured values to the machine learning module 342 such that the machine learning module 342 can update its internal learning algorithms.

Collection of information from the chilled water system coordinator 16. The information may represent feedback regarding the predictions that the chilled water plant agent 300 has made. For example, the chilled water plant might deliver a certain chilled water flow to the zones 294, 296, 298 or to the AHUs 290, 292 in the same time its internal flow meters are confirming that the measured chilled water flow is equal to or close to what was predicted. However, some zones 294, 296, 298 or AHUs 290, 292, as measured by their associated flow meters, might not receive sufficient chilled water. This could be indication that the chilled water flow meters within the chilled water plant are defective or that they may need recalibration.

The machine learning module 342 is responsible for the following:

Collection of information from the system feedback module 338. The type of information that this module will collect is described under the system feedback module 338.

Collection of information from the system analysis and control module 340. This information may represent data from the various sensors 320, 322, 324, 326 and actuators 328, 330, 332, 334, such as water flows and temperatures.

Making predictions, using machine learning algorithms, based on the data received from the system analysis and control module 340 or from the system feedback module 338.

Sending the predictions to the system analysis and control module 340 and to the scenario generator module 344.

Using manufacturers rated chiller performance and chiller curves data as a training set, a machine learning algorithm may be trained to predict the chiller energy consumption at various system conditions (e.g. entering and leaving chilled water temperatures, entering and leaving condenser water temperatures, chiller water flows, condenser water flows etc.). Once released into the real environment, the machine learning module 342, via the feedback received from the system feedback module 338, may update its internal machine learning algorithms and related predictions to account for system effects and the measurement errors of the various sensors.

Similarly, using pump laws and manufacturer's rated pump performance data as a training set, a machine learning algorithm may be trained to predict the chilled water pump energy consumption at various system conditions, water flow, and pump head conditions. Once released into the real environment, the machine learning module 342, via the feedback received from the system feedback module 338, may update its internal machine learning algorithms and related predictions (e.g. pump motor energy consumption, pump differential sensor pressure setpoints etc.) to account for system effects and the measurement errors of the various sensors.

Using an approach like the above, the machine learning module 342 may also use each individual component prediction as a data set and/or training set to make predictions for the energy consumption of the entire chilled water plant. For example, the machine learning module 342 may build a training set comprised of the plant chilled water flow, plant entering chilled water temperature, plant leaving chilled water temperature, and pump head and associated pump motor energy consumption. Once the training set is of useful size, the machine learning module 342 may use it to predict pump motor energy consumption on new data that is not a part of the training set.

The machine learning module 342 will use the training sets described above to operate the chilled water plant as efficiently as possible. The machine learning module 342 may predict the entering water temperatures, leaving water temperatures, chilled water flow, quantity of chillers, and quantity and speed of chilled water pumps that are required to operate to satisfy building loads based on the predictions received from the chilled water system coordinator 16.

The system analysis and control module 340 is responsible for the following:
- Monitoring and control of all sensors and actuators related to the chilled water system.
- Collection of information from the data filtering module 336. The type of information that this module will collect is described under the data filtering module 336.
- Analyzing the data from each sensor and actuator. For example, the system analysis and control module 340 may determine that a pump is no longer capable of running (e.g. the motor has burned out). As such, the system analysis and control module 340 may need to update its valid scenario (e.g. how many pumps need to operate and at what speed) to deliver the required amount of water flow to the zones 294, 296, 298.
- Sending the valid system scenarios to the machine learning module 342 for predictions.
- Receiving the predictions from the machine learning module 342 and sending commands to the various actuators 328, 330, 332, 334. The commands that the system analysis and control module 340 may send to the actuators 328, 330, 332, 334 could be valve position or damper position or pump speed.
- Analyzing the scenarios proposed by the scenario generator module 344. For each scenario received, the system analysis and control module 340 will analyze the status of the current sensors 320, 322, 324, 326 and actuators 328, 330, 332, 334 and will determine which scenario is valid. For example, one of the scenarios that the scenario generator module 344 may generate will require the chilled water plant to deliver 1,000 GPM to the chiller. The system analysis and control module 340 may determine that, due to a pump failure, such scenario is no longer valid and that the machine learning module 342 will not make a prediction on the referenced scenario.

The scenario generator module 344 is responsible for continuously looking for ways/scenarios to improve the overall energy performance of the chilled water plant. For example, the scenario generator module 344 may create a series of scenarios which will then be sent to the system analysis and control module 340 to analyze and validate. Once the scenarios are validated, they may be sent to the machine learning module 342 to make predictions on. The predictions made by the machine learning module 342 will then be sent back to the scenario generator module 344 for analysis. After analyzing the predictions, the scenario generator module 344 may decide to send such predictions to the chilled water system coordinator 16, which will then be sent to SMITHGROUP-AI 10, which in turn may direct the chilled water system coordinator 16 to implement one of the scenarios created by the chilled water system scenario generator module 344. The scenario generator module 344 may create scenarios by varying the chilled water flow and related temperatures to the chillers. Each such scenario will have an impact on both pump motor energy performance and chiller efficiency.

4. Sample Process

Each AHU coordinator 290, 292 and zone agent 294, 296, 298 comprised in the chilled water system coordinator's environment will send a series of predictions and status information. Predictions that the chilled water system coordinator 16 will receive may include the cooling coil load, entering and leaving water temperatures, and various GPMs that the zone agents 302, 304, 306 or AHU agents could use to satisfy its zone requirements. The system analysis and control module 314 will first compile all predictions received from the zone agents 302, 304, 306 and AHU agents. The system analysis and control module 314 will then eliminate all predictions that will make other agents incapable of meeting their internal laws. For example, all scenarios with EWT greater than 46° F. can be eliminated because AHU-1 290 and AHU-2 292 cannot satisfy load requirements with these water temperatures. The system analysis and control module 314 will then compile and sort all remaining predictions based on a common chilled water coil entering water temperature.

The system analysis and control module 314 will then generate all possible combinations of entering water temperatures and total GPMs and summarize scenarios to be sent to the chilled water system agent 300. The chilled water plant agent 300 will then determine the most efficient operating scenarios and predict condenser water entering and leaving water temperatures and condenser water flow. The chilled water agent 300 will send these predictions to be validated by the condenser water system coordinator 16. Once validated, the chilled water plant agent 300 will then send the final validated scenarios to the chilled water system coordinator 16 which will then send them to SMITHGROUP-AI 10.

In more detail, each zone agent creates a series of scenarios associated with the zone that it is serving and sends these scenarios to a system coordinator (e.g. chilled water system coordinator 16). These scenarios are given a unique ID number (Table 10 below) based on a specific airflow supply air temperature (SAT) and a specific entering water temperature (EWT).

TABLE 10

Zone Agent-9 AGENT PREDICTIONS
Data Provided by the Zone Agent

| Zone Prediction ID | Supply Air Temperature SAT [° F.] | Cooling Coil Load Btu/hr | EWT [° F.] | LWT [° F.] | GPM | Energy Predictions KWh |
|---|---|---|---|---|---|---|
| Agent_9-1-1 | 50 | 24000 | 36 | 44 | 6.00 | 0.4 |
| Agent_9-1-2 | 50 | 24000 | 38 | 49 | 4.36 | 0.4 |
| Agent_9-1-3 | 50 | 24000 | 40 | 47 | 6.86 | 0.4 |
| Agent_9-2-1 | 52 | 21000 | 36 | 48 | 3.50 | 0.6 |
| Agent_9-2-2 | 52 | 21000 | 38 | 53 | 2.80 | 0.6 |
| Agent_9-2-3 | 52 | 21000 | 40 | 51 | 3.82 | 0.6 |

Similarly, each system agent, creates a series of scenarios associated with the system that it is serving and sends these scenarios to a system coordinator (e.g. chilled water system coordinator 16). These scenarios are given a unique ID number (Table 11 below) based on a specific airflow supply air temperature (SAT) and a specific entering water temperature (EWT).

TABLE 11

AHU-1 AGENT PREDICTIONS
Data Provided by the AHU System Coordinator

| AHU System Prediction ID | Supply Air Temperature SAT [° F.] | Cooling Coil Load Btu/hr | EWT [° F.] | LWT [° F.] | GPM |
|---|---|---|---|---|---|
| AHU_1-1-3 | 52 | 114480 | 40 | 55 | 15 |
| AHU_1-1-4 | 52 | 114480 | 42 | 54 | 19 |
| AHU_1-1-5 | 52 | 114480 | 44 | 51 | 33 |
| AHU_1-1-6 | 52 | 114480 | 46 | 56 | 23 |
| AHU_1-2-3 | 54 | 116964 | 40 | 48 | 29 |
| AHU_1-2-4 | 54 | 116964 | 42 | 53 | 21 |
| AHU_1-2-5 | 54 | 116964 | 44 | 55 | 21 |

The chilled water system coordinator then filters the scenarios that it receives (Table 12 below). The filtering process is intended to eliminate scenarios that are not valid for the chilled water system at a point in time. For example, an agent may accept a certain low chilled water temperature (e.g. 38° F. or below), however due to outside air temperature conditions, the chilled water plant may not be able to achieve such low chilled water temperature. This will render the associated scenarios as invalid (as indicated in bold).

TABLE 12

Zone Agent-9 AGENT PREDICTIONS
Data Provided by the Zone Agent

| Zone Prediction ID | Supply Air Temperature SAT [° F.] | Cooling Coil Load Btu/hr | EWT [° F.] | LWT [° F.] | GPM | Energy Predictions KWh |
|---|---|---|---|---|---|---|
| Agent_9-1-1 | 50 | 24000 | 36 | 44 | 6.00 | 0.4 |
| Agent_9-1-2 | 50 | 24000 | 38 | 49 | 4.36 | 0.4 |
| Agent_9-1-3 | 50 | 24000 | 40 | 47 | 6.86 | 0.4 |
| Agent_9-2-1 | 52 | 21000 | 36 | 48 | 3.50 | 0.6 |

TABLE 12-continued

Zone Agent-9 AGENT PREDICTIONS
Data Provided by the Zone Agent

| Zone Prediction ID | Supply Air Temperature SAT [° F.] | Cooling Coil Load Btu/hr | EWT [° F.] | LWT [° F.] | GPM | Energy Predictions KWh |
|---|---|---|---|---|---|---|
| Agent_9-2-2 | 52 | 21000 | 38 | 53 | 2.80 | 0.6 |
| Agent_9-2-3 | 52 | 21000 | 40 | 51 | 3.82 | 0.6 |

After the filtering process is complete, the chilled water system coordinator 16 compiles all valid scenarios (Table 13 below) that will be used to predict the energy consumption of the chilled water system. It then sorts these scenarios based on a common chilled water temperature (e.g. 40° F.).

TABLE 13

CHILLED WATER SYSTEM AGENT PREDICTIONS

| AHU System Prediction ID | Supply Air Temperature SAT [° F.] | Cooling Coil Load Btu/hr | EWT [° F.] | LWT [° F.] | GPM |
|---|---|---|---|---|---|
| AHU_1-1-3 | 52 | 114480 | 40 | 55 | 15.26 |
| AHU_1-2-3 | 54 | 116964 | 40 | 48 | 29.24 |
| AHU_1-3-3 | 56 | 134136 | 40 | 46 | 44.71 |
| AHU_2-1-3 | 50 | 240000 | 40 | 54 | 34.29 |
| AHU_2-2-3 | 52 | 180000 | 40 | 47 | 51.43 |
| AHU_2-3-3 | 54 | 120000 | 40 | 51 | 21.82 |
| Agent_8-1-3 | 50 | 15000 | 40 | 55 | 2.00 |
| Agent_8-2-3 | 52 | 12000 | 40 | 47 | 3.43 |
| Agent_8-3-3 | 54 | 10000 | 40 | 51 | 1.82 |
| Agent_8-4-3 | 56 | 8000 | 40 | 50 | 1.60 |
| Agent_9-1-3 | 50 | 24000 | 40 | 47 | 6.86 |
| Agent_9-2-3 | 52 | 21000 | 40 | 51 | 3.82 |
| Agent_9-3-3 | 54 | 18000 | 40 | 48 | 4.50 |
| Agent_9-4-3 | 56 | 15000 | 40 | 50 | 3.00 |

The chilled water system coordinator 16 will then start creating combinations of agent scenarios (Table 14 below). Each combination of scenarios is then given a unique ID number (e.g. CHWS_40-1). For each combination of agent scenarios there is a corresponding set of chilled water plant conditions that need to be achieved (e.g. total cooling load, entering water temperature (EWT), leaving water temperature (LWT) and chilled water flow (in GPM)).

TABLE 14

CHILLED WATER SYSTEM AGENT PREDICTIONS

| | System Identification Data | Predictions | | | | |
|---|---|---|---|---|---|---|
| AHU/Zone Prediction ID | Chilled Water System Predition ID | Supply Air Temperature SAT [° F.] | Cooling Coil Load Btu/hr | EWT [° F.] | LWT [° F.] | GPM |
| AHU_1-1-3 | CHWS_40-1 | 52 | 114480 | 40 | 55 | 15.26 |
| AHU_2-1-3 | | 50 | 240000 | 40 | 54 | 34.29 |
| Agent_8-4-3 | | 56 | 8000 | 40 | 50 | 1.60 |
| Agent_9-3-3 | | 54 | 18000 | 40 | 48 | 4.50 |
| Total | | | 380480 | 40 | 53.7 | 55.65 |

The chilled water system coordinator 16 then makes chilled water system energy consumptions predictions for each combination of agent scenarios (Table 15 below) and a unique set of condenser water system operating conditions.

TABLE 15

CHILLED WATER SYSTEM AGENT PREDICTIONS

| System Idenitification Data | | | | | | | | Predictions | | |
|---|---|---|---|---|---|---|---|---|---|---|
| | Chilled Water | | | | | | | | Energy Consumption | |
| | Cooling | | | | Condenser Water | | | CHWS Pump Energy | CHWS Energey | CHWS Total Energy |
| Chilled Water System Predition ID | Coil Load Btu/hr | EWT [° F.] | LWT [° F.] | GPM | EWT [° F.] | LWT [° F.] | GPM | Consumption KWh | Consumption KWh | Consumption KWh |
| CHWS_40-1-1 | 380480 | 40 | 53.7 | 55.65 | 85 | 97 | 63.4 | 25 | 324 | 349 |
| CHWS_40-1-2 | 380480 | 40 | 53.7 | 55.65 | 80 | 93 | 58.5 | 25 | 302 | 327 |
| CHWS_40-1-3 | 380480 | 40 | 53.7 | 55.65 | 75 | 88 | 58.5 | 25 | 278 | 303 |

The chilled water system energy consumptions predictions are then validated by the condenser water system coordinator 308 (e.g. Table 16 below). This filtering/validation process is required due to the fact that, even though the chilled water plant is able to meet the associated conditions (e.g. chilled water EWT, LWT, GPM, etc.), the condenser water system may not be able to provide/support the various condenser water system operating conditions (e.g. condenser water EWT, LWT, GPM, etc.). For example, if the outside air temperature is about 95° F., the condenser water system may not be able to achieve a LWT of 80° F. or below.

waterside economizer 374) and to four other zones that require condenser water. The control of the entire condenser water system is performed through the condenser water system coordinator 16, chilled water plant agent 300, condenser water plant agent 376, and zone agents 378, 380, 384, 386.

Figure 21:
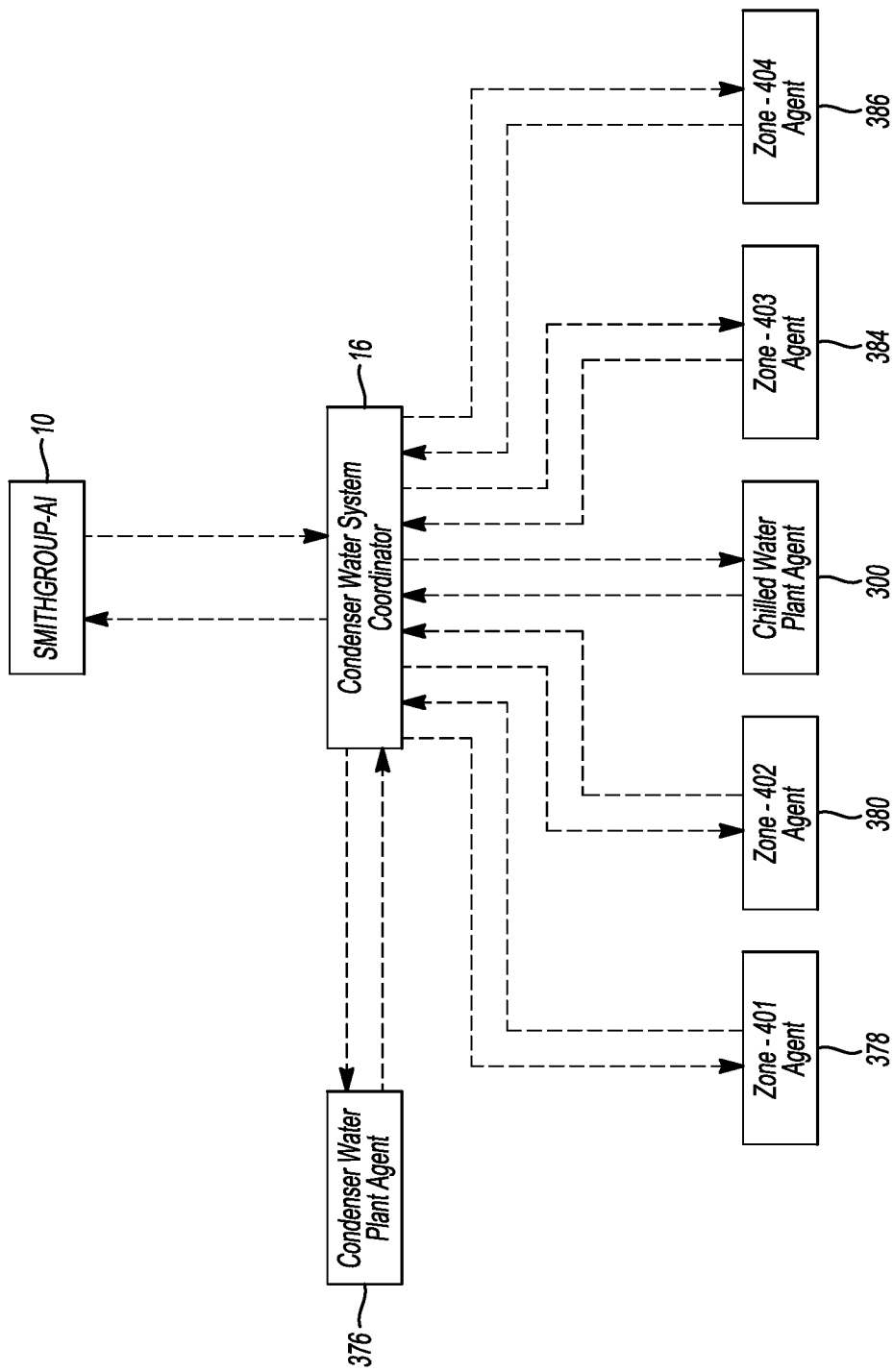
FIG. 21 shows the communication architecture between the various condenser water system agents.

FIG. 21 shows the communication architecture between the various condenser water system agents 300, 376, 378, 380, 384, 386. All sensors and actuators are connected directly to the network, without the use of proprietary controllers that operate with programmed sequences of operation. In some instances, an open source non-proprietary input/output module or a gateway may be required to convert the signal from a sensor or an actuator such that it

TABLE 16

CHILLED WATER SYSTEM AGENT PREDICTIONS

| System Identification Data | | | | | | | | Predictions | | |
|---|---|---|---|---|---|---|---|---|---|---|
| | Chilled Water | | | | | | | | Energy Consumption | |
| Chilled Water | Cooling Coil | | | | Condenser Water | | | CHWS Pump Energy | CHWS Energy | CHWS Total Energy |
| System Prediction ID | Load Btu/hr | EWT [° F.] | LWT [° F.] | GPM | EWT [° F.] | LWT [° F.] | GPM | Consumption KWh | Consumption KWh | Consumption KWh |
| CHWS_40-1-1 | 380480 | 40 | 53.7 | 55.65 | 85 | 97 | 63.4 | 25 | 324 | 349 |
| CHWS_40-1-2 | 380480 | 40 | 53.7 | 55.65 | 80 | 93 | 58.5 | 25 | 302 | 327 |
| CHWS_40-1-3 | 380480 | 40 | 53.7 | 55.65 | 75 | 88 | 58.5 | 25 | 278 | 303 |
| CHWS_40-1-4 | 380480 | 40 | 53.7 | 55.65 | 70 | 80 | 76.1 | 25 | 265 | 290 |
| CHWS_40-1-5 | 380480 | 40 | 53.7 | 55.65 | 65 | 76 | 69.2 | 25 | 247 | 272 |
| CHWS_40-1-6 | 380480 | 40 | 53.7 | 55.65 | 60 | 69 | 84.6 | 25 | 224 | 249 |
| CHWS_40-1-7 | 380480 | 40 | 53.7 | 55.65 | 55 | 65 | 76.1 | 25 | 209 | 234 |

After the chilled water system coordinator 16 has received confirmation from the condenser water system coordinator 308, it then sends the validated scenario combinations to SMITHGROUP-AI 10.

G. Condenser Water System

1. General Description

Figure 20:
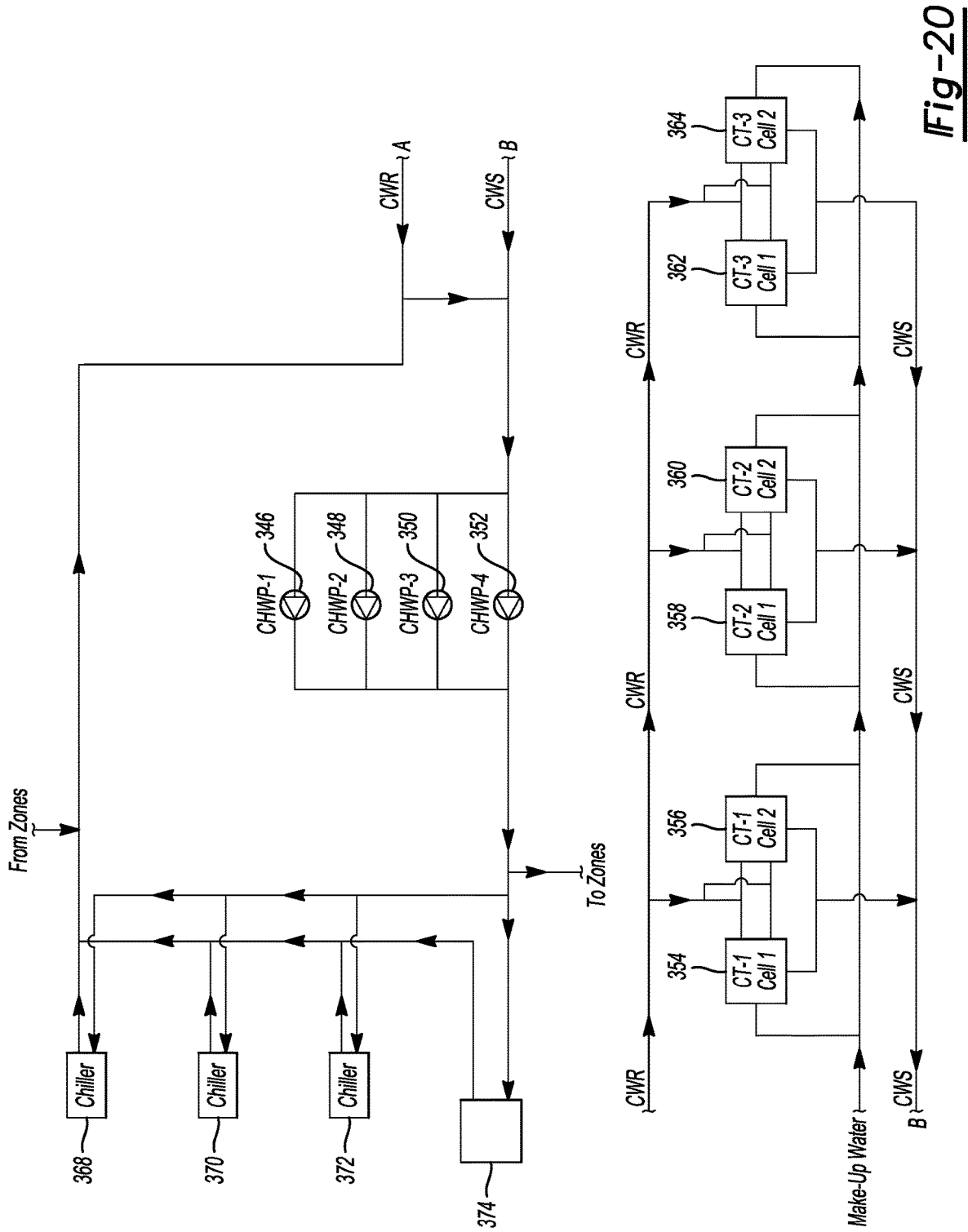
FIG. 20 shows a condenser water system including four condenser water pumps and three cooling towers, each with two cells.

Referring to FIG. 20, a condenser water system is shown as having four condenser water pumps 346, 348, 350, 352, and three cooling towers, each with two cells 354, 356, 358, 360, 362, 364. Condenser water is delivered to the chilled water plant equipment (e.g. chillers 368, 370, 372 and the can be communicated via open source networks such as BACnet, LONworks, Modbus, etc.

2. Condenser Water System Coordinator a. Purpose

The condenser water system coordinator 16 is an independent software agent that monitors and controls all agents associated with its respective condenser water system. Further, the condenser water system coordinator 16 is responsible for the following:

Prediction of the energy use of the entire condenser water system.

Communication with SMITHGROUP-AI 10. It sends overall condenser water system energy use predictions and receives commands from SMITHGROUP-AI 10.

Communication with the condenser water plant agent 376. It requests energy consumption predictions and status from the condenser water plant agent 376 and sends predictions (e.g. total condenser water system water flow, condenser water supply temperature, condenser water return temperatures) such that the condenser water plant agent 376 can make associated predictions related to the energy performance of the condenser water plant.

Communication with the chilled water plant agent 382. The type of information that the condenser water system coordinator 388 communicates to chilled water plant agent 382 may represent valid scenarios or conditions (e.g., minimum and maximum condenser water return temperature, minimum and maximum condenser water supply temperature, minimum and maximum condenser water flow) that the chilled water plant agent 382 needs to account for when making its own energy consumption predictions. Other information that the condenser water system coordinator 388 may communicate with the chilled water plant agent 382 are predictions related to the condenser water flow, and condenser water return temperature associated with each piece of equipment that is a part of the chilled water plant (e.g. chillers 368, 370, 372, water side economizer 374).

b. Internal Structure

Figure 22:
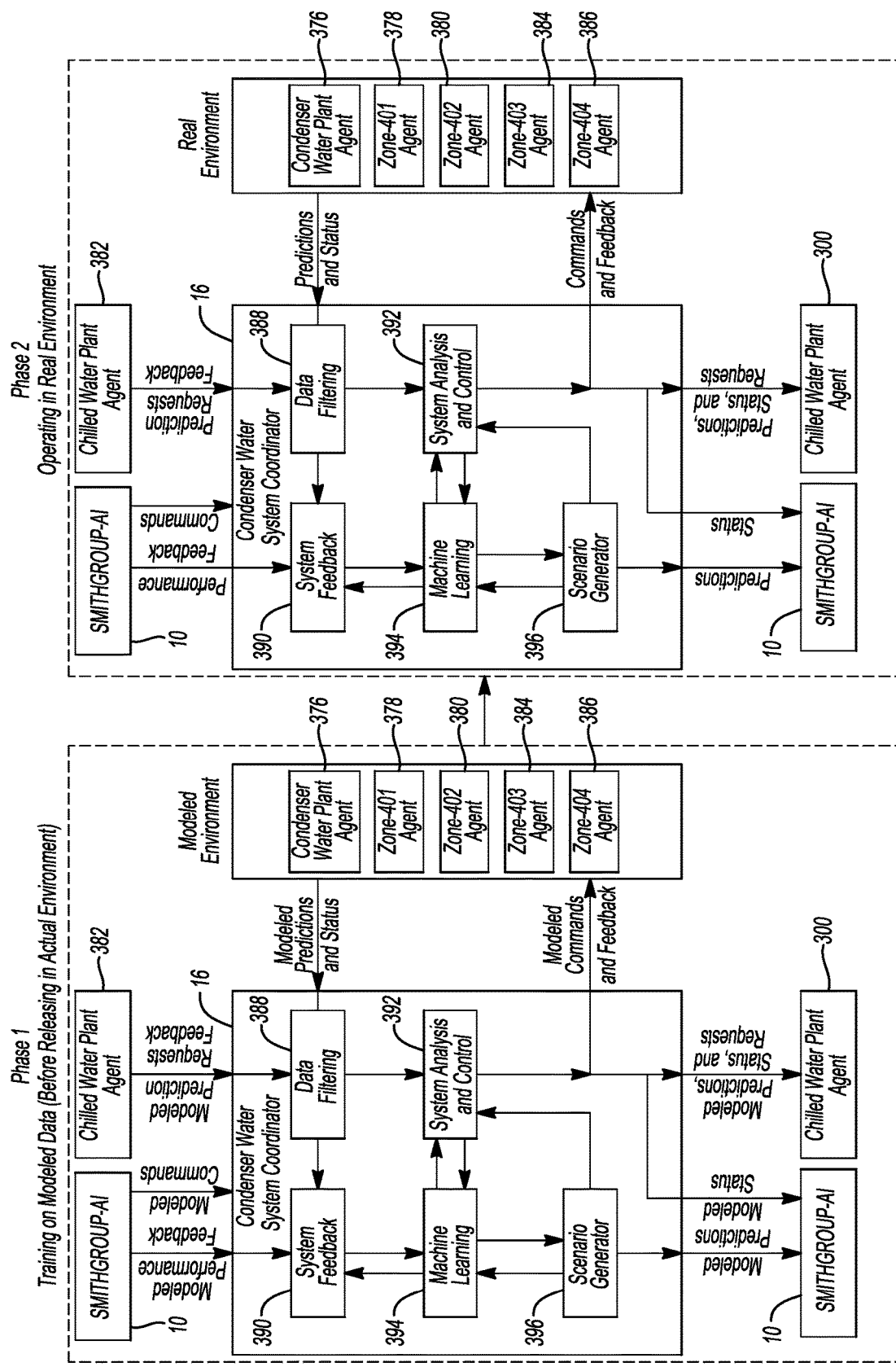
FIG. 22 shows the internal structure of the condenser water system coordinator and its related environment.

Referring to FIG. 22, the internal structure of the condenser water system coordinator 16 and its related environment is shown. The environment for the condenser water system coordinator 16 is comprised of all the agents that it monitors and controls. The agent is comprised of five modules, each with its own dedicated algorithms and controls logic.

The data filtering module 388 is responsible for the following:

Separating the data received from the various associated agents. For example, the actual agent energy consumption levels or actual agent condenser water flow will be sent to the system feedback module 390, while predictions from the agents will be sent to the system analysis and control module 392.

Collection of information from the chilled water plant agent 382. The type of information that the data filtering module 388 may collect from the chilled water plant agent 300 may represent prediction scenarios that the chilled water plant agent 382 needs to make and for which it needs validation. For example, some of the prediction scenarios that the chilled water plant agent 382 intends on analyzing may require a condenser water temperature of 85° F. or above. The data filtering module 388 will send these prediction scenarios to the system analysis and control module 392 for processing and validation.

The system feedback module 390 is responsible for the following:

Collection of information from the zone agents 378, 380, 384, 386, the condenser water plant agent 376, and the chilled water plant agent 300. The information may represent status (e.g. failed, maintenance), or actual agent energy consumptions levels from the various agents. A failed status may indicate that a zone agent 378, 380, 384, 386 no longer controls its environment and should be excluded from the overall condenser water system predictions that the machine learning module 394 is making. A maintenance status may indicate that a zone agent 378, 380, 384, 386 has entered or may enter into a maintenance mode and that the machine learning module 394 needs to update its overall condenser water system predictions accordingly. The information may also represent predictions related to the energy consumption levels of each agent.

Analysis of predictions related to the total condenser water flow. The actual condenser water flow from the various agents will be compared against their own predictions but also against the predictions made by the machine learning module 394. Any large discrepancies between the predicted and actual condenser water flows could mean that the previous command that a zone agent 378, 380, 384, 386 or the condenser water plant agent 376 received from the condenser water system coordinator 16 has placed an agent in conflict with its own internal laws (e.g. not able to meet the various zone thermal requirements or expected condenser water system flow). This could indicate that the difference in the error or accuracy of the predictions made by the machine learning module 394 and the actual outcome might have exceeded critical limits, which in turn has affected the overall energy and thermal performance of the condenser water system. The system feedback module 390 will then send the actual condenser water flows to the machine learning module 394 such that the machine learning module 394 can update its internal learning algorithms.

Collection of information from SMITHGROUP-AI 10. The information may represent commands that need to be distributed to the various associated agents. The information may also represent feedback regarding the predictions that the condenser water system coordinator 16 has made. For example, the predicted energy performance of the scenario that SMITHGROUP-AI 10 has directed the condenser water system coordinator 16 to implement is significantly different that the real outcome. As such the system feedback module 390 will pass this feedback to the machine learning module 394 to update its machine learning algorithms accordingly such that the accuracy or error of its predictions self-improves.

The machine learning module 394 is responsible for the following:

Collection of information from the system feedback module 390. The type of information that this module will collect is described under the system feedback module 390.

Collection of information from the system analysis and control module 392. This information may represent predictions from zone agents 378, 380, 384, 386 and condenser water plant agent 376 regarding condenser water flows, temperatures, etc.

Making predictions, using machine learning algorithms, based on the data received from the system analysis and control module 392, for the overall energy consumption of the entire condenser water system or for the total condenser water flow that the condenser water plant agent 376 will need to deliver.

Sending the predictions to the system analysis and control module 392 and to the scenario generator module 396.

The system analysis and control module 392 is responsible for the following:

Collection of information from the data filtering module 388. The type of information that this module will collect is described under the data filtering module 388.

Analyzing the data from each agent, and filtering and compiling the data into valid system scenarios.

Sending the valid system scenarios to the machine learning module 394 for predictions.

Receiving the predictions from the machine learning module 394 and sending commands to the various agents. The commands that the system analysis and control module 392 may send to the agents could be condenser water flows and associated temperatures, or requests for predictions.

Analyzing the scenarios proposed by the scenario generator module 396. For each scenario received, the system analysis and control module 392 may decide to direct the various agents to make predictions and then compile these predictions into valid system scenarios for the machine learning module 394 to make predictions on.

Analyzing the scenarios proposed by the scenario generator module 396 that require input from the chilled water plant agent 382. For each scenario received, the system analysis and control module 392 may decide to ask the chilled water plant agent 382 to make predictions and then send the predictions back to the data filtering module 388.

The scenario generator module 396 is responsible for continuously looking for ways to improve the overall energy performance of the entire condenser water system. For example, the scenario generator module 396 may create a series of scenarios that will then be sent to the system analysis and control module 392 to analyze and validate. The system analysis and control module 392 may ask the agents to make predictions on the scenarios. Once the scenarios are validated, they may be sent to the machine learning module 394 to make predictions on. The predictions made by the machine learning module 394 will then be sent back to the scenario generator module 396 for analysis. After analyzing the predictions, the scenario generator module 396 may decide to send such predictions to SMITHGROUP-AI 10, which in turn may direct the condenser water system coordinator 16 to implement one of the scenarios created by the scenario generator module 396.

The scenario generator module 396 may create scenarios by modelling the condenser water plant agent 376 as delivering various condenser water flows and associated temperatures and by modelling the zone agents 378, 380, 384, 386 as satisfying their zone thermal load conditions under various conditions or by modelling the chilled water plant equipment as being able to support such condenser water flows and associated temperatures.

c. Sample Process

The process through which the condenser water system coordinator 16 makes predictions related to the overall condenser water system energy consumption levels or condenser water system flows and associated temperatures is similar to the process that the chilled water system coordinator 16 is implementing when making predictions related to the overall chilled water system energy consumption levels or chilled water system flows and associated temperatures.

3. Condenser Water Plant Agent a. Purpose

The condenser water plant agent 376 is an independent software agent that monitors and controls all sensors 398, 400, 402, 404 and actuators 406, 408, 410, 412 associated with the condenser water plant. The condenser water plant is comprised of cooling towers and condenser water pumps. Further, the condenser water plant agent 376 is responsible for the following:

Prediction of the energy use of the entire condenser water plant.

Communication with the condenser water system coordinator 16. It sends overall condenser water plant energy use predictions and receives commands from the condenser water system coordinator 16.

b. Internal Structure

Figure 23:
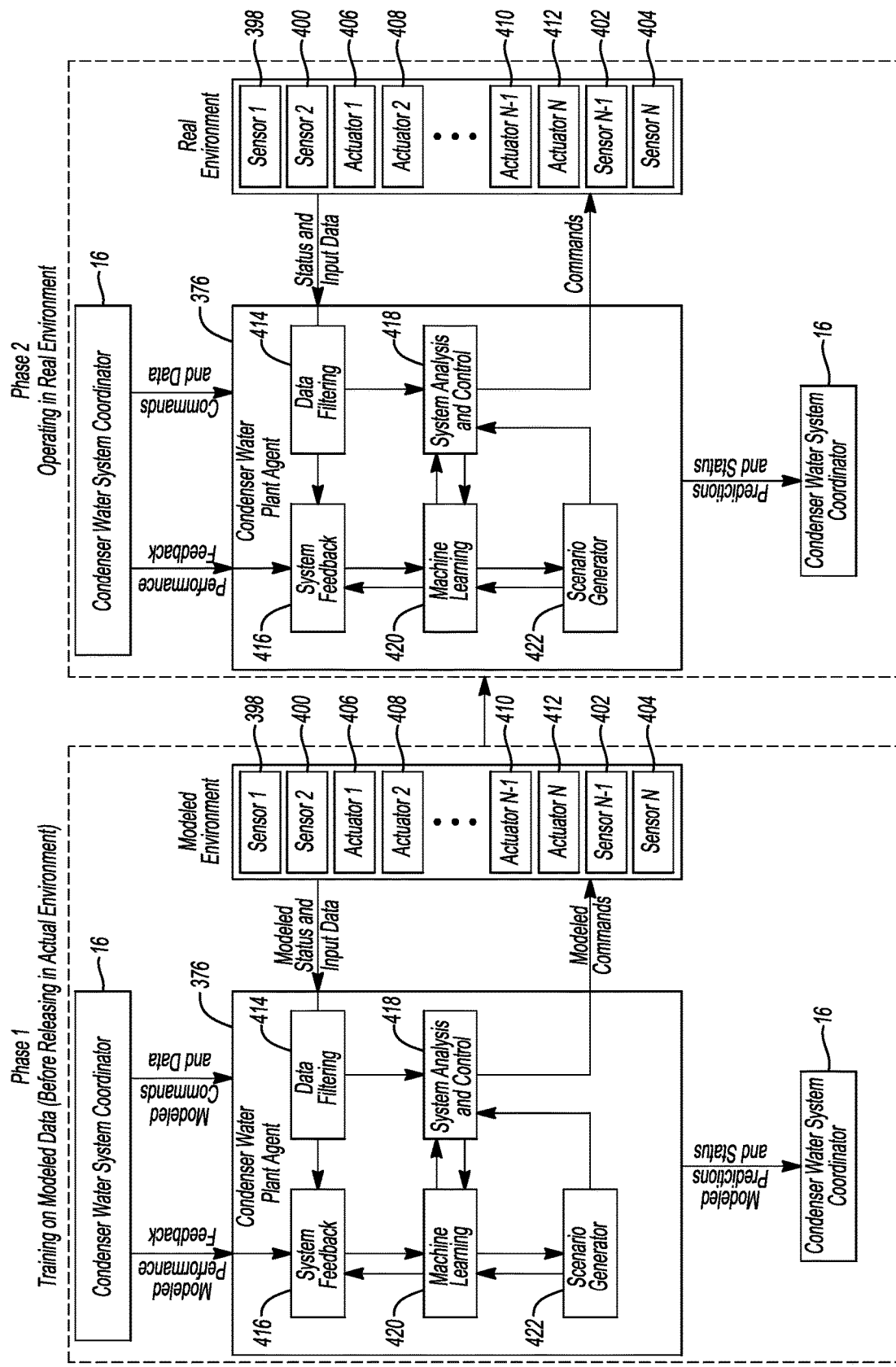
FIG. 23 shows the internal structure of the condenser water plant agent and its related environment.

Referring to FIG. 23, the internal structure of the condenser water plant agent 376 and its related environment is shown. The environment for the condenser water plant agent 376 is comprised of the sensors and actuators that are used to monitor and control the condenser water plant. The agent is comprised of five modules, each with its own dedicated algorithms and controls logic.

The data filtering module 414 is responsible for separating the data received from sensors 398, 400, 402, 404 and actuators 406, 408, 410, 412. For example, the energy consumption levels of cooling tower fans or condenser water pumps (measured by their related variable frequency drives (VFD)), actual condenser water flow (measured by the associated flow meter), or various temperatures (e.g. condenser water leaving temperature, condenser water return temperature, etc.) will be sent to the system feedback module 416, while data from other various sensors (e.g. alarms, temperatures etc.) will be sent to the system analysis and control module 418. The data filtering module 414 may also send to the system analysis and control module 418 the same data that was sent to the system feedback module 416.

The system feedback module 416 is responsible for the following:

Collection of information from the various sensors 398, 400, 402, 404 and actuators 406, 408, 410, 412. The type of information that the system feedback module 416 may collect is described in the data filtering module 414.

Analysis of predictions related to various temperatures (e.g. condenser water leaving temperature, condenser water return temperature, etc.). The data received from the various sensors and actuators will be compared against the predictions made by the machine learning module 420. Any large discrepancies between the predicted and measured values could mean that the previous commands could indicate that the difference in the error or accuracy of the predictions made by the machine learning module 420 and the actual outcome might have exceeded critical limits, which in turn has affected the overall energy and energy performance of the condenser water plant. The system feedback module 416 will then send the measured values to the machine learning module 420 such that the machine learning module 420 can update its internal learning algorithms.

Collection of information from the condenser water system coordinator 16. The information may represent feedback regarding the predictions that the condenser water plant agent 376 has made. For example, the condenser water plant might deliver a certain flow of condenser water to the zones or to the chilled water plant in the same time its internal flow meters are confirming that the measured condenser water flow is equal to or close to what was predicted. However, some zones or the chilled water plant, as measured by their associated flow meters, might not receive sufficient condenser water. This could be indication that the water flow meters are defective or that they may need recalibration.

The machine learning module 420 is responsible for the following:
- Collection of information from the system feedback module 416. The type of information that this module will collect is described under the system feedback module 416.
- Collection of information from the system analysis and control module 418. This information may represent data from the various sensors and actuators, such as condenser water flows and associated temperatures.
- Making predictions, using machine learning algorithms, based on the data received from the system analysis and control module 418 or from the system feedback module 416.
- Sending the predictions to the system analysis and control module 418 and to the scenario generator module 422.

For each component (e.g. cooling tower, condenser water pump etc.) of the condenser water plant, the machine learning module 420 will use various machine learning algorithms to predict its performance (e.g. Btu/hr, leaving water temperature etc.), water flow, water pressure drops, and energy consumption (e.g. kWh).

For example, a cooling tower has fixed properties (e.g. width, height, fan horsepower etc.). As such, a machine learning algorithm may be trained, via the use of manufacturer's rated cooling tower performance data at various conditions (e.g. various entering wet bulb air temperatures, entering condenser water temperatures and flow), to predict what the leaving condenser water temperature, or associated condenser water pressure drop may be at other conditions not included in the training data set.

Similarly, using pump laws and manufacturer's rated pump performance data as a training set, a machine learning algorithm may be trained to predict what the condenser water pump energy consumption may be at various system conditions (e.g. various water flows and various associated pump head). Once released into the real environment, the machine learning module 420, via the feedback received from the system feedback module 416, may update its internal machine learning algorithms and related predictions (e.g. pump motor energy consumption, pump head setpoints etc.) to account for system effects and for the measurement errors of the various sensors.

Using an approach similar to the above, the machine learning module 420 may also use each individual component prediction as a data set and/or training set to make predictions for the energy consumption of the entire condenser water plant. For example, the machine learning module 420 may build a training set comprised of the plant condenser water flow, plant entering condenser water temperature, plant leaving condenser water temperature, pump head and associated pump motor energy consumption. Once the training set is of useful size, the machine learning module 420 may use it to predict pump motor energy consumption on new data that is not a part of the training set.

The machine learning module 420 will use the training sets described above to operate the condenser water plant as efficiently as possible. The machine learning module 420 may predict the entering water temperatures, leaving water temperatures, condenser water flow, quantity of towers, and quantity and speed of condenser water pumps that are required to operate to satisfy condenser water load requirements based on the predictions received from the condenser water system coordinator 16.

The system analysis and control module 418 is responsible for the following:
- Monitoring and control of all sensors and actuators related to the condenser water plant.
- Collection of information from the data filtering module 414. The type of information that this module will collect is described under the data filtering module 414.
- Analyzing the data from each sensor and actuator. For example, the system analysis and control module 418 may determine that a cooling tower fan is no longer capable of running (e.g. the motor has burned out). As such, the system analysis and control module 418 may need to update its valid scenarios (e.g. how many cooling tower fans need to operate and at what speed) to deliver the required condenser water plant temperature and flow to the zones and to the chilled water plant.
- Sending the valid system scenarios to the machine learning module 420 for predictions.
- Receiving the predictions from the machine learning module 420 and sending commands to the various actuators. The commands that the system analysis and control module 418 may send to the actuators could be valve position, cooling tower fan speed, or condenser water pump speed.
- Analyzing the scenarios proposed by the scenario generator module 422. For each scenario received, the system analysis and control module 418 will analyze the status of the current sensors and actuators and will determine which scenario is valid. For example, one of the scenarios that the scenario generator module 422 may generate will require the condenser water plant to deliver 2,000 GPM of condenser water at 65° F. to the zones and to the chilled water plant. The system analysis and control module 418 may determine that, due to a cooling tower fan failure or condenser water pump failure, such scenario is no longer valid (due to limited condenser water plant capacity) and that the machine learning module 420 will not make a prediction on the referenced scenario.

The scenario generator module 422 is responsible for continuously looking for ways/scenarios to improve the overall energy performance of the condenser water plant. For example, the scenario generator module 422 may create a series of scenarios that will then be sent to the system analysis and control module 418 to analyze and validate. Once the scenarios are validated, they may be sent to the machine learning module 420 to make predictions on. The predictions made by the machine learning module 420 will then be sent back to the scenario generator module 422 for analysis. After analyzing the predictions, the scenario generator module 422 may decide to send such predictions to the condenser water system coordinator 16, which may send them to SMITHGROUP-AI 10, which in turn may direct the condenser water system coordinator 16 to implement one of the scenarios created by the scenario generator module 16.

The scenario generator module 422 may create scenarios by varying the cooling tower air flows, water flows and related temperatures. Each such scenario will have an impact on the energy performance of the motors serving the tower fans or the condenser water pumps.

A SMITHGROUP-AI design assistant (SG-AI DA) 424 may act as an aide to design engineers throughout the entire design process. The SG-AI DA 424 may continuously improve itself by analyzing real equipment performance data from SG-AI implemented projects and adjusting the equipment database for future analyses. The inputs needed to perform an analysis are load model inputs, the equipment database and user constraints. As the design process develops, the user may input design constraints into the user input module to restrict the type of options that are generated. System coordinators are intended to gather the load and equipment data and perform a first round of analyses of the most optimal equipment scenario for its respected system. The SMITHGROUP-AI 10 will take these various system coordinator equipment scenarios and perform a final analysis to determine the most optimal combined equipment scenarios.

Figure 24:
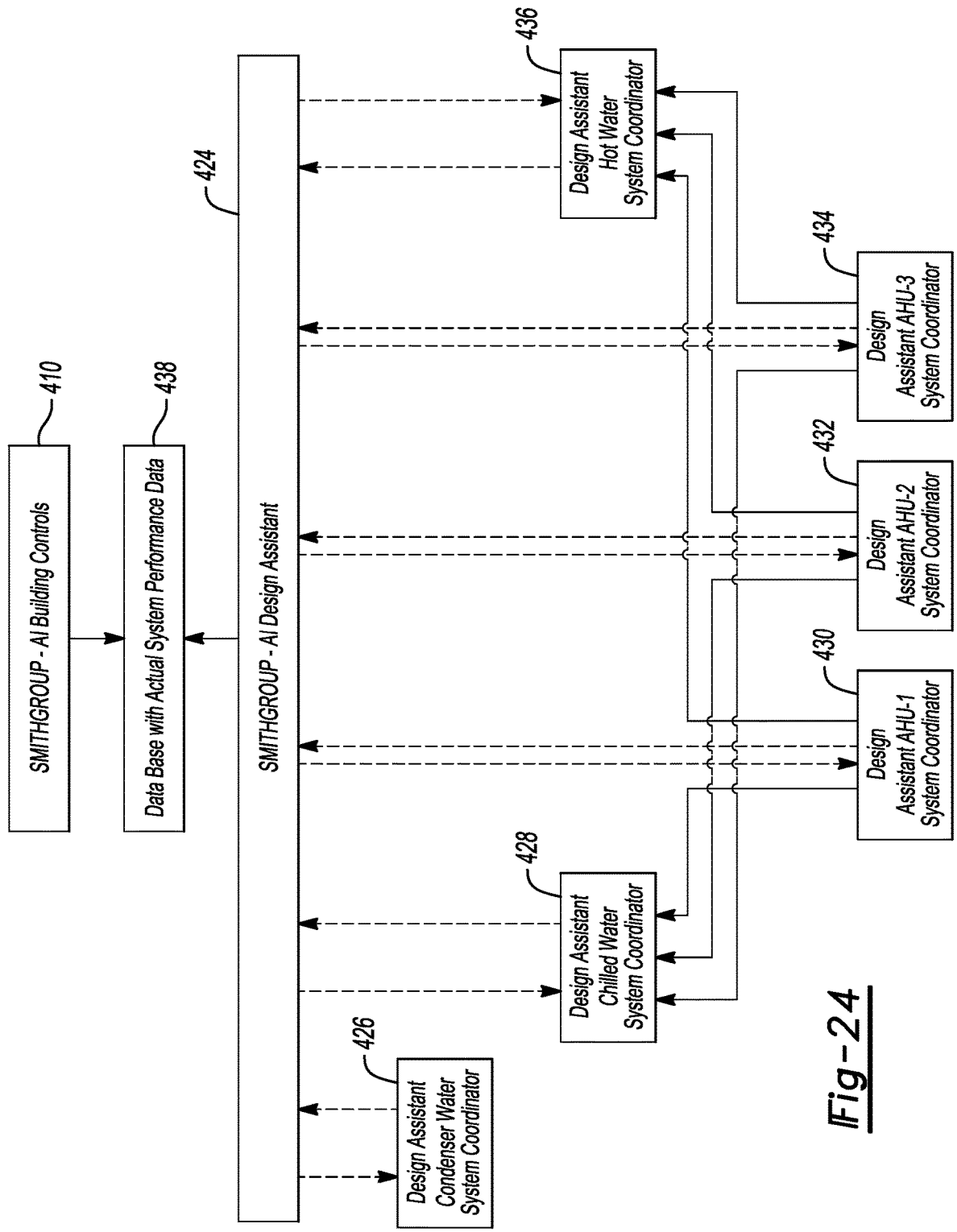
FIG. 24 shows the communication architecture between SMITHGROUP-AI design assistant and various design assistant system coordinators.

Referring to FIG. 24, the SG-AI DA 424 will serve as an independent, multifunctional software agent that is responsible for analyzing and processing data from all design assistant agents. The SG-AI DA functionality goal is to compile and process equipment design scenarios, derived from inputted load data and real performance data, to result in the most optimal building equipment design. This is achieved by analyzing all possible combinations and associated laws between the various system coordinator scenarios. Some system coordinator scenarios selected to be implemented by the SG-AI DA 424 may not be the most energy cost efficient for that system; however, when analyzed from an overall building energy consumption or energy cost level, those scenarios are collectively the most energy efficient or energy cost efficient for the building as a whole. The SG-AI DA 424 may also collect real time trend data for equipment in operation to compile and send to system coordinators for design performance correction. The SG-AI DA 424 may communicate directly with various design assist system coordinators 426, 428, 430, 432, 434, 436 to process the most efficient combination of equipment scenarios, and share those with a data base with actual system performance data 438. The SMITHGROUP-AI 10 also informs the data base 438.

Figures 25, 26:
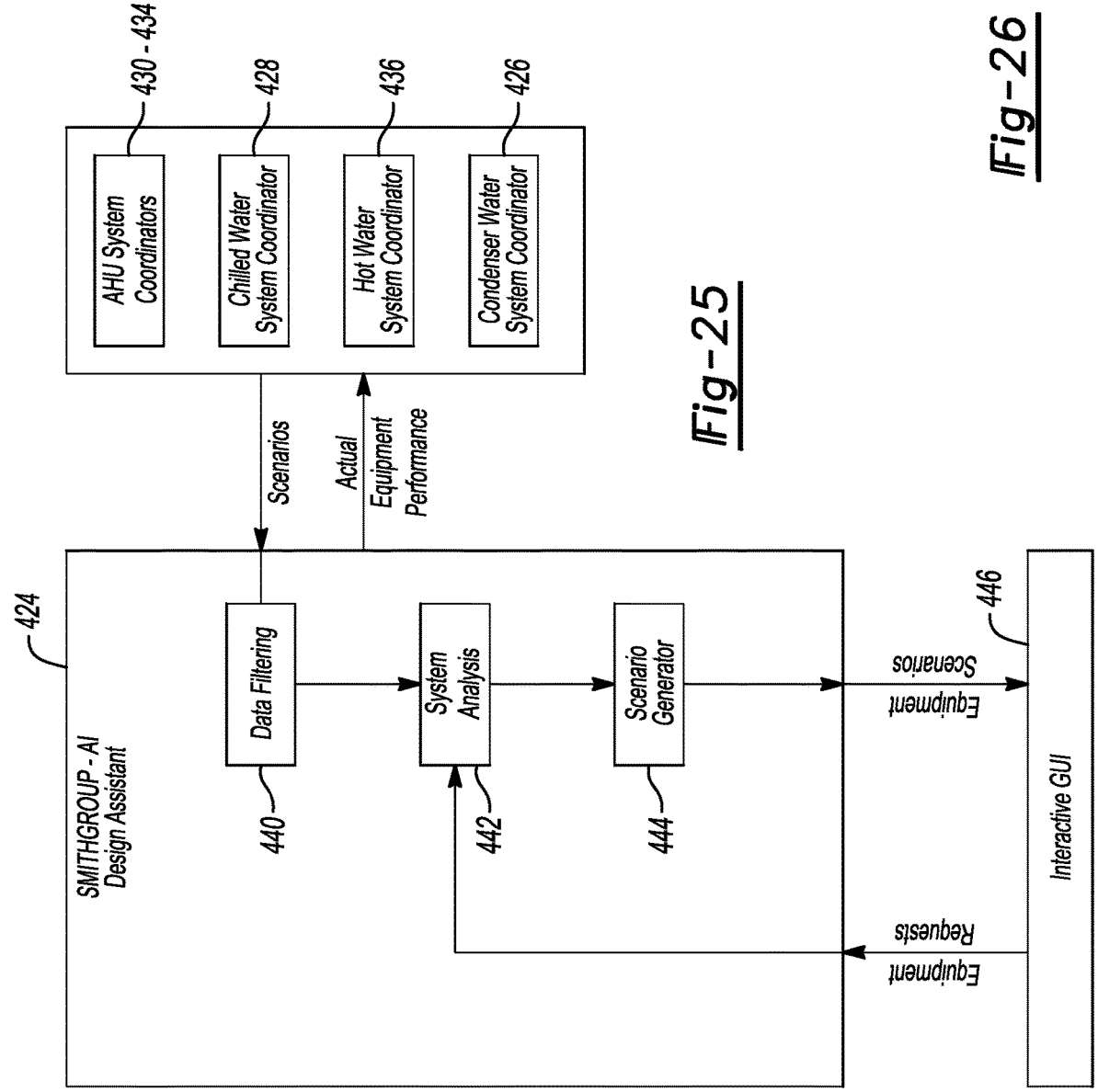
FIG. 25 shows modules of the SMITHGROUP-AI design assistant.
FIG. 26 shows a flow diagram of operations followed by the SMITHGROUP-AI design assistant to collect performance data.

Referring to FIG. 25, each of the design assistant system coordinators 426, 428, 430, 432, 434, 436 generates equipment scenarios associated with the system it is serving and sends the scenarios to the SG-AI DA 424. The SG-AI DA 424 is comprised of three modules. A data filtering module 440 filters the scenarios based on user constraints and physical laws, removing equipment scenarios that another system coordinator could not fulfill. For example, the design assistant chilled water system coordinator 428 may accept a chiller that requires lower condenser water temperature, however, due to various system constraints the condenser water system coordinator 12 may not be able to provide an equipment scenario to fulfill the chiller requirement. This may render the chilled water equipment scenario as invalid.

TABLE 17

Design Assistant Chilled Water System Coordinator Scenarios

| Chilled Water System ID | Chiller ID | Entering CW Temperature [° F.] | Leaving CW Temperature [° F.] | Entering CHW Temperature [° F.] | Leaving CHW Temperature [° F.] | Overall Efficiency |
|---|---|---|---|---|---|---|
| CHWS_3 | CH-2 | 85 | 95 | 54 | 44 | 78 |
| CHWS_1 | CH-3 | 86 | 96 | 54 | 44 | 76 |
| CHWS_4 | CH-4 | 85 | 95 | 56 | 44 | 75 |
| ~~CHWS_5~~ | ~~CH-4~~ | ~~76~~ | ~~86~~ | ~~56~~ | ~~44~~ | ~~60~~ |
| ~~CHWS_6~~ | ~~CH-2~~ | ~~76~~ | ~~86~~ | ~~54~~ | ~~44~~ | ~~56~~ |
| CHWS_2 | CH-3 | 84 | 94 | 54 | 44 | 42 |

A system analysis module 442 is responsible to analyze and process the different combinations of system coordinator equipment scenarios for overall efficiency and cost efficiency. A scenario generator module 444 is responsible for producing equipment combinations that are ranked by the most efficient system and/or the most cost-efficient system. These scenarios are sent to an interactive graphical user interface (GUI) where the user may select the system or modify aspects to send back to the system analysis module 442 to analyze and generate new scenarios. An example summary of produced options is shown in Table 18:

TABLE 18

Overall System Scenarios

| Overall System ID | Chilled Water System ID | Heating Hot Water System ID | Condenser Water System ID | Air Handling Unit System ID | Overall Efficiency | Cost Efficiency |
|---|---|---|---|---|---|---|
| S_1 | CHWS_1 | HHWS_2 | CWS_4 | AHU-3 | 76.2 | 64 |
| S_2 | CHWS_1 | HHWS_4 | CWS_4 | AHU-2 | 75.5 | 71 |
| S_3 | CHWS_4 | HHWS_1 | CWS_2 | AHU-1 | 75.4 | 58 |
| S_4 | CHWS_5 | HHWS_2 | CWS_1 | AHU-1 | 74.1 | 65 |
| S_5 | CHWS_6 | HHWS_2 | CWS_3 | AHU-3 | 73.8 | 80 |
| S_6 | CHWS_2 | HHWS_3 | CWS_4 | AHU-3 | 73.2 | 78 |

Referring to FIG. 26, the SG-AI DA 424 may continuously collect performance data from systems already in operation as indicated by blocks 448, 450, 452, 454, 456, 458. The performance data is compiled for each piece of equipment and sent to the associated system coordinator for analysis. The system coordinators will compare the real performance data to the data and existing factors provided from the equipment database to determine updated performance factors at specific design conditions (Table 19). These performance factors are sent to the equipment database to be used in future equipment scenario analyses.

TABLE 19

Performance Factor Analysis

| Design Condition ID | Timestamp | Real Flow Value | Design Flow Value | Performance Factor |
|---|---|---|---|---|
| Pump 2 Design Condition 1 | Dec. 9, 2020 10:12 | 205.3 | 200 | 1.027 |
| Pump 2 Design Condition 2 | Dec. 9, 2020 10:26 | 210.1 | 206 | 1.020 |
| Pump 2 Design Condition 3 | Dec. 9, 2020 10:40 | 206.9 | 201 | 1.029 |
| Pump 2 Design Condition 4 | Dec. 9, 2020 10:55 | 207.8 | 202 | 1.029 |
| Pump 2 Design Condition 5 | Dec. 9, 2020 11:09 | 215 | 210 | 1.024 |
| Pump 2 Design Condition 6 | Dec. 9, 2020 11:24 | 212.2 | 208 | 1.020 |

Figure 27:
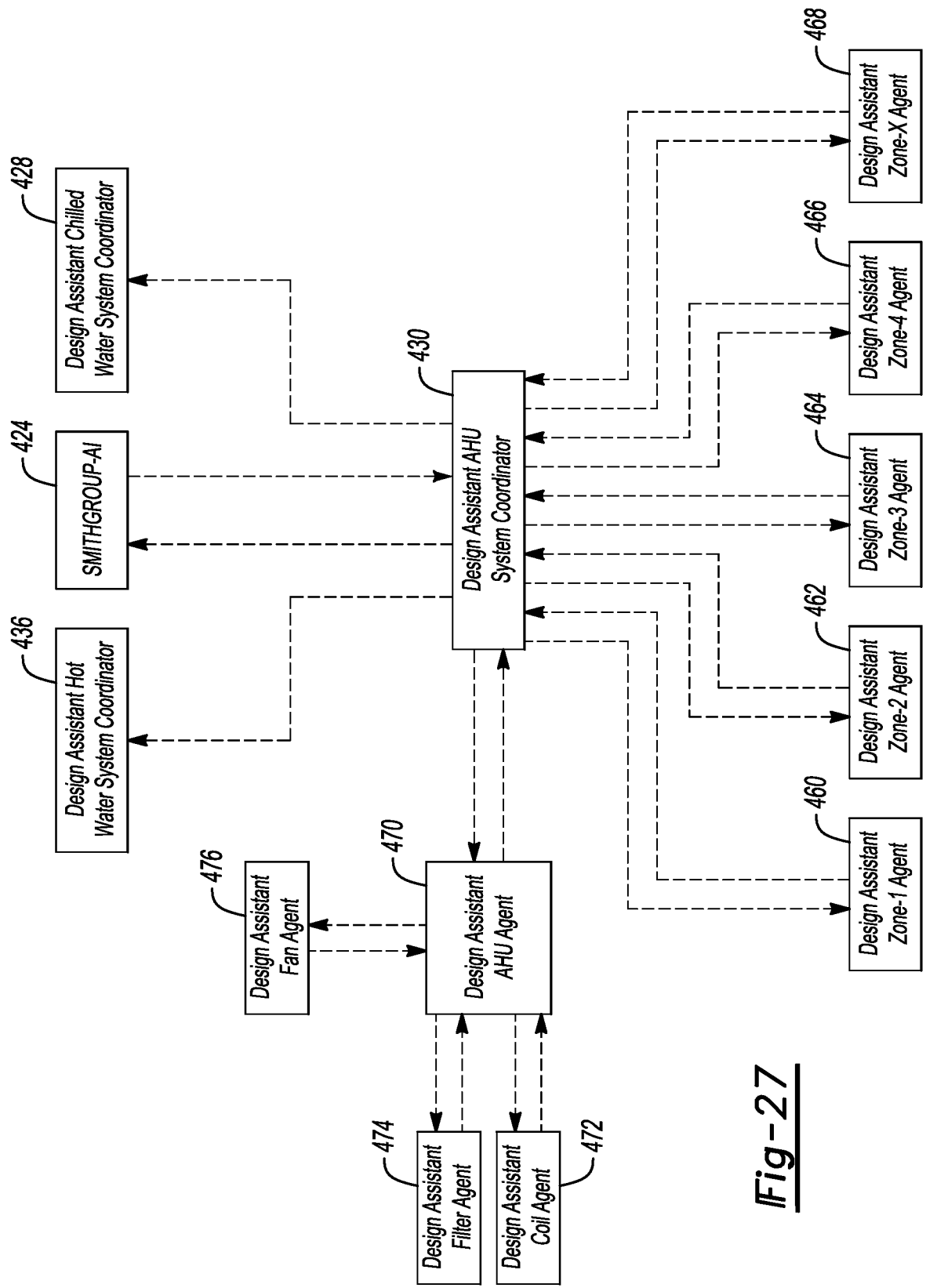
FIG. 27 shows the communication architecture between design assistant agents, design assistant coordinators, and the SMITHGROUP-AI design assistant.

Referring to FIG. 27, each of a plurality of design assistant zone agents 460, 462, 464, 466, 468 creates scenarios that fulfill the space load and airflow requirements from the imported energy model data and sends the scenarios to at least one of the design assistant AHU system coordinator 430, 432, 434. The design assistant AHU system coordinators 430 filters the scenarios, based on user constraints or physical limitations of equipment, and sends the valid load and airflow scenarios to a design assistant AHU agent 470. The design assistant AHU agent 470 may communicate with specific AHU equipment agents 472, 474, 476 (e.g., cooling coil agent, fan agent, etc.) to generate AHU sizing and configurations scenarios that fulfill all the zone load and airflow requirements. These scenarios are sent to the design assistant AHU system coordinator 430 to be filtered based on user constraints and physical equipment limitations. The valid equipment scenarios may then be sent on to the SG-AI DA 424, the design assistant hot water system coordinator 436, and the design assistant chilled water system coordinator 428.

Figure 28:
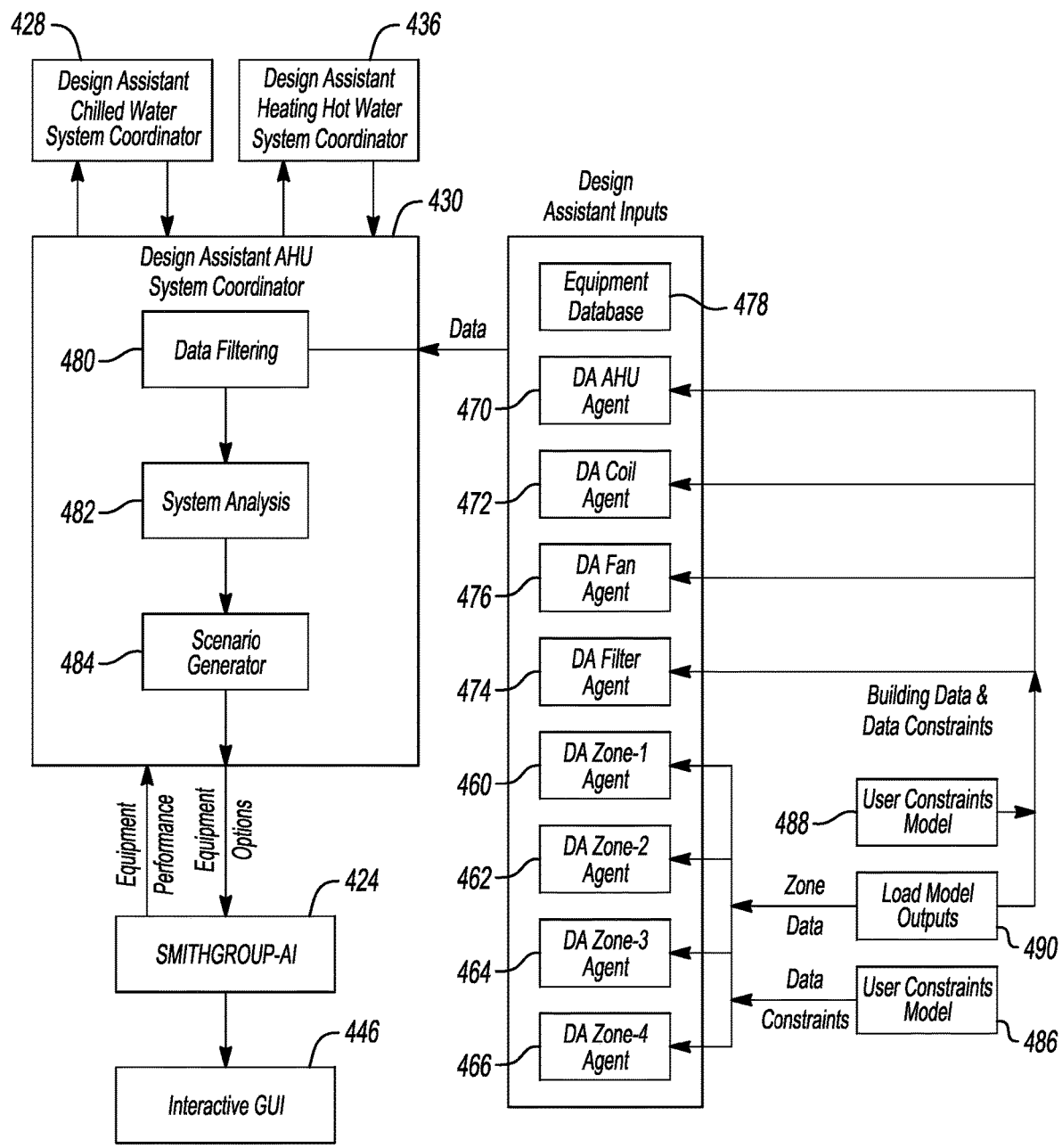
FIG. 28 shows the communication architecture between design assistant coordinators, design assistant inputs, and other system components.

Referring to FIG. 28, the design assistant AHU system coordinator 430 may receive data/equipment scenarios from the associated equipment agents 470, 472, 474, 476, the design assistant zone agents 460, 462, 464, 466, the system coordinators 428, 436, and a design assistant equipment database 478. Within the design assistant AHU system coordinator 430, there are three modules. A data filtering module 480 receives the data and filters it based off user constraints and physical equipment limitations. A system analysis module 482 then analyzes the data and equipment to create performance data. A scenario generator 484 generates equipment scenarios based on the data from the system analysis module 482. These scenarios are then sent to the SG-AI DA 424 for overall system analysis. A user constraints modules 486, 488 and load model outputs 490 inform the design assistant inputs.

Figure 29A:
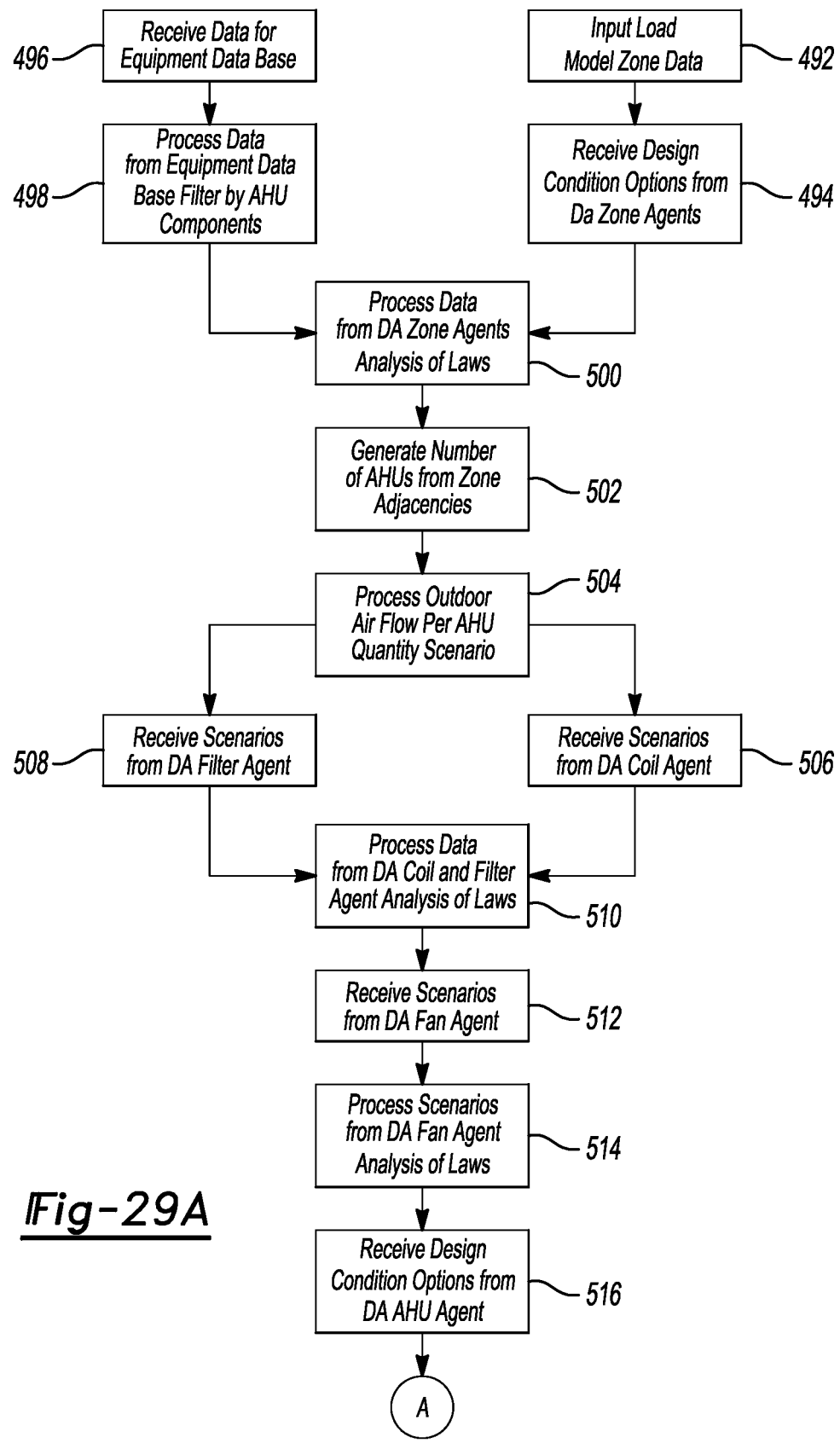
FIGS. 29A and 29B show a block diagram describing operations associated with the communication architecture of FIG. 28.
Figure 29B:
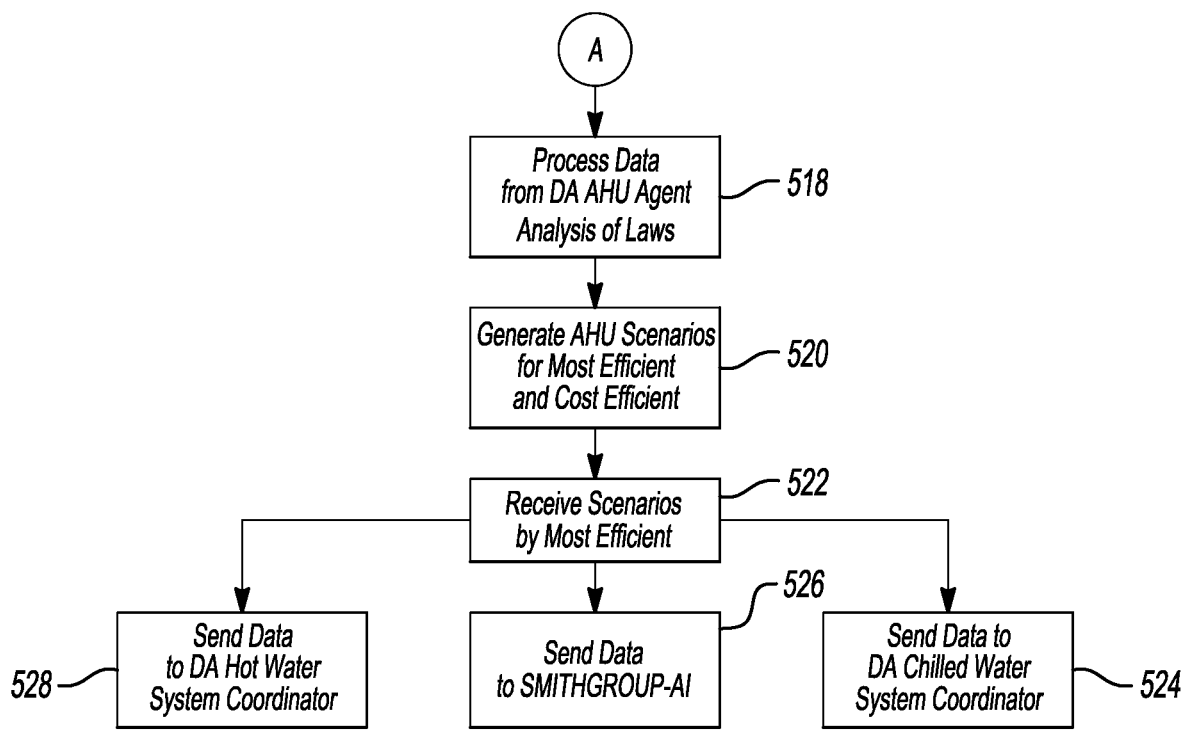

Referring to FIGS. 29A and 29B, each of the design assistant zone agents 460, 462, 464, 466, 468 takes the inputted data from the load model 490, and it creates a series of scenarios associated with the zone that it is serving. The design assistant zone agents 460, 462, 464, 466, 468 send these scenarios to the design assistant AHU system coordinator 430. These scenarios are given a unique ID number (Table 20 below) based on a specific airflow supply air temperature (SAT) and a specific supply air dewpoint (DP).

TABLE 20

Design Assistant Zone 1 Agent

| Zone ID | Zone Adjacency Category | Supply Air Temperature [° F.] | Supply Air Dew Point [° F.] | Supply Air Design CFM [CFM] |
|---|---|---|---|---|
| Zone 1_1 | East 1 | 50 | 48 | 100 |
| Zone 1_2 | East 1 | 53 | 50 | 150 |
| Zone 1_3 | East 1 | 55 | 48 | 175 |
| Zone 1_4 | East 1 | 55 | 52 | 200 |
| Zone 1_5 | East 1 | 55 | 54 | 400 |
| Zone 1_6 | East 1 | 55 | 52 | 400 |

The design assistant AHU system coordinator 430 then filters/validates the scenarios received from the design assistant zone agents 460, 462, 464, 466, 468 (Table 21 below). The validation process could be based on the physical limitation of the air handling unit. In some instances, even though a zone may be able to be cooled with a very cold air temperature (e.g., 50° F.), due the operating conditions or physical limitations of the internal components of the air handling unit, the air handling unit may not be able to cool the air to 50° F. As such, the design assistant AHU system coordinator 430 may label the associated scenarios as invalid.

TABLE 21

Design Assistant Zone 1 Agent

| Zone ID | Zone Adjacency Category | Supply Air Temperature [° F.] | Supply Air Dew Point [° F.] | Supply Air Design CFM [CFM] |
|---|---|---|---|---|
| ~~Zone 1_1~~ | ~~East 1~~ | ~~50~~ | ~~48~~ | ~~100~~ |
| Zone 1_2 | East 1 | 53 | 50 | 150 |
| ~~Zone 1_3~~ | ~~East 1~~ | ~~55~~ | ~~48~~ | ~~175~~ |
| Zone 1_4 | East 1 | 55 | 52 | 200 |
| Zone 1_5 | East 1 | 55 | 54 | 400 |
| Zone 1_6 | East 1 | 55 | 52 | 400 |

The design assistant AHU system coordinator 430 then filters data from the equipment database for AHU system components. The equipment data is then analyzed together with the design assistant zone agent data to generate scenarios of the number and size of AHUs possible based off the assigned design assistant zone agent adjacencies and loads. The design assistant AHU system coordinator 430 analyzes the generated scenarios and calculates the outdoor air requirement for each air handling unit based off zone ventilation requirements.

TABLE 22

Design assistant AHU Agent Outside Air Flow

| AHU Quantity Scenario | Total Outside Air 1 | Critical Zone 1 | Total Outside Air 2 | Critical Zone 2 |
|---|---|---|---|---|
| AHUS_1 | 4000 | 0.68 | — | — |
| AHUS_2 | 2000 | 0.6 | 2500 | 0.68 |
| AHUS_3 | 1000 | 0.71 | 3000 | 0.75 |
| AHUS_4 | 2500 | 0.75 | 2000 | 0.7 |

Once the outside air requirement is determined, the design assistant AHU agent 470 sends the airflow and load requirements to the coil agent 472 and filter agent 474. These agents generate equipment scenarios to meet the desired requirements, which are then filtered based on user constraints or physical limitations of the air handling unit. Each scenario is given a unique ID based on static pressure loss. The fan agent 476 then generates fan array scenarios based on the airflow and total static pressure, including each coil and filter static pressure drop scenario. These scenarios are given a unique ID number based on a static pressure and number of fans. The design assistant AHU agent 470 filters the fan agent equipment and generates the overall air handling unit equipment scenarios that are sent to the design assistant AHU system coordinator 430.

TABLE 23

Design assistant AHU Agent

| AHU Scenario ID | AHU Quantity | Fan Array ID | Cooling Coil ID | Filter ID | Width | Height |
|---|---|---|---|---|---|---|
| AHU_1 | 1 | FA-2 | CC-1 | FT-2 | 108 | 72 |
| AHU_2 | 1 | FA-2 | CC-2 | FT-6 | 72 | 80 |
| AHU_3 | 1 | FA-2 | CC-2 | FT-4 | 72 | 80 |
| AHU_4 | 1 | FA-3 | CC-4 | FT-4 | 144 | 144 |
| AHU_5 | 1 | FA-3 | CC-1 | FT-5 | 108 | 72 |
| AHU_6 | 1 | FA-4 | CC-3 | FT-2 | 108 | 90 |

The design assistant AHU system coordinator 430 filters the scenarios from the design assistant AHU agent 470 based off user constraints and physical limitations before generating the overall efficiency and cost efficiency for each scenario. The completed scenarios may then be sorted by overall efficiency and sent to the SG-AI DA 424, the design assistant chilled water system coordinator 428, and the design assistant hot water system coordinator 436. These operations are summarized in blocks 492, 494, 496, 498, 500, 502, 504, 506, 508, 510, 512, 514, 516, 518, 520, 522, 524, 526, 528.

Figure 30:
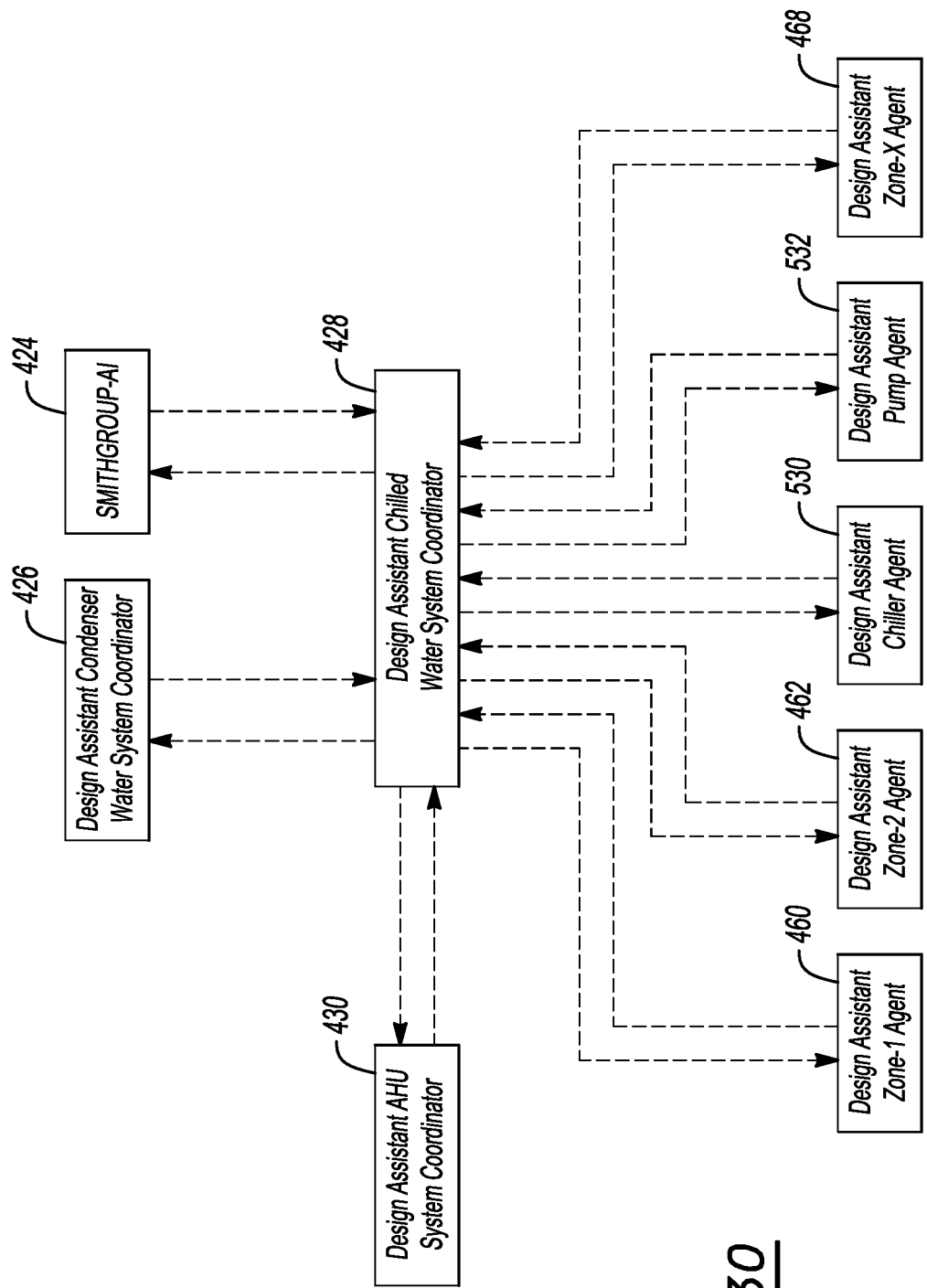
FIG. 30 shows the communication architecture between a design assistant coordinator, design agents, and other system components.

Referring to FIG. 30, for generating potential sizes and configurations of chilled water system equipment, each of the design assistant zone agents 460, 462, 468, may create scenarios that fulfill the load requirements of the associated space and send these scenarios to the design assistant chilled water system coordinator 428. The design assistant AHU system coordinator 430 creates coil load requirements, such as entering and leaving water temperature, based off the AHU equipment scenarios generated above. These load scenarios are sent to the design assistant chilled water system coordinator 428 and filtered based off user constraints and physical equipment limitations. The chilled water coordinator 428 may then communicate with specific chilled water system agents 530, 532 (e.g., chiller agent) to produce equipment scenarios that meet the required chilled water load derived from the design assistant AHU system coordinator 430 and design assistant zone agents 460, 462, 468. The design assistant chilled water system coordinator 428 then sends these scenarios and associated data to the SG-AI DA 24 and the condenser water system coordinator 426.

Figure 31:
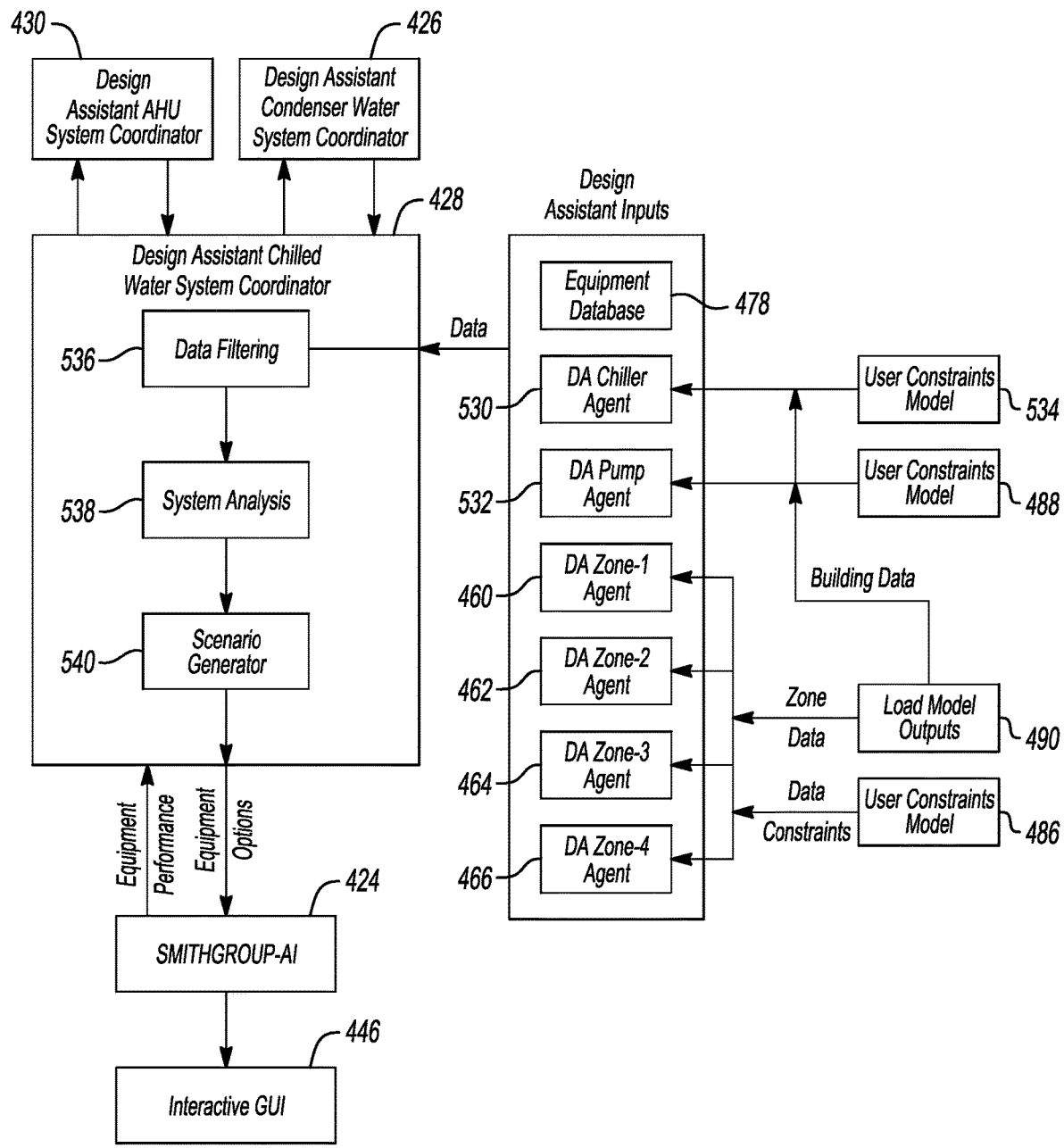
FIG. 31 shows the communication architecture between design assistant coordinators, design assistant inputs, and other system components.

Referring to FIG. 31, the design assistant chilled water system coordinator 428 is structured to receive equipment scenarios from the associated equipment agents 530, 532, the design assistant zone agents 460, 462, 464, 466, the system coordinators 426, 430, and the design assistant equipment database 478. The scenarios that the agents generate and send to the coordinator are based on load model outputs 490 and user constraint modules 486, 488, 534. Within the design assistant chilled water system coordinator 428 there are three modules. A data filtering module 536 receives the data and filters it based off user constraints and physical equipment limitations. A system analysis module 538 then analyzes the data and equipment to create performance data. A scenario generator 540 generates equipment scenarios based on the data from the system analysis module 538. The equipment scenarios are then sent to the SG-AI DA 424 for overall system analysis.

Figure 32:
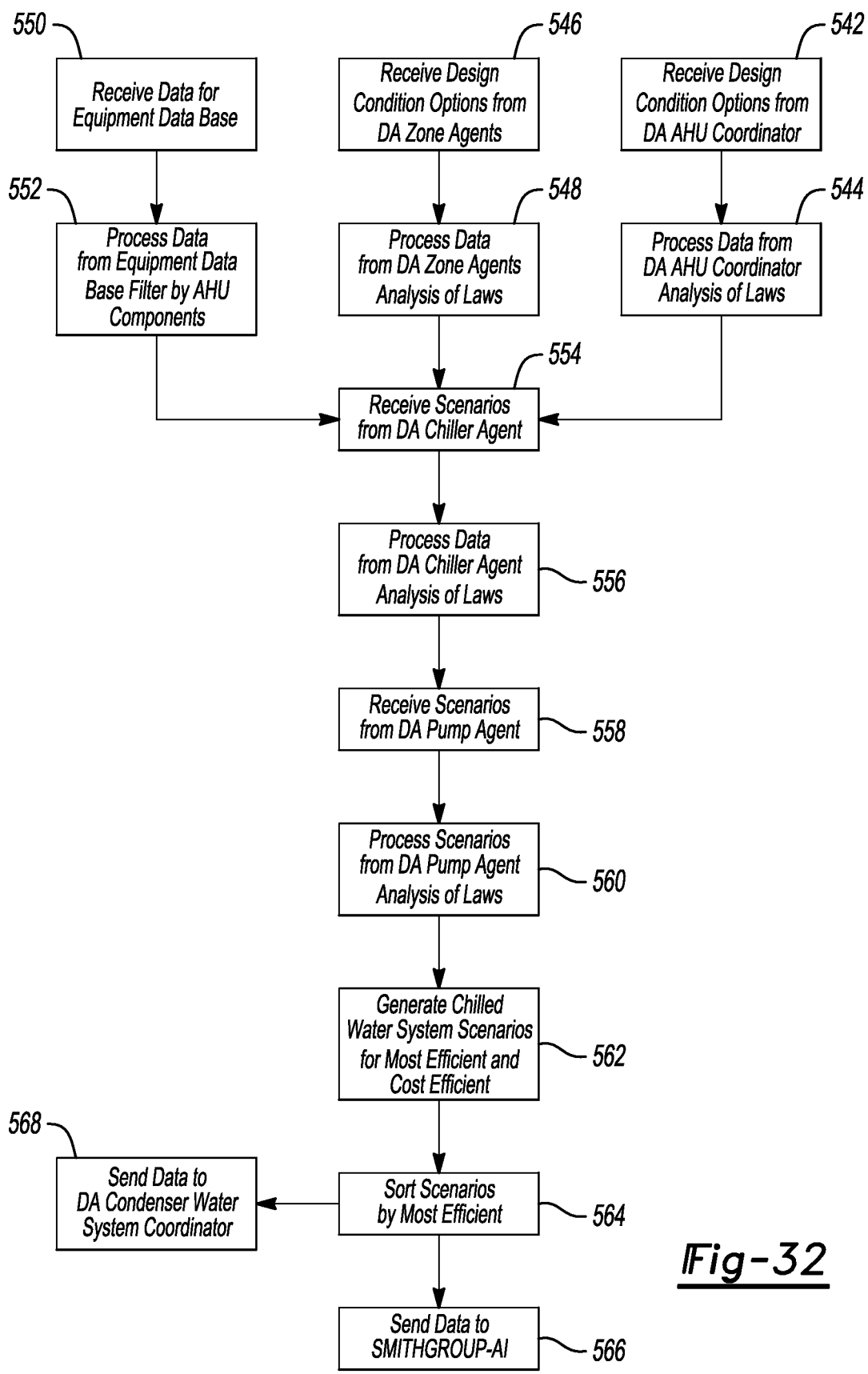
FIG. 32 shows a block diagram describing operations associated with the communication architecture of FIG. 31.

Referring to FIG. 32, each of the design assistant zone agents 460, 462, 464, 466 creates a series of scenarios associated with the zone that it is serving and sends these scenarios to the design assistant chilled water system coordinator 428. These scenarios are given a unique ID number (Table 24 below) based on a specific airflow supply air temperature (SAT) and a specific entering water temperature (EWT). The design assistant AHU system coordinator 430 may similarly send the design assistant chilled water system coordinator 428 air handling unit operating coil scenarios as described with reference to FIG. 24.

TABLE 24

Zone 1 Agent

| Zone ID | Supply Air Temperature [oF] | Entering Water Temperature [° F.] | Leaving Water Temperature [° F.] | Supply Air Design CFM [CFM] |
|---|---|---|---|---|
| Zone 1_1 | 50 | 40 | 52 | 154 |
| Zone 1_2 | 52 | 44 | 54 | 185 |
| Zone 1_3 | 52 | 44 | 56 | 154 |
| Zone 1_4 | 55 | 44 | 58 | 132 |
| Zone 1_5 | 55 | 45 | 55 | 185 |
| Zone 1_6 | 55 | 46 | 56 | 185 |

The design assistant chilled water system coordinator 428 then filters/validates all the scenarios received from the design assistant zone agents and system coordinators (Table 25 below). The validation process could be based on the physical limitation of a chiller. In some instances, even though a zone may be able to be cooled with a very cold air temperature (e.g., 50° F.), due the operating conditions or physical limitations of the chiller, the system may not be able to cool the air to 50° F. As such the design assistant chilled water system coordinator 428 may label the associated scenarios as invalid.

TABLE 25

Zone 1 Agent

| | Supply Air Temperature [oF] | Entering Water Temperature [° F.] | Leaving Water Temperature [° F.] | Supply Air Design CFM [CFM] |
|---|---|---|---|---|
| ~~Zone 1_1~~ | ~~50~~ | ~~40~~ | ~~52~~ | ~~154~~ |
| Zone 1_2 | 52 | 44 | 54 | 185 |
| Zone 1_3 | 52 | 44 | 56 | 154 |
| Zone 1_4 | 55 | 44 | 58 | 132 |
| Zone 1_5 | 55 | 45 | 55 | 185 |
| Zone 1_6 | 55 | 46 | 56 | 185 |

The design assistant chilled water system coordinator 428 then filters data from the equipment database for chilled water system components. The equipment data is analyzed together with the design assistant zone agent data and design assistant AHU system coordinator data to generate scenarios of the number and the capacity of possible chillers in the system. These scenarios are given a unique ID number based on entering water temperature (EWT) and type of chiller. After the chiller equipment scenarios are validated based on the validation process above, the possible chiller design condition scenarios are analyzed by the pump agent 532. The pump agent 532 determines the possible arrangement, type, and number of pumps based off the equipment database pump curves. Each pump scenario is given a unique ID number (Table 26 below) based on the number of pumps and pump type.

TABLE 26

Pump Agent

| Pump Scenario ID | Number of Pumps | Pump Type | Individual Pump Flow [GPM] | Discharge Head [ftH2O] | Design Operating Efficiency |
|---|---|---|---|---|---|
| PMP-1 | 1 | Base Mounted, End Suction Centrifugal | 425 | 120 | 72 |
| PMP-2 | 2 | Base Mounted, End Suction Centrifugal | 225 | 120 | 83 |
| PMP-3 | 2 | Inline Centrifugal | 200 | 120 | 79 |
| PMP-4 | 2 | Inline Centrifugal | 200 | 120 | 72 |
| ~~PMP-5~~ | ~~4~~ | ~~Inline Centrifugal~~ | ~~80~~ | ~~120~~ | ~~50~~ |
| ~~PMP-6~~ | ~~4~~ | ~~Inline Centrifugal~~ | ~~25~~ | ~~120~~ | ~~42~~ |

Once the pump scenarios are validated using the described validation process above, the design assistant chilled water system coordinator 428 generates the chilled water system equipment combinations, calculating the overall efficiency and cost efficiency for each scenario. The design assistant chilled water system coordinator 428 may sort the generated scenarios by efficiency before sending the data to the sg-ai da 424 and the design assistant condenser water system coordinator 426 (Table 27 below). These operations are summarized in blocks 542, 544, 546, 548, 550, 552, 554, 556, 558, 560, 562, 564, 566, 568.

TABLE 27

Chilled Water System Scenarios

| Chilled Water System ID | Chiller ID | Pump ID | Flow [GPM] | Entering Water Temperature [° F.] | Leaving Water Temperature [° F.] | Overall Efficiency |
|---|---|---|---|---|---|---|
| CHWS_3 | CH-2 | PMP-2 | 450 | 54 | 44 | 78 |
| CHWS_1 | CH-3 | PMP-2 | 450 | 54 | 44 | 76 |
| CHWS_4 | CH-4 | PMP-3 | 400 | 56 | 44 | 75 |
| CHWS_5 | CH-4 | PMP-4 | 400 | 56 | 44 | 60 |
| CHWS_6 | Ch-2 | PMP-4 | 400 | 54 | 44 | 56 |
| CHWS_2 | CH-3 | PMP-1 | 425 | 54 | 44 | 42 |

Figure 33:
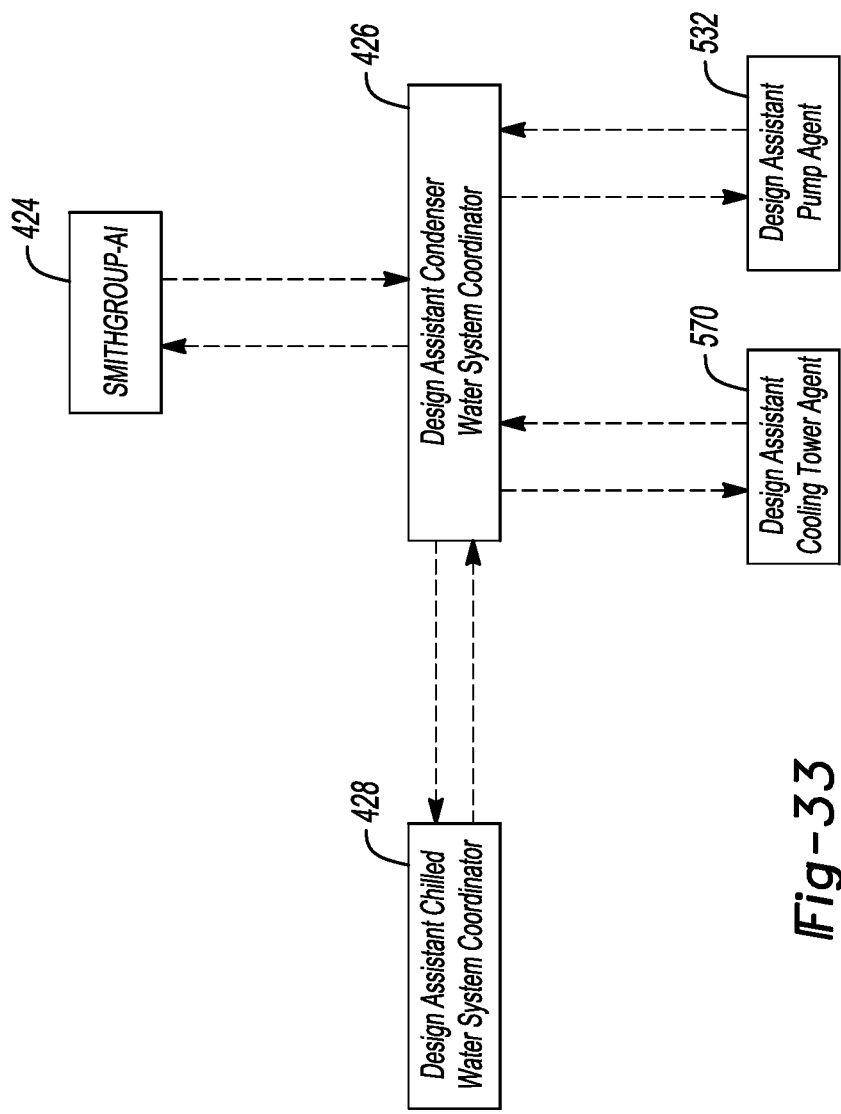
FIG. 33 shows the communication architecture between a design assistant coordinator, design agents, and other system components.

Referring to FIG. 33, for generating the condenser water system equipment, the design assistant condenser water system coordinator 426 receives scenarios for load rejection requirements from the design assistant chilled water system coordinator 428. These scenarios are filtered based off user constraints and physical equipment limitations. The condenser water system coordinator 426 may then communicate with specific equipment agents 432, 570 (e.g., cooling tower agent) to generate equipment scenarios that meet the heat load rejection requirements. The design assistant condenser water system coordinator 426 then sends the scenarios and associated data to the SG-AI DA 424.

Figure 34:
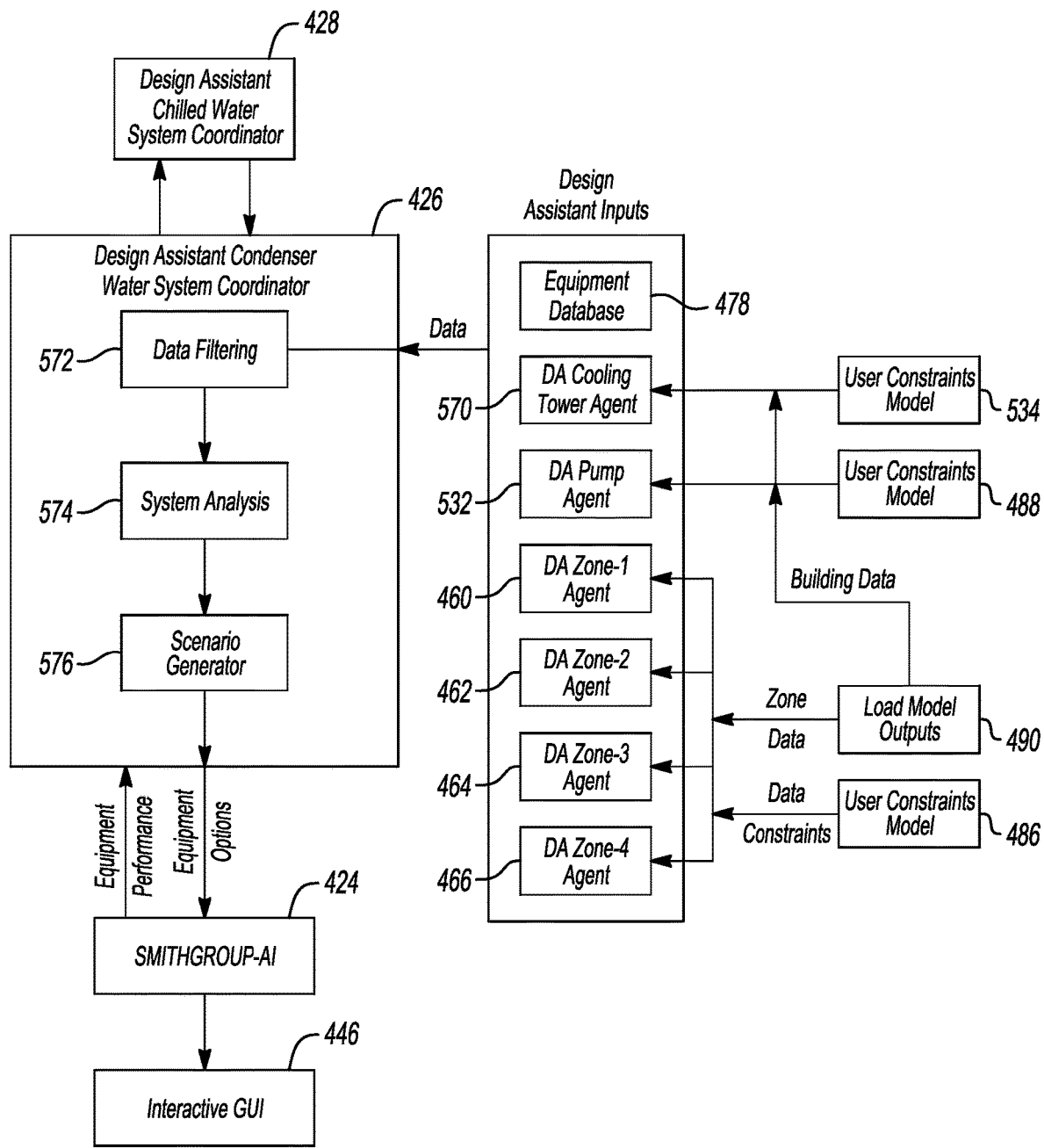
FIG. 34 shows the communication architecture between design assistant coordinators, design assistant inputs, and other system components.

Referring to FIG. 34, the condenser water system coordinator 426 is structured to receive data/equipment scenarios from the associated equipment agents 532, 570, the design assistant zone agents 460, 462, 464, 466, the system coordinator 428, and the design assistant equipment database 478. The scenarios that the agents generate and send to the coordinator are based on the load model outputs 490 and the user constraint modules 486, 488, 490. Within the design assistant condenser water system coordinator 426 there are three modules. A data filtering module 572 receives the data and filters it based off user constraints and physical equipment limitations. A system analysis module 574 then analyzes the data and equipment to create performance data. A scenario generator 576 generates equipment scenarios based on the data from the system analysis module 574. The equipment scenarios are then sent to the SG-AI DA 424 for overall system analysis.

Figure 35:
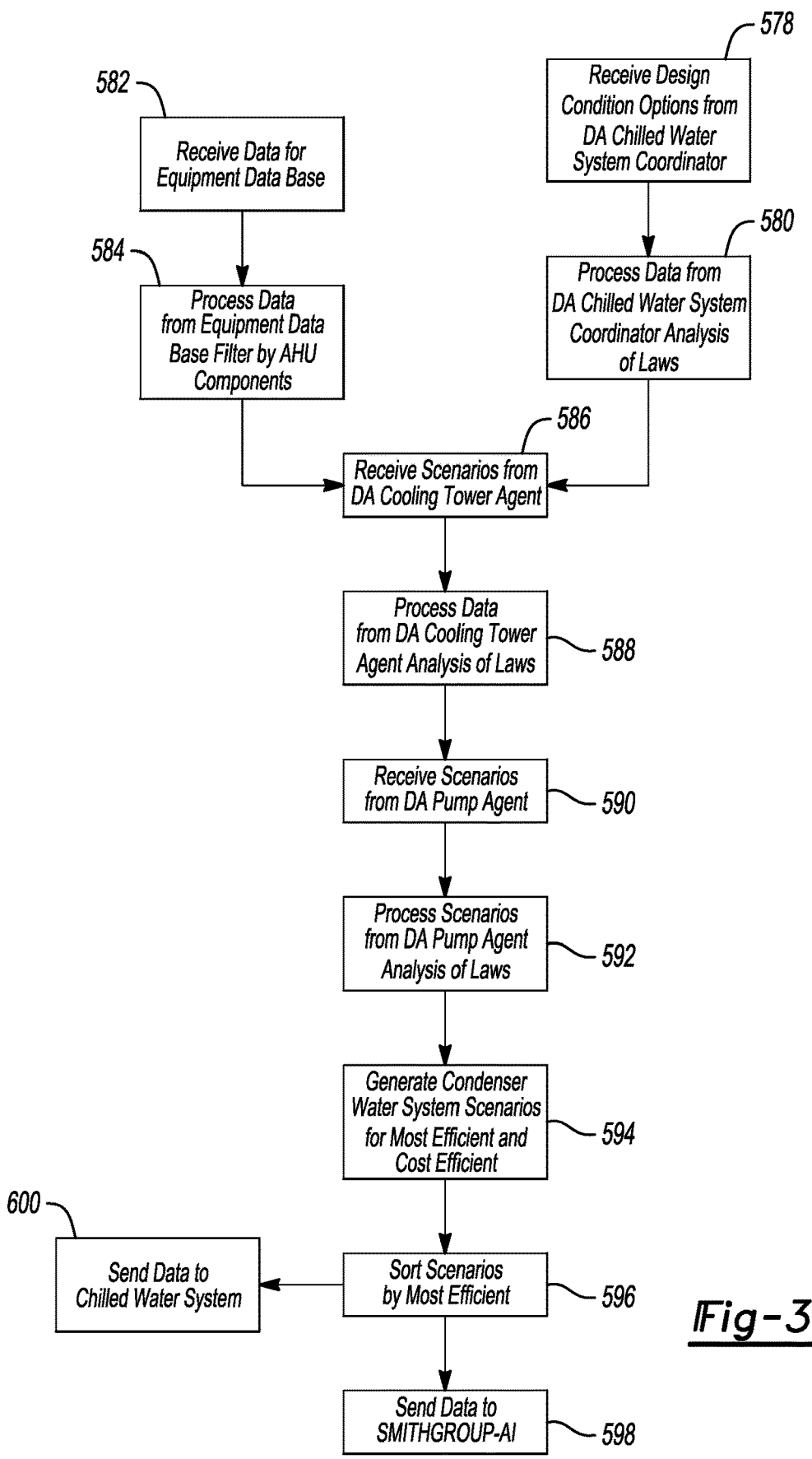
FIG. 35 shows a block diagram describing operations associated with the communication architecture of FIG. 34.

Referring to FIG. 35, the design assistant chilled water system coordinator 428 may send the design assistant condenser water system coordinator 426 design entering and leaving condenser water conditions based off the generated scenarios described with reference to FIG. 32. The design assistant condenser water system coordinator 426 then validates the scenarios based off user constraints or physical limitations of a cooling tower (see Table 28 below). For example, a chiller may be able to operate the condenser with a low entering water temperature (e.g., 75° F.), but due to the operation limitations of a cooling tower, the condenser water system will not be able to cool water down to that temperature. As such the condenser water coordinator 426 may label the associated scenarios as invalid.

TABLE 28

Chiller Water System Coordinator Conditions

| | Entering Water Temperature [oF] | Leaving Water Temperature [oF] | Flow [GPM] |
|---|---|---|---|
| CHWS_1 | 85 | 95 | 400 |
| CHWS_2 | 86 | 96 | 400 |
| CHWS_3 | 85 | 95 | 400 |
| ~~CHWS_4~~ | ~~75~~ | ~~95~~ | ~~200~~ |
| CHWS_5 | 84 | 94 | 400 |
| CHWS_6 | 87 | 97 | 400 |

The design assistant condenser water system coordinator 426 then filters data from the equipment database 478 for condenser water system components. The equipment data is analyzed together with the design assistant chilled water system coordinator data to generate scenarios of the number and the capacity of possible cooling towers in the system. These scenarios are given a unique ID number based on the number of cooling towers and cell quantity. After the cooling towers are validated using the process described above, the possible cooling tower design condition scenarios are analyzed by the pump agent 532. The pump agent 532 determines the possible arrangement, type, and number of pumps based off the equipment database pump curves. Each pump scenario is given a unique ID number (Table 29 below) based on the number of pumps and pump type.

TABLE 29

Pump Agent

| Pump Scenario ID | Number of Pumps | Pump Type | Individual Pump Flow [GPM] | Discharge Head [ftH2O] | Design Operating Efficiency |
|---|---|---|---|---|---|
| PMP-1 | 1 | Base Mounted, End Suction Centrifugal | 425 | 75 | 70 |
| PMP-2 | 2 | Base Mounted, End Suction Centrifugal | 225 | 75 | 86 |
| PMP-3 | 2 | Inline Centrifugal | 225 | 75 | 79 |
| PMP-4 | 2 | Inline Centrifugal | 225 | 75 | 80 |
| PMP-5 | 4 | Inline Centrifugal | 110 | 75 | 50 |
| PMP-6 | 4 | Inline Centrifugal | 125 | 75 | 60 |

Once the pump scenarios are validated using the described validation process above, the condenser water system coordinator generates the condenser water system equipment combinations, calculating the overall efficiency and cost efficiency for each scenario. The coordinator 426 may sort the generated scenarios by overall efficiency before sending the data to the SG-AI DA 424 and the design assistant chilled water system coordinator 428 (Table 30 below). These operations are summarized in blocks 578, 580, 582, 584, 586, 588, 590, 592, 594, 596, 598, 600.

TABLE 30

Condenser Water System Scenarios

| Condenser Water System ID | Cooling Tower ID | Pump ID | Flow [GPM] | Entering Water Temperature [° F.] | Leaving Water Temperature [° F.] | Overall Efficiency |
|---|---|---|---|---|---|---|
| CWS_1 | CT-1 | PMP-2 | 450 | 95 | 85 | 88 |
| CWS_4 | CT-4 | PMP-3 | 450 | 97 | 87 | 80 |
| CWS_3 | CT-3 | PMP-2 | 450 | 96 | 86 | 78 |
| CWS_5 | CT-4 | PMP-4 | 450 | 97 | 87 | 75 |
| CWS_6 | CT-1 | PMP-4 | 450 | 95 | 85 | 60 |
| CWS_2 | CT-3 | PMP-1 | 425 | 96 | 86 | 50 |

Figure 36:
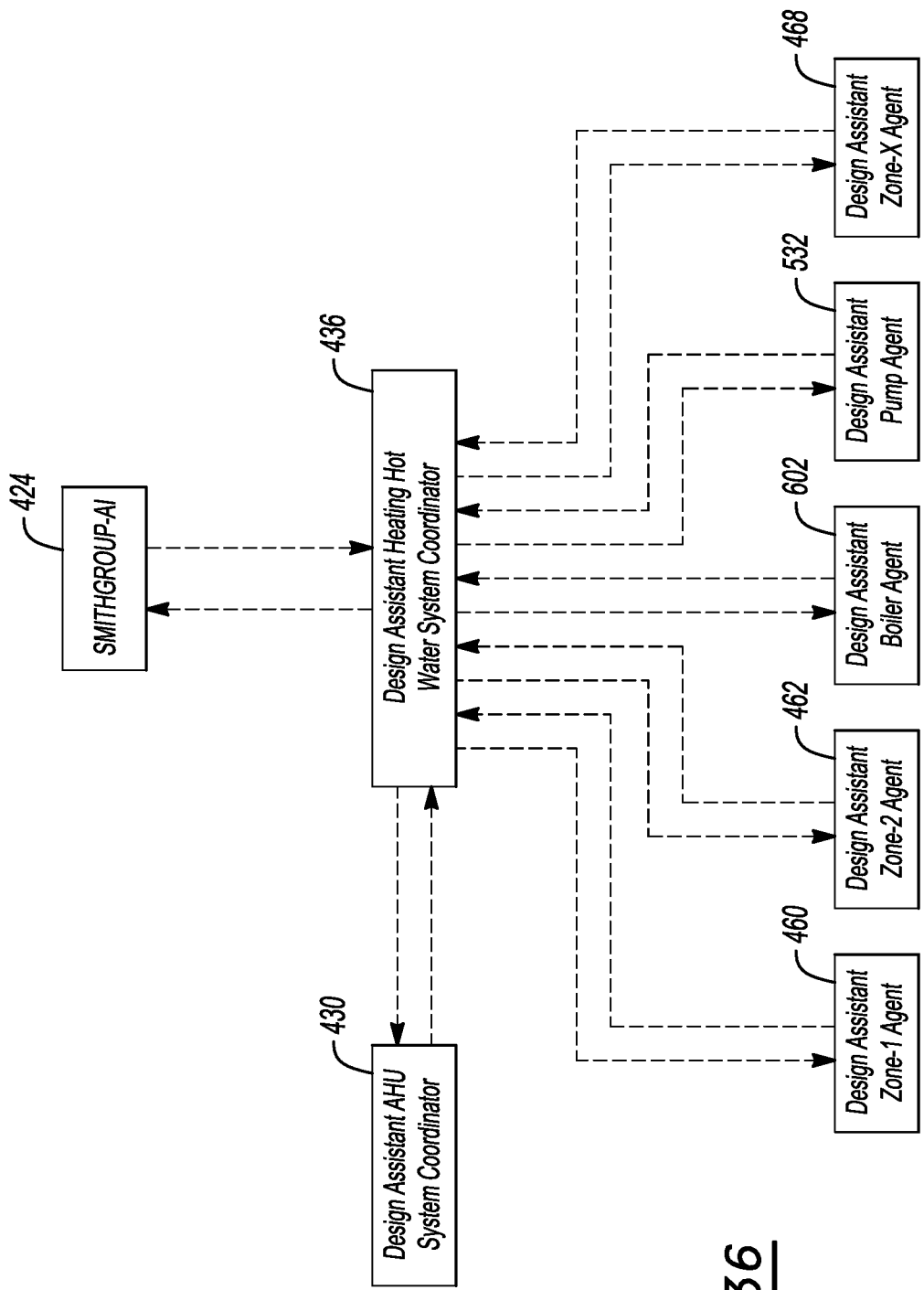
FIG. 36 shows the communication architecture between a design assistant coordinator, design agents, and other system components.

Referring to FIG. 36, for generating the heating hot water system equipment, each of the design assistant zone agents 460, 462, 468 may create scenarios that fulfill the heating load requirements of the associated space and send the scenarios to the design assistant heating hot water system coordinator 436. the design assistant AHU system coordinator 430 may also create coil load requirements, such as entering and leaving water temperature, based off the AHU equipment scenarios generated above. These load scenarios are filtered by the design assistant heating hot water system coordinator 436 based off user constraints and physical equipment limitations. The design assistant heating hot water coordinator 436 may then communicate with specific hot water system agents 532, 602 (e.g., boiler agent) to produce equipment scenarios that meet the required heating hot water load from the design assistant AHU system coordinator 430 and the design assistant zone agents 460, 462, 468. The design assistant heating hot water system coordinator 436 may then send these scenarios and associated data to the SG-AI DA 424.

Figure 37:
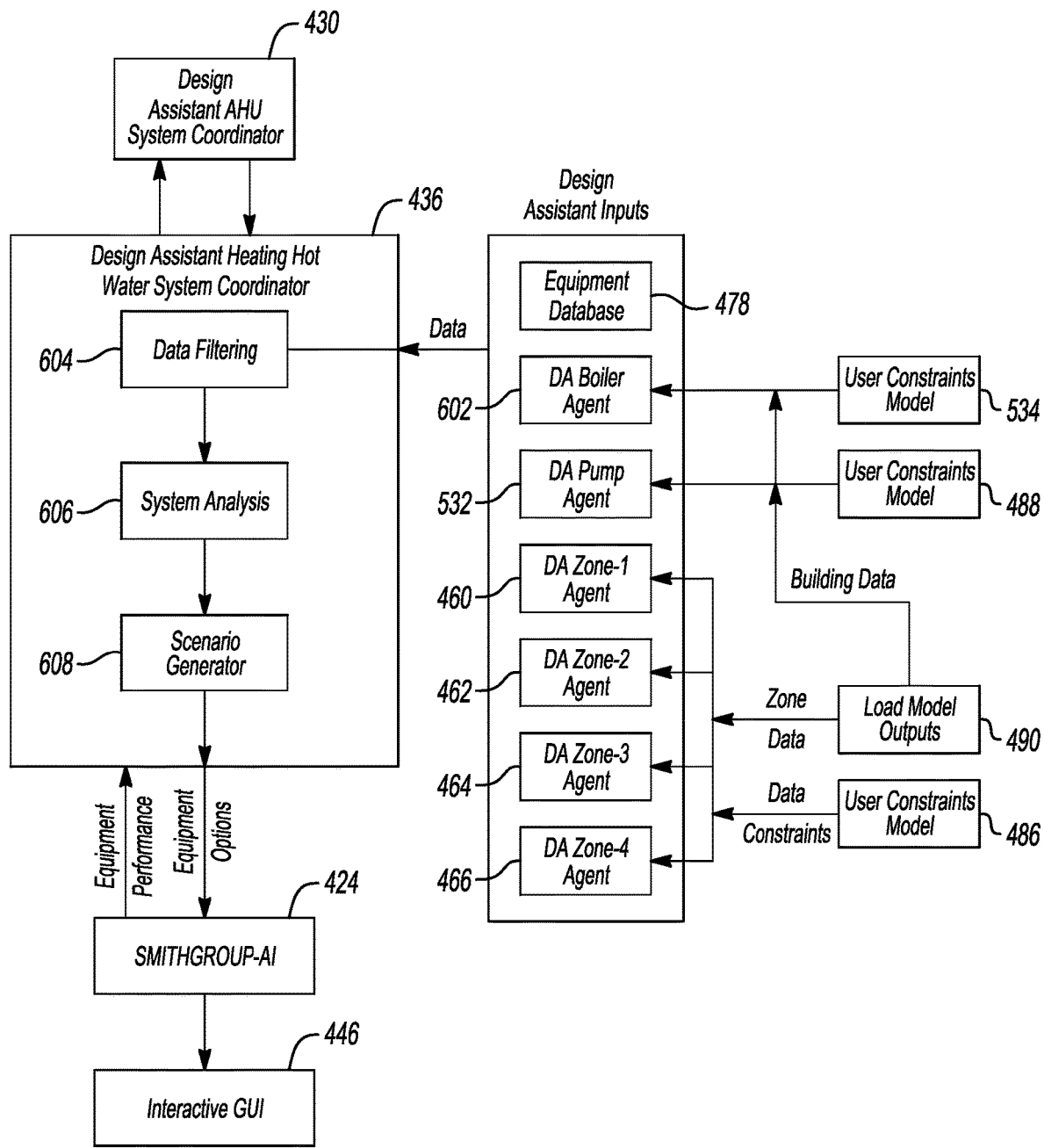
FIG. 37 shows the communication architecture between design assistant coordinators, design assistant inputs, and other system components.

Referring to FIG. 37, the design assistant heating hot water system coordinator 436 is structured to receive data/equipment scenarios from the associated equipment agents 532, 602, the design assistant zone agents 460, 462, 464, 466, the system coordinator 430, and the design assistant equipment database 478. The scenarios that the agents generate and send to the coordinator are based on the load model outputs 490 and the user constraint modules 486, 488, 534. Within the design assistant heating hot water system coordinator 436 there are three modules. A data filtering module 604 receives the data and filters it based off user constraints and physical equipment limitations. A system analysis module 606 then analyzes the data and equipment to create performance data. A scenario generator 608 generates equipment scenarios based on the data from the system analysis module 606. The equipment scenarios are then sent to the SG-AI DA 424 for overall system analysis.

Figure 38:
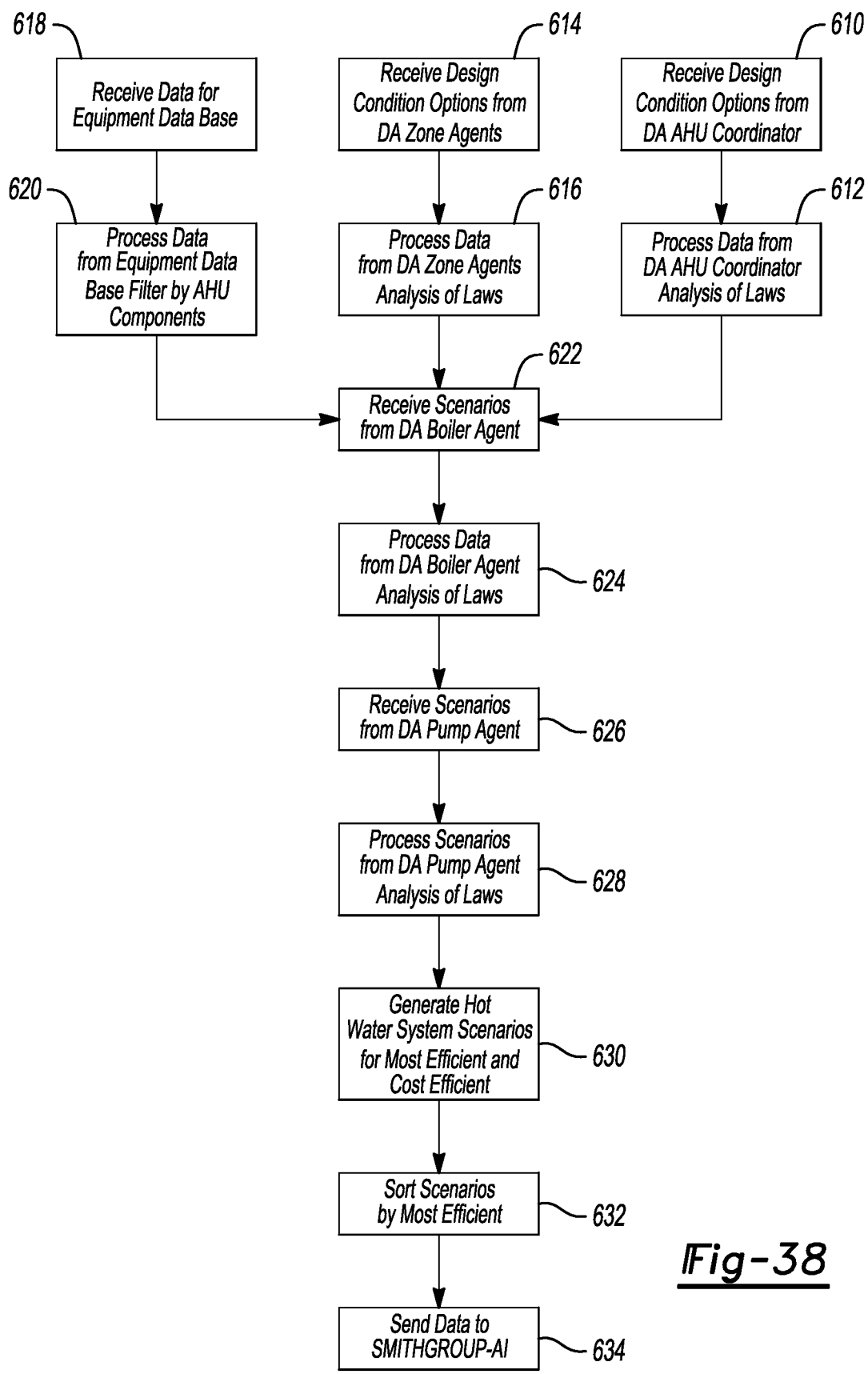
FIG. 38 shows a block diagram describing operations associated with the communication architecture of FIG. 37.

Referring to FIG. 38, each of the design assistant zone agents 460, 462, 464, 466 creates a series of scenarios associated with the zone that it is serving and sends these scenarios to the heating design assistant hot water system coordinator 436. These scenarios are given a unique ID number (Table 31 below) based on a specific airflow supply air temperature (SAT) and a specific entering water temperature (EWT). The design assistant AHU system coordinator 430 may similarly send the design assistant heating hot water system coordinator 436 air handling unit operating coil scenarios as discussed with reference to FIGS. 29A and 29B.

TABLE 31

Zone 1 Agent

| | Supply Air Temperature [oF] | Entering Water Temperature [° F.] | Leaving Water Temperature [° F.] | Supply Air Design CFM [CFM] |
|---|---|---|---|---|
| Zone 1_1 | 76 | 140 | 105 | 53 |
| Zone 1_2 | 80 | 140 | 105 | 53 |
| Zone 1_3 | 80 | 135 | 105 | 62 |
| Zone 1_4 | 85 | 160 | 140 | 93 |
| Zone 1_5 | 86 | 165 | 140 | 74 |
| Zone 1_6 | 86 | 170 | 145 | 74 |

The design assistant heating hot water system coordinator 436 may then filter/validate all the scenarios received from the design assistant zone agents and system coordinators (Table 32 below). The validation process could be based on user constraints or the physical limitation of a boiler. In some instances, even though a zone may be able to be heated with an air temperature (e.g., 76° F.), due the operating conditions or physical limitations of the boiler, the system may not be able to heat the air to only 76° F. As such, the design assistant heating hot water system coordinator 436 may label the associated scenarios as invalid.

TABLE 32

Zone 1 Agent

| | Supply Air Temperature [° F.] | Entering Water Temperature [° F.] | Leaving Water Temperature [° F.] | Supply Air Design CFM [CFM] |
|---|---|---|---|---|
| ~~Zone 1_1~~ | ~~76~~ | ~~140~~ | ~~105~~ | ~~53~~ |
| Zone 1_2 | 80 | 140 | 105 | 53 |
| Zone 1_3 | 80 | 135 | 105 | 62 |
| Zone 1_4 | 85 | 160 | 140 | 93 |
| Zone 1_5 | 86 | 165 | 140 | 74 |
| Zone 1_6 | 86 | 170 | 145 | 74 |

The design assistant heating hot water system coordinator 436 then filters data from the equipment database 478 for heating hot water system components. The equipment data is analyzed together with the design assistant zone agent data and design assistant AHU system coordinator data to generate scenarios of the number and the capacity of possible boilers in the system. These scenarios are given a unique ID number based on entering water temperature (EWT) and type of boiler. After the boiler equipment scenarios are validated based on the validation process above, the possible boiler design scenarios are analyzed by the pump agent 532. The pump agent 532 determines the possible arrangement, type, and number of pumps based off the equipment database pump curves. Each pump scenario is given a unique ID number (Table 33 below) based on the number of pumps and pump type.

TABLE 33

Pump Agent

| Pump Scenario ID | Number of Pumps | Pump Type | Individual Pump Flow [GPM] | Discharge Head [ftH2O] | Design Operating Efficiency |
|---|---|---|---|---|---|
| PMP-1 | 1 | Base Mounted, End Suction Centrifugal | 125 | 100 | 72 |
| PMP-2 | 2 | Base Mounted, End Suction Centrifugal | 75 | 100 | 68 |
| PMP-3 | 2 | Inline Centrifugal | 75 | 100 | 79 |
| PMP-4 | 2 | Inline Centrifugal | 75 | 100 | 72 |
| PMP-5 | 4 | Inline Centrifugal | 40 | 100 | 73 |
| PMP-6 | 4 | Inline Centrifugal | 40 | 100 | 42 |

Once the pump scenarios are validated using the described validation process above, the design assistant heating hot water system coordinator 436 generates the heating hot water system equipment combinations, calculating the overall efficiency and cost efficiency for each scenario; the coordinator 436 may sort the generated scenarios by efficiency before sending the data to the SG-AI DA 424 (Table 34 below). These operations are summarized in blocks 610, 612, 614, 616, 618, 620, 622, 624, 626, 628, 630, 632, 634.

TABLE 34

Hot Water System Scenarios

| Hot Water System ID | Boiler ID | Pump ID | Flow [GPM] | Entering Water Temperature [° F.] | Leaving Water Temperature [° F.] | Overall Efficiency |
|---|---|---|---|---|---|---|
| HHWS_1 | B-1 | PMP-2 | 150 | 105 | 140 | 81 |
| HHWS_5 | B-2 | PMP-3 | 150 | 115 | 140 | 75 |
| HHWS_4 | B-4 | PMP-3 | 150 | 125 | 160 | 68 |
| HHWS_6 | B-2 | PMP-4 | 120 | 115 | 140 | 67 |
| HHWS_3 | B-4 | PMP-2 | 150 | 125 | 160 | 62 |
| HHWS_2 | B-1 | PMP-1 | 125 | 105 | 140 | 55 |

A SMITHGROUP-Causal Relations SG-CR software agent 636 may constantly communicate with the SMITHGROUP-AI 10 to receive trend data from equipment variables. Multiple causal models may be created that include all the system variables in order to find the probable causes for a variable deviating from historical data or from its expected range of operation. Baseline Bayesian Information Criterion scores and matrices may be continuously created from the trend data to compare to analyses for significant deviation, which may imply a causation of variance. In addition to the causal algorithms described above, the SG-CR 636 may also use artificial intelligence algorithms, such as causal reinforcement learning, to predict the cause of a variable or a system operating outside of its expected range or the cause of a failure of a system or of a component of a system.

Figure 39:
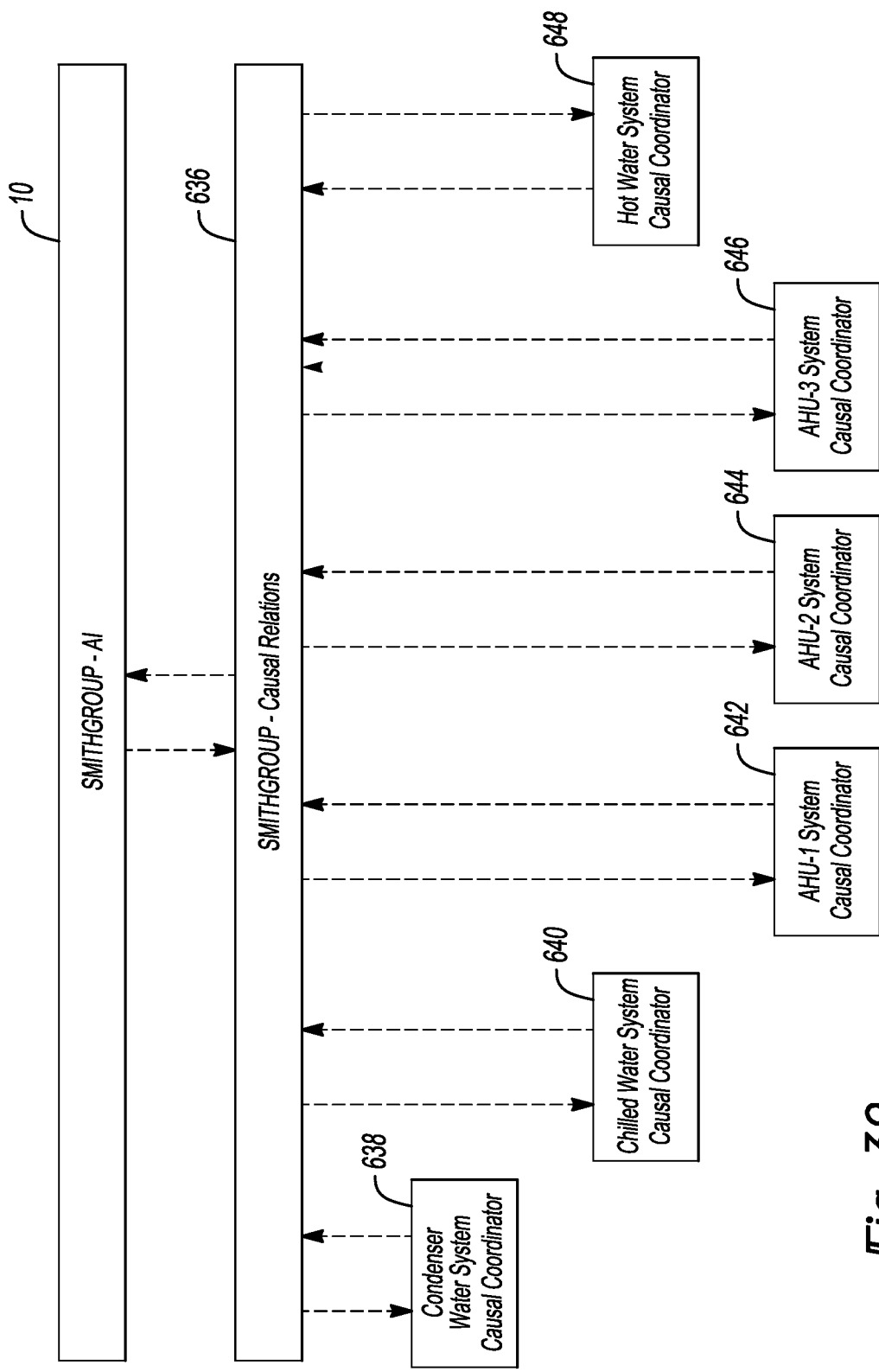
FIGS. 39 and 40 show the communication architecture between Smithgroup-causal relations agent and various causal coordinators.

Referring to FIG. 39, the SG-CR agent 636 can serve as a multifunctional software agent that is responsible for analyzing and processing the causal relationships between the variables (e.g., data from sensors, actuators, HVAC equipment, etc.) controlled by the SMITHGROUP-AI 10. The goal of the SG-CR 636 is to derive and predict the cause(s) that impacts the capability of a variable to operate within an expected range.

The SG-CR agent 636 may also direct various causal coordinators 638, 640, 642, 644, 646, 648 to perform causal analyses. If a causal system coordinator cannot identify the cause of a variable operating out of its expected range, the causal system coordinator may scale up its causal models by incorporating variables from other systems. To do so, the causal system coordinator may communicate with the SG-CR agent 636 and/or other causal system coordinators and ask these coordinators to identify variables within their associated systems that may also operate out of their expected range of operation.

Figure 40:
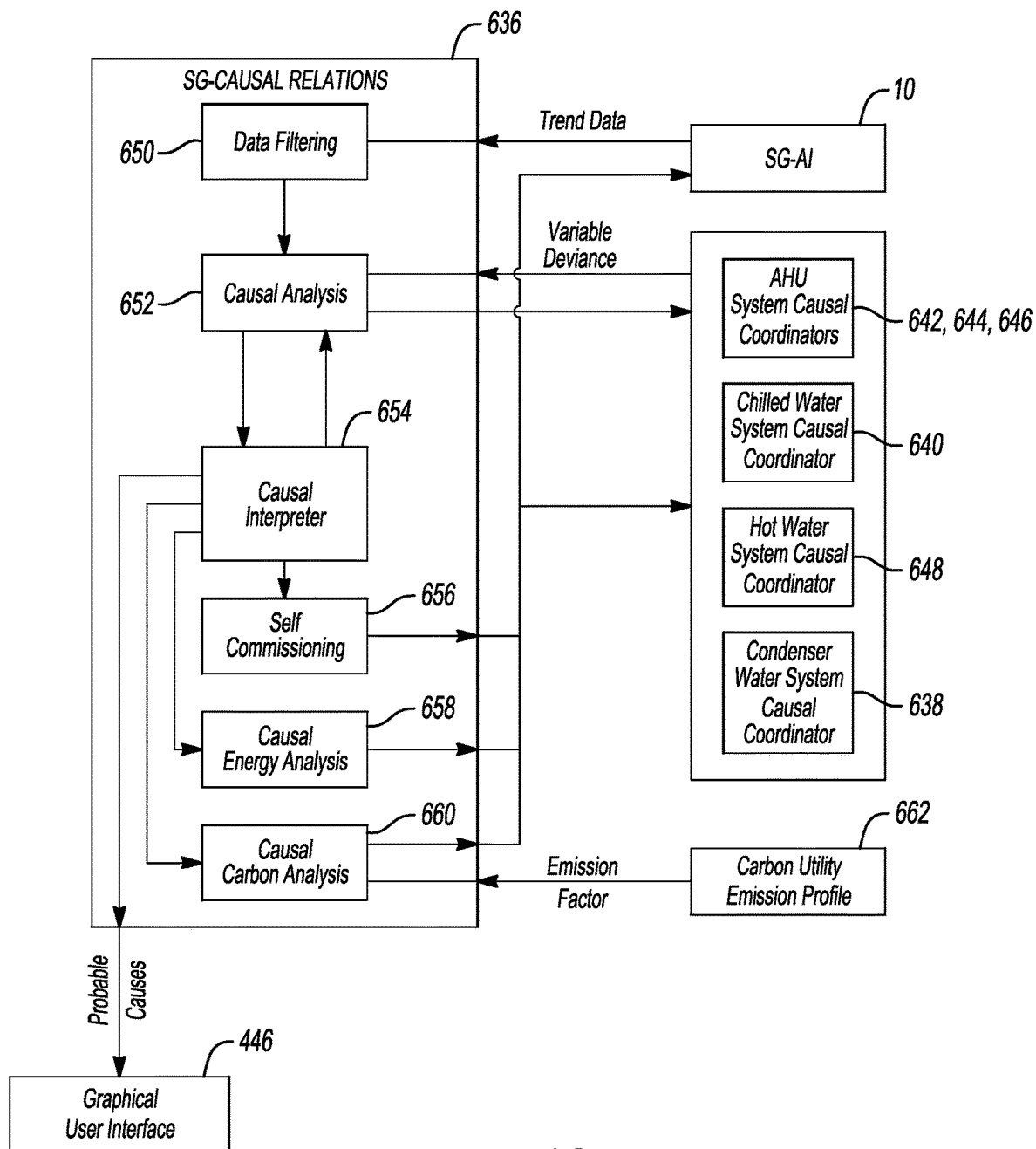

Referring to FIG. 40, the SG-CR agent 636 may achieve its goal by analyzing trend data and using statistical and causal algorithms to create causal models that may identify what variable (e.g., a sensor, an actuator, etc.) has caused another variable (e.g., a sensor, an actuator, etc.) to operate outside of its expected range of operation. Further, the SG-CR agent 636 may use statistical and causal algorithms to create causal models in order to identify why a variable (e.g., a sensor, an actuator) is operating outside of its expected range of operation.

The SG-CR 636 is comprised of several modules, each with its own dedicated algorithms and controls logic. A data filtering module 650 is responsible for separating the data received from the trend data based on physical laws and complete datasets.

A causal analysis module 652 is responsible for searching for and executing statistical and causal algorithms to produce causal models between the variable of interest and the associated trend/historic data. The statistical and causal algorithms that the SG-CR 636 may use include but are not limited to MultiFask, FASK, GFCI, FCI, FGES, and FAS, as well as various machine learning and causal reinforcement learning algorithms. The casual analysis module 652 may also include preset background knowledge on how variables are related to each other. For example, it may be defined that an increase in cooling supply airflow directly affects the cooling load capacity, but not the other way around. The causal analysis module 652 may also be responsible for creating structural equation models (SEM) that describe the dependencies of the variables.

A causal interpreter 654 may be responsible for processing the structural equation models from the causal analysis module 652 and producing the Bayesian Information Criterion scores and implied correlation matrix from the data trends. The correlation matrix will weigh the relationship between variables on a scale of 0 to 1 or −1, with one being an exact correlation. The causal interpreter 654 may then compare the resulting data to historical outputs to detect any significant deviation, e.g., 10%, change in value. The causal interpreter 654 may request the causal analysis module 652 to perform larger or smaller causal model analyses depending on the variable deviation discovered. If significant deviation occurs and if the SG-CR 636 and SG-AI agents cannot self-fix (via self-commissioning module 656) the cause of the deviation, the causal interpreter 654 may be responsible for sending the variables in question to the interactive GUI 446 for user direction. For example, the SG-CR agent 636 may present the user with an analysis indicating that there is a high probability that the strainer of a coil of an air handling unit is clogged and cleaning is required in order to have the air handling unit operate within its expected range of operation.

A causal energy analysis module 658 and a causal carbon analysis module 660 may be included as discussed further below. The causal carbon analysis module 660 receives emission factors from a carbon utility emission profile module 662 also as discussed further below.

Figure 41:
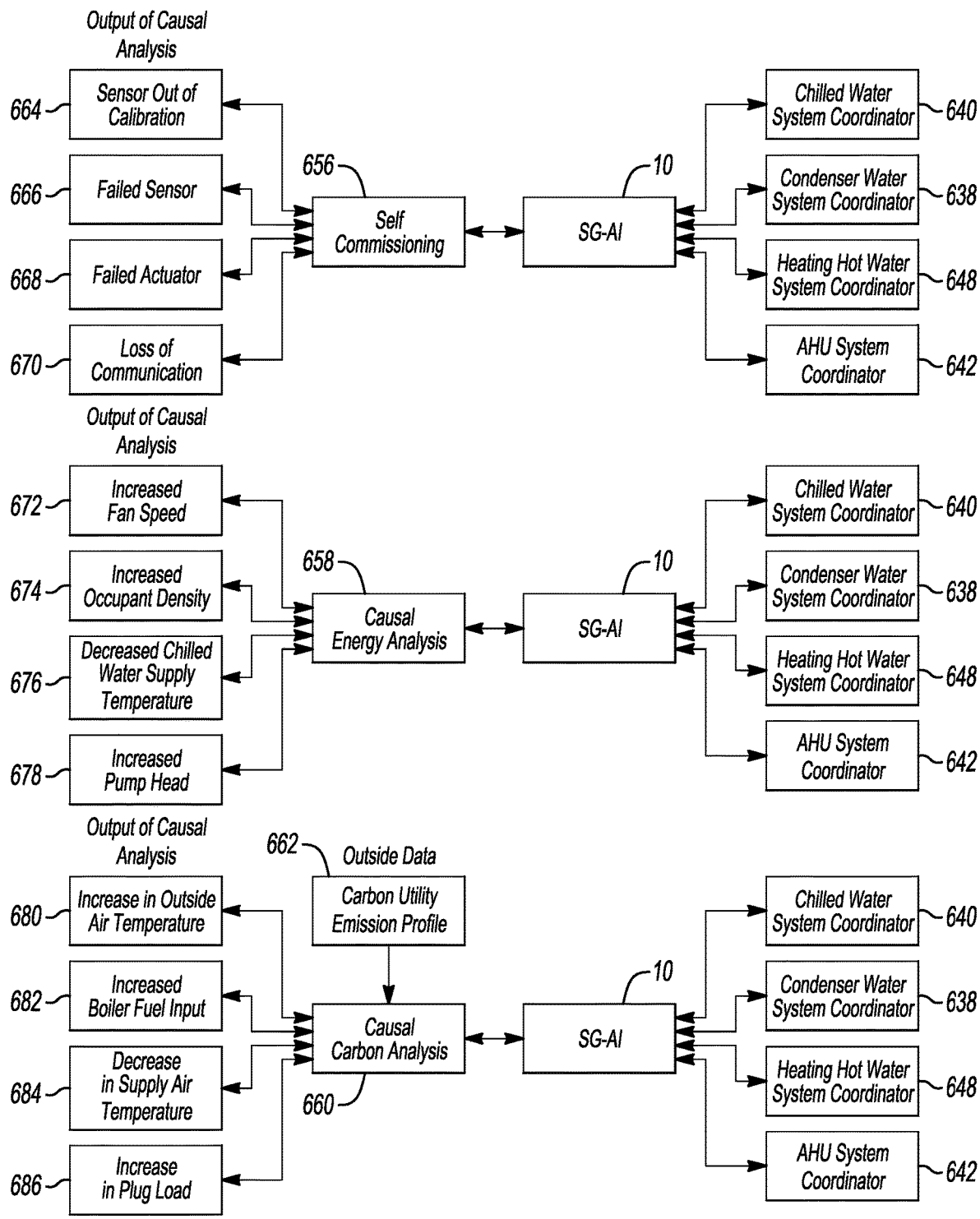
FIG. 41 shows the communication architecture between modules of the Smithgroup-causal relations agent, causal coordinators, and other system components.

Referring to FIG. 41, The self-commissioning module 656 may be responsible for analyzing the causal models and the outputs from the causal interpreter 654 and may ask the SG-AI 10 to perform certain actions (e.g., perform tests by modulating a control valve actuator) to compensate for the fact that an actuator may have failed. Further the self-commissioning module 656 may also be responsible for compensating for sensors and actuators that will need recalibration.

For example, if a sensor is out of calibration, the self-commissioning module 656 may identify the range outside of normal readings and communicate this range to the SG-AI 10. The SG-AI 10 may, in turn communicate with the associated system coordinators to update their internal predictions.

Further, if the causal analysis indicates that the actuator of the air handling unit outside air damper has failed open, the self-commissioning module 656 may communicate to the SG-AI 10 that said the air handling unit will now need to temporarily operate in an emergency mode of operation until a new actuator is installed. The self-commissioning module 656 may also annunciate this type of alarm at the GUI 446.

Certain outputs of the causal analysis associated with the self-commissioning module 656 are detailed in boxes 664, 666, 668, 670.

The causal energy analysis module 658 may be responsible for analyzing the causal models and the outputs from the causal interpreter 654 and may ask the SG-AI 10 to perform certain actions (e.g., perform tests by modulating a pump's speed) to compensate for the fact that an unexpected increase in energy consumption has occurred. Further, the causal energy analysis module 658 may also be responsible for tracking the top causes for increase in energy consumption.

For example, if a fan starts operating at higher speed, the causal energy analysis module 658 may identify the fan's energy consumption range outside of normal readings and communicate this range to the SG-AI 10. The SG-AI 10 may, in turn, communicate with the associated system coordinators to update their internal predictions.

Further, if the causal analysis indicates that increasing outside air temperature has the biggest impact on energy consumption, the causal energy analysis module 658 may communicate to the SG-AI 10 to anticipate higher energy consumption as outside air temperature increases.

Certain outputs of the causal analysis associated with the causal energy analysis module 658 are detailed in boxes 672, 674, 676, 678.

The causal carbon analysis module 660 may be responsible for analyzing the current utility carbon emission factor with the causal models and the outputs from the causal interpreter 654, and may ask the SG-AI 10 to perform certain actions (e.g., perform tests by modulating a pump's speed) to compensate for the fact that an unexpected increase in carbon equivalent emissions has occurred. Further, the causal carbon analysis module 660 may also be responsible for tracking the top causes for increase in carbon equivalent emissions as well as tracking the utility carbon profile 662.

For example, if a plug load increases dramatically, the causal carbon analysis module 660 may identify the plug load carbon consumption range outside of normal readings and communicate this range to the SG-AI 10. The SG-AI 10 may, in turn, communicate with the associated system coordinators to update their internal predictions.

Further, if the causal analysis indicates that heating demand has the biggest impact on carbon consumption, the causal carbon analysis module 660 may communicate to the SG-AI 10 to anticipate higher carbon consumption as heating demand increases.

The causal analysis for the causal energy analysis module 658 and causal carbon analysis module 660 may use a similar process to the one described for the self-commissioning module 656.

Certain outputs of the causal analysis associated with the causal carbon analysis module 660 are detailed in boxes 680, 682, 684, 686.

Figure 42:
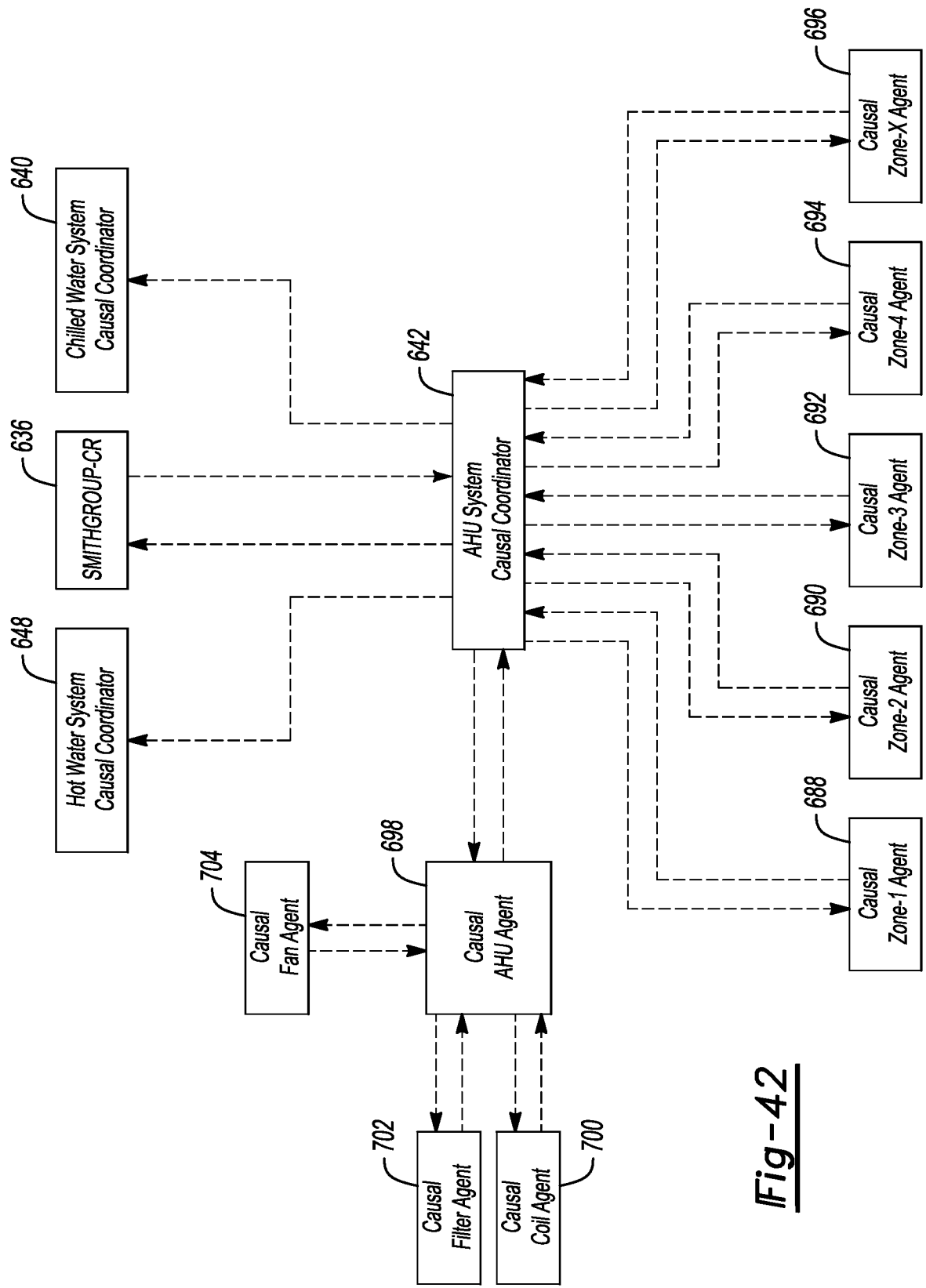
FIG. 42 shows the communication architecture between an air handling unit causal coordinator, agents, and other system components.

Referring to FIG. 42, the AHU system causal coordinator 642 is an independent software agent that monitors and controls all causal agents 688, 690, 692, 694, 696, 698, 700, 702, 704 associated with its respective airside system. Further, the AHU system causal coordinator 642 may be responsible for the following:

Performing overall system causal analyses.

Communication with the SG-CR 636: sends system causal analyses and receives commands from the SG-CR 636.

Communication with the causal AHU agent 698: requests causal models and/or outputs of causal models from the causal AHU agent 698 and sends outputs from the causal analyses performed by other causal agents (e.g., causal zone agents) such that the causal AHU agent 698 can improve its own causal models.

Communication with the hot water system causal coordinator 648 and the chilled water system causal coordinator 640. The type of information that the AHU system causal coordinator 642 communicates to the hot water system causal coordinator 648 and the chilled water system causal coordinator 640 may represent causal models and/or outputs of causal models.

Figure 43:
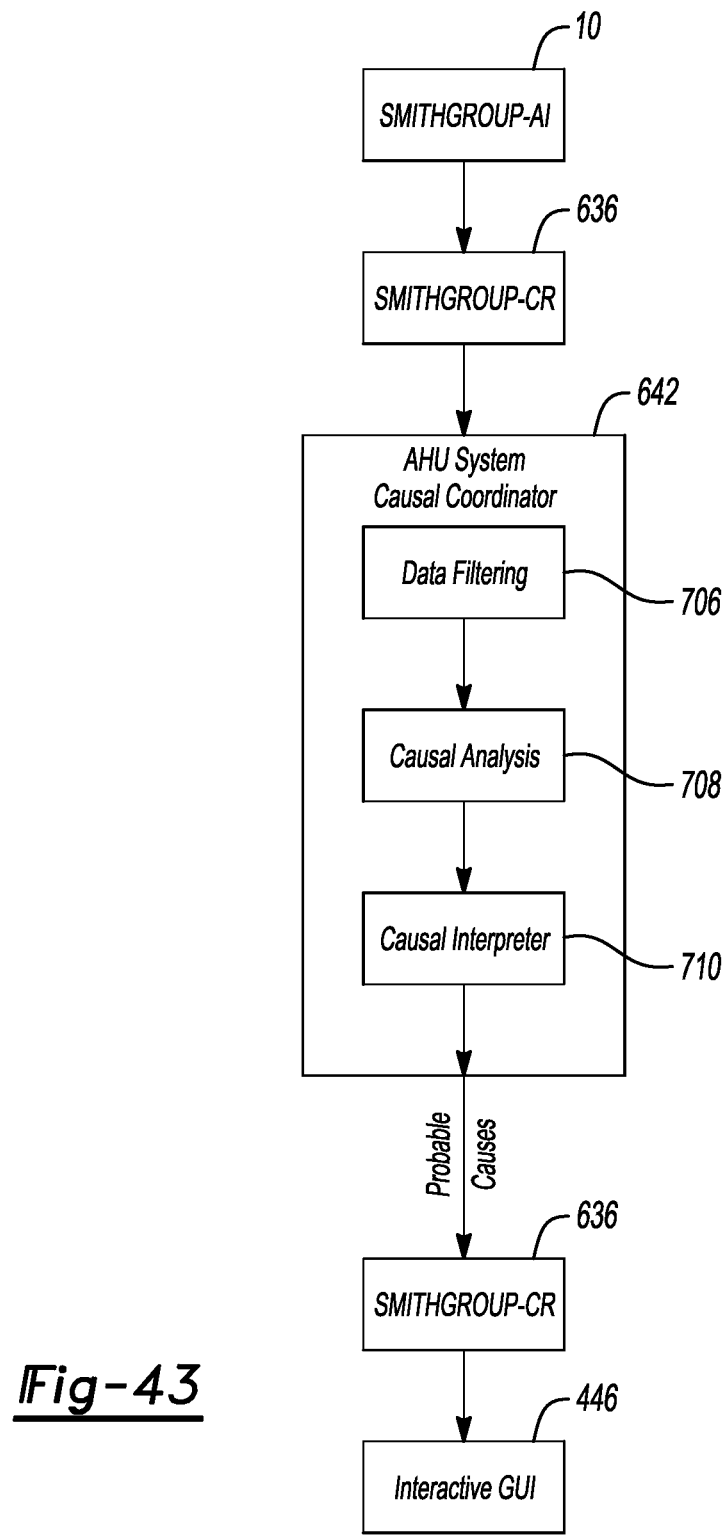
FIG. 43 shows the communication architecture between an air handling unit causal coordinator and other system components.

Referring to FIG. 43, the AHU system causal coordinator 642 may achieve its goal by analyzing trend data and using statistical and causal algorithms to create causal models that may identify what variable (e.g., a sensor, an actuator, etc.) has caused another variable (e.g., a sensor, an actuator, etc.) to operate outside of its expected range of operation. Further, the AHU system causal coordinator 642 may use statistical and causal algorithms to create causal models in order to identify why a variable (e.g., a sensor, an actuator, etc.) is operating outside of its expected range of operation.

The AHU system causal coordinator 642 is comprised of three modules, each with its own dedicated algorithms and controls logic. A data filtering module 706 is responsible for separating the data received from the trend data based on physical laws and complete datasets.

A causal analysis module 708 is responsible for searching for and executing statistical and causal algorithms to produce causal models between the variable of interest and the associated trend/historic data. The statistical and causal algorithms that the AHU system causal coordinator 642 may use include but are not limited to MultiFask, FASK, GFCI, FCI, FGES, and FAS, as well as various machine learning and causal reinforcement learning algorithms. The casual analysis module 642 may also include preset background knowledge on how variables are related to each other. For example, it may be defined that an increase in cooling supply airflow directly affects the cooling load capacity, but not the other way around. The causal analysis module 708 may also be responsible for creating structural equations models (SEM) that describe the dependencies of the variables.

A causal interpreter 710 may be responsible for processing the structural equation models from the causal analysis module 708 and producing the Bayesian Information Criterion scores and implied correlation matrix from the data trends. The correlation matrix will weigh the relationship between variables on a scale of 0 to 1 or −1, with one being an exact correlation. The causal interpreter 710 may then compare the resulting data to historical outputs to detect any significant deviation, e.g., 10%, change in value. The causal interpreter 710 may request the causal analysis module 708 to perform larger or smaller causal model analyses depending on the variable deviation discovered. If significant deviation occurs and if the SG-CR 636 and SG-AI 10 cannot self-fix (via the self-commissioning module) the cause of the deviation, the AHU system causal coordinator 642 may be responsible for sending the variables in question to the interactive GUI 446 for user direction. For example, the causal interpreter agent 710 may present the user with an analysis indicating that there is a high probability that the strainer of a coil of an air handling unit is clogged and cleaning is required in order to have the air handling unit operate within its expected range of operation.

Figure 44:
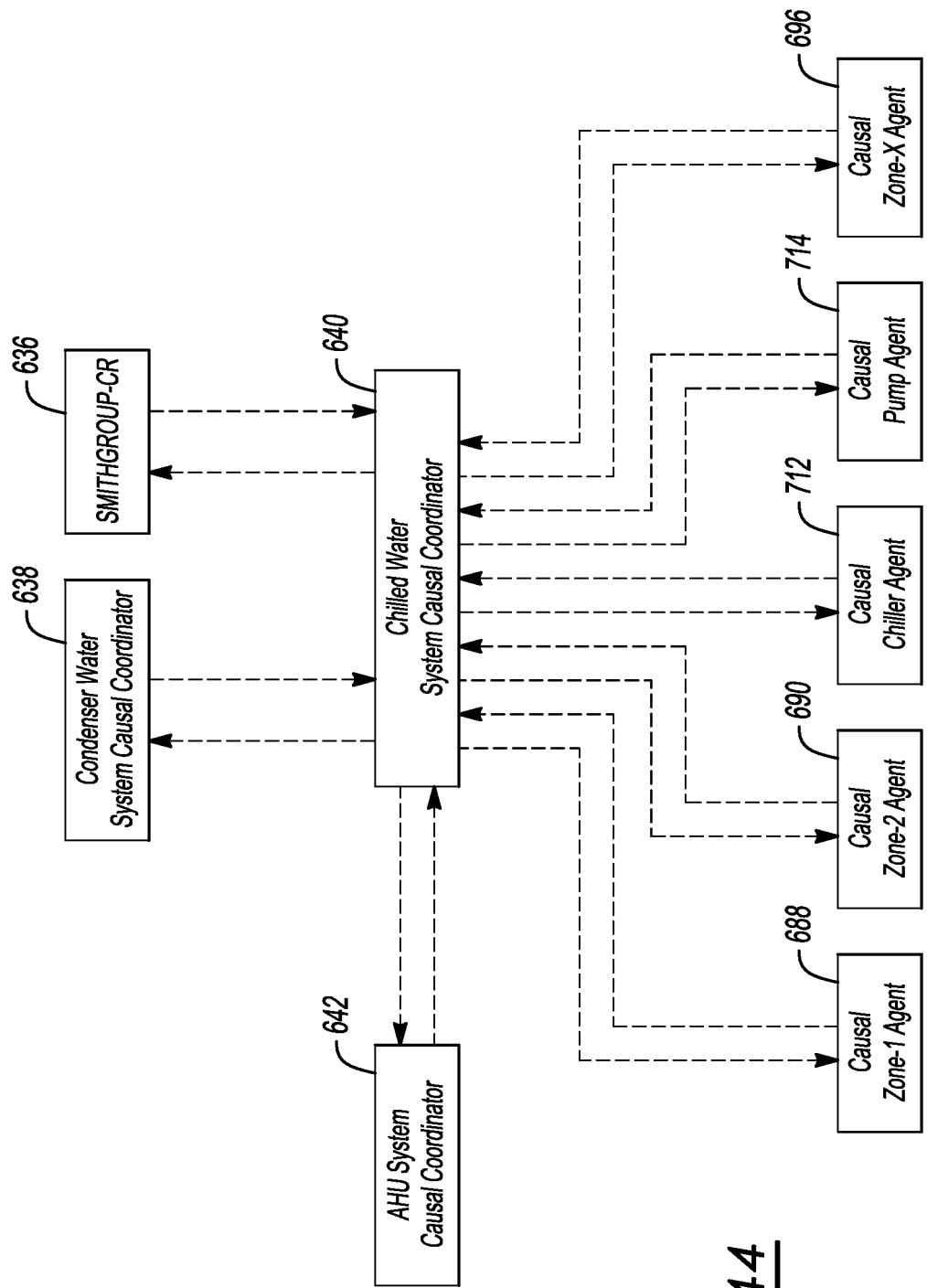
FIG. 44 shows the communication architecture between a chilled water system causal coordinator, agents, and other system components.

Referring to FIG. 44, the chilled water system causal coordinator 640 is an independent software agent that monitors and controls all causal agents 688, 690, 696, 712, 714 associated with its respective chilled water system. Further, the chilled water system causal coordinator 640 may be responsible for the following:

Performing overall system causal analyses.

Communicating with the SG-CR 636: sends system causal analyses and receives commands from the SG-CR 636.

Communication with the causal chiller agent 712: requests causal models and/or outputs of causal models from the causal chiller agent 712 and sends outputs from the causal analyses performed by other causal agents (e.g., causal zone agents) such that the causal chiller agent 712 can improve its own causal models.

Communication with the AHU system causal coordinator 642 and the condenser water system causal coordinator 638. The type of information that the chilled water system causal coordinator 640 communicates to the AHU system causal coordinator 642 and the condenser water system causal coordinator 638 may represent causal models and/or outputs of causal models.

Figure 45:
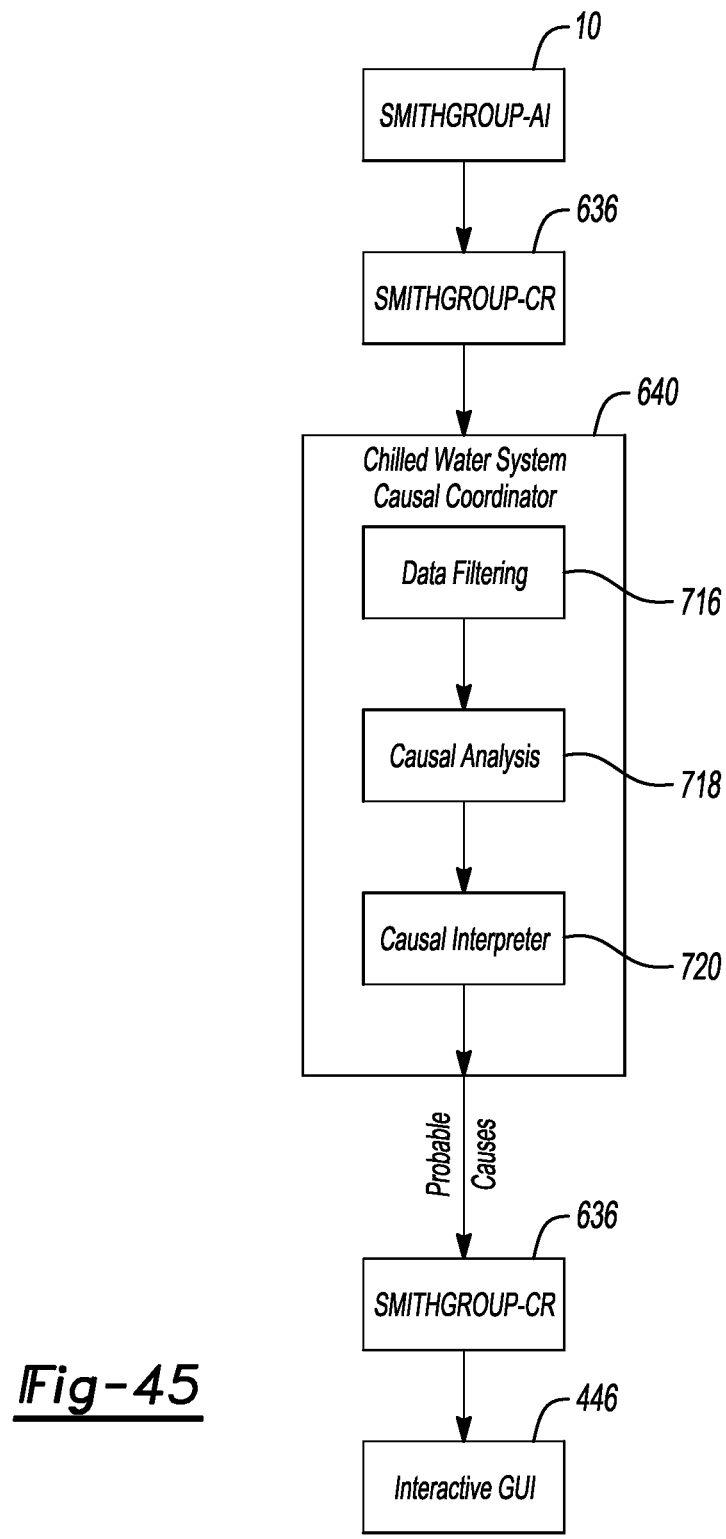
FIG. 45 shows the communication architecture between a chilled water system causal coordinator and other system components.

Referring to FIG. 45, the chilled water system causal coordinator 640 may achieve its goal by analyzing trend data and using statistical and causal algorithms to create causal models that may identify what variable (e.g., a sensor, an actuator, etc.) has caused another variable (e.g., a sensor, an actuator, etc.) to operate outside of its expected range of operation. Further, the chilled water system causal coordinator 640 may use statistical and causal algorithms to create causal models in order to identify why a variable (e.g., a sensor, an actuator, etc.) is operating outside of its expected range of operation.

The chilled water system causal coordinator 640 is comprised of three modules, each with its own dedicated algorithms and controls logic. A data filtering module 716 is responsible for separating the data received from the trend data based on physical laws and complete datasets.

A causal analysis module 718 is responsible for searching for and executing statistical and causal algorithms to produce causal models between the variable of interest and the associated trend/historic data. The statistical and causal algorithms that the chilled water system causal coordinator 640 may include but are not limited to MultiFask, FASK, GFCI, FCI, FGES, and FAS, as well as various machine learning and causal reinforcement learning algorithms. the casual analysis module 718 may also include preset background knowledge on how variables are related to each other. For example, it may be defined that an increase in cooling supply airflow directly affects the cooling load capacity, but not the other way around. The causal analysis module 718 may also be responsible for creating structural equations models (SEM) that describe the dependencies of the variables.

The causal interpreter 720 may be responsible for processing the structural equation models from the causal analysis module 718 and producing the Bayesian Information Criterion scores and implied correlation matrix from the data trends. The correlation matrix will weigh the relationship between variables on a scale of 0 to 1 or −1, with one being an exact correlation. The causal interpreter 720 may then compare the resulting data to historical outputs to detect any significant deviation, e.g., 10%, change in value. The causal interpreter 720 may request the causal analysis module 718 to perform larger or smaller causal model analyses depending on the variable deviation discovered. If significant deviation occurs and if the SG-CR 636 and SG-AI 10 cannot self-fix (via the self-commissioning module) the cause of the deviation, the chilled water system causal coordinator 640 may be responsible for sending the variables in question to the interactive GUI 446 for user direction. For example, the causal interpreter agent 720 may present the user with an analysis indicating that there is a high probability that a chilled water control valve is malfunctioning and maintenance is required in order to have the chiller operate within its expected range of operation.

Figure 46:
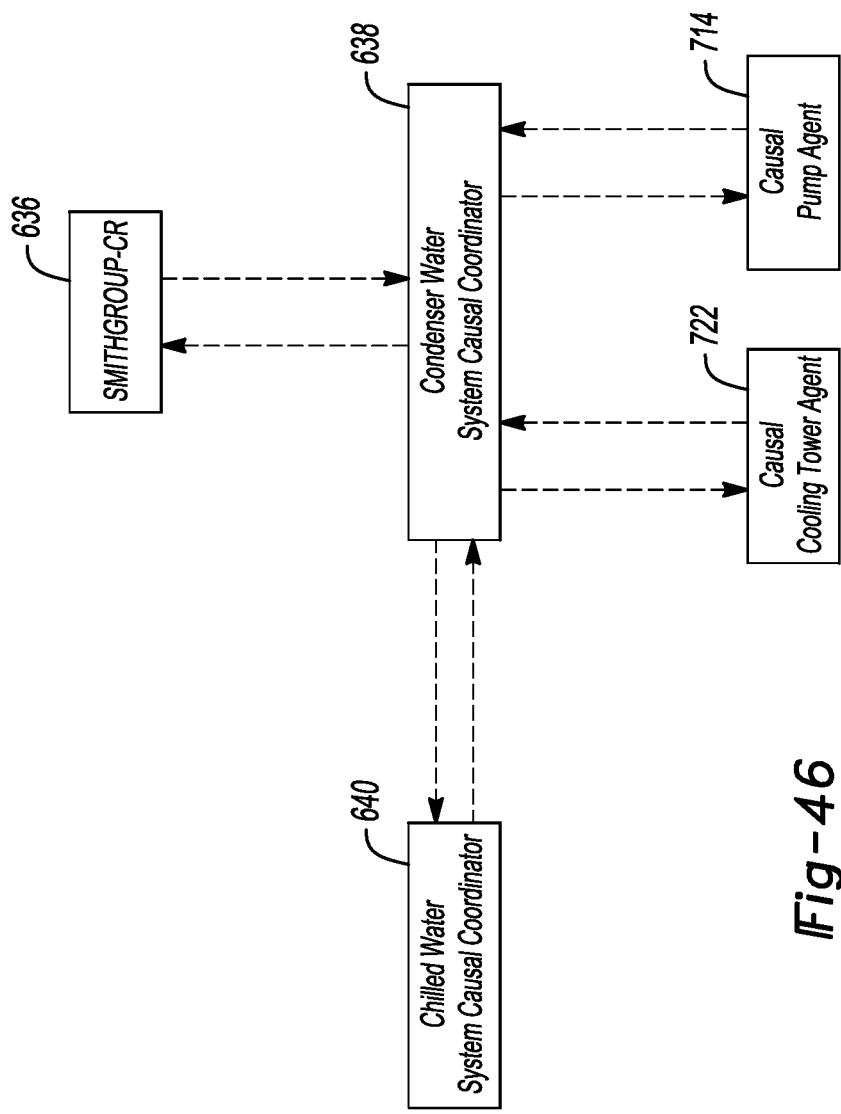
FIG. 46 shows the communication architecture between a condenser water system causal coordinator, agents, and other system components.

Referring to FIG. 46, the condenser water system causal coordinator 638 is an independent software agent that monitors and controls all causal agents 714, 722 associated with its respective chilled water system. Further, the condenser water system causal coordinator 638 may be responsible for the following:

Performing overall system causal analyses.

Communication with the SG-CR 636: sends system causal analyses and receives commands from the SG-CR 636.

Communication with the causal cooling tower agent 722: requests causal models and/or outputs of causal models from the causal chiller agent 712 and sends outputs from the causal analyses performed by other causal agents (e.g., causal pump agent) such that the causal cooling tower agent 722 can improve its own causal models.

Communication with the chilled water system causal coordinator 640. The type of information that the condenser water system causal coordinator 638 communicates to the chilled water system causal coordinator 640 may represent causal models and/or outputs of causal models.

Figure 47:
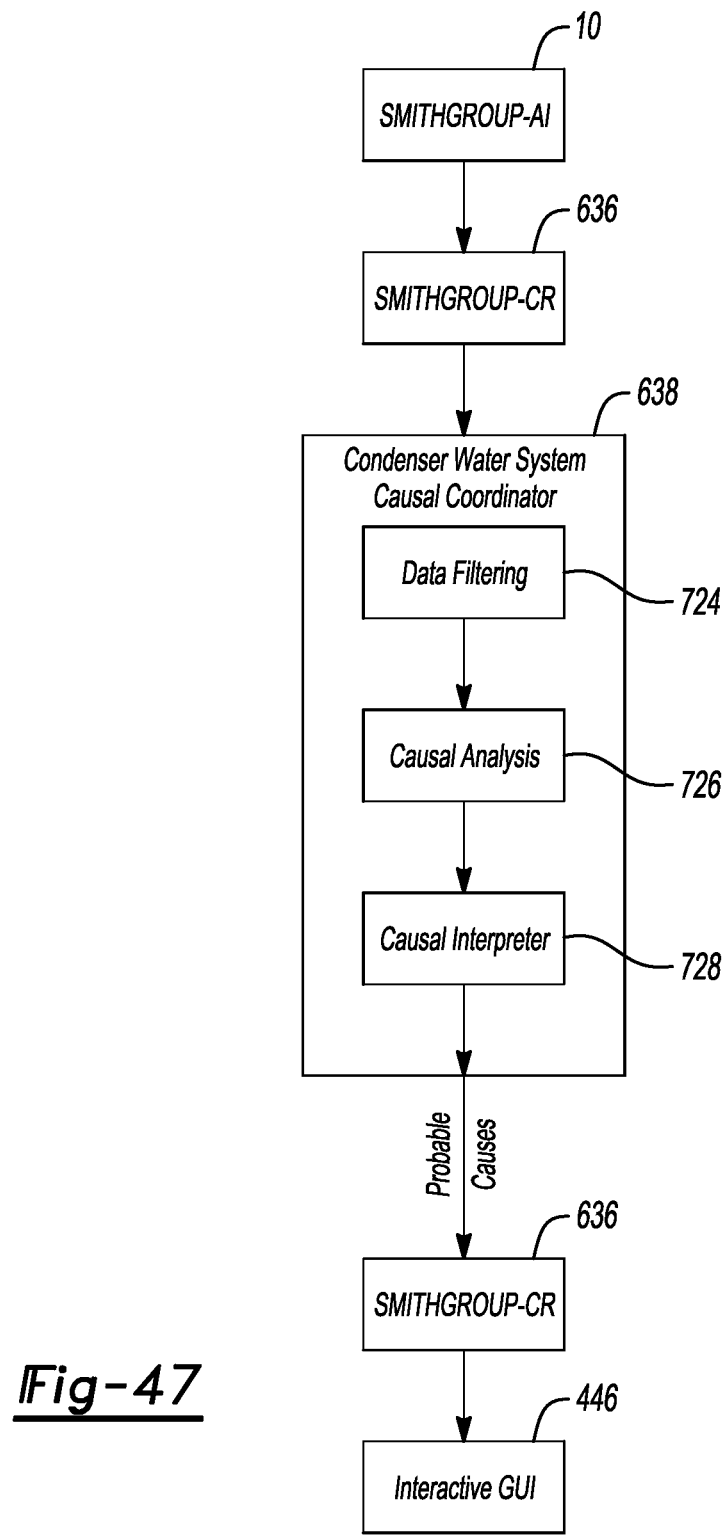
FIG. 47 shows the communication architecture between a condenser water system causal coordinator and other system components.

Referring to FIG. 47, the condenser water system causal coordinator 638 may achieve its goal by analyzing trend data and using statistical and causal algorithms to create causal models that may identify what variable (e.g., a sensor, an actuator, etc.) has caused another variable (e.g., a sensor, an actuator, etc.) to operate outside of its expected range of operation. Further, the condenser water system causal coordinator 638 may use statistical and causal algorithms to create causal models in order to identify why a variable (e.g., a sensor, an actuator, etc.) is operating outside of its expected range of operation.

The condenser water system causal coordinator 638 is comprised of three modules, each with its own dedicated algorithms and controls logic. A data filtering module 724 is responsible for separating the data received from the trend data based on physical laws and complete datasets.

A causal analysis module 726 is responsible for searching for and executing statistical and causal algorithms to produce causal models between the variable of interest and the associated trend/historic data. The statistical and causal algorithms that the condenser water system causal coordinator 638 may use include but are not limited to MultiFask, FASK, GFCI, FCI, FGES, and FAS, as well as various machine learning and causal reinforcement learning algorithms. The casual analysis module 726 may also include preset background knowledge on how variables are related to each other. For example, it may be defined that an increase in cooling supply airflow directly affects the cooling load capacity, but not the other way around. The causal analysis module 726 may also be responsible for creating structural equations models (SEM) that describe the dependencies of the variables.

A causal interpreter 728 may be responsible for processing the structural equation models from the causal analysis module 726 and producing the Bayesian Information Criterion scores and implied correlation matrix from the data trends. The correlation matrix will weigh the relationship between variables on a scale of 0 to 1 or −1, with one being an exact correlation. The causal interpreter 728 may then compare the resulting data to historical outputs to detect any significant deviation, e.g., 10%, change in value. The causal interpreter 728 may request the causal analysis module 726 to perform larger or smaller causal model analyses depending on the variable deviation discovered. If significant deviation occurs and if the SG-CR 63 and SG-AI 10 cannot self-fix (via the self-commissioning module) the cause of the deviation, the condenser water system causal coordinator 638 may be responsible for sending the variables in question to the interactive GUI 446 for user direction. For example, the causal interpreter agent 728 may present the user with an analysis indicating that there is a high probability that the pump strainer is clogged and cleaning is required in order to have the condenser water pump operate within its expected range of operation.

Figure 48:
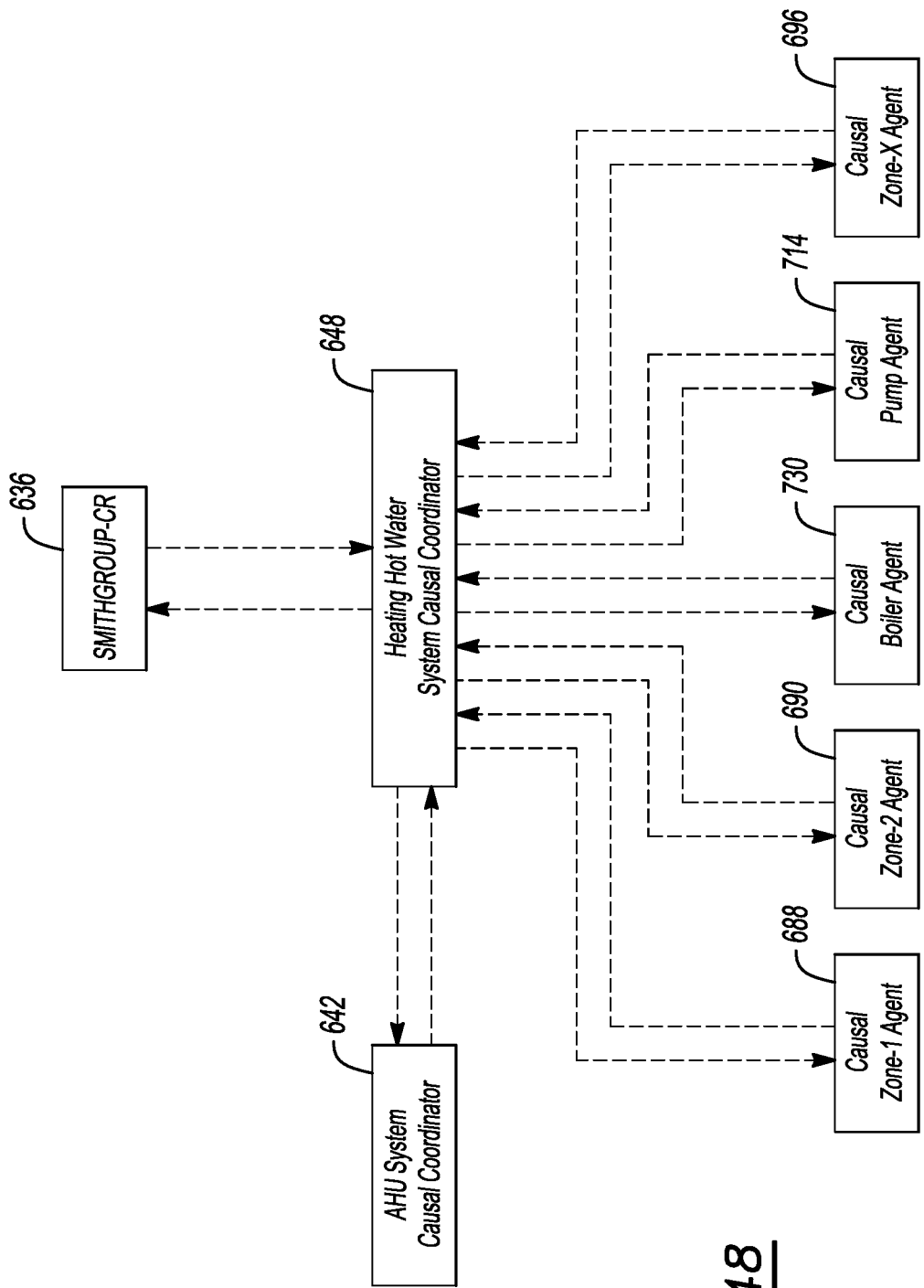
FIG. 48 shows the communication architecture between a heating hot water system causal coordinator, agents, and other system components

Referring to FIG. 48, the heating hot water system causal coordinator 648 is an independent software agent that monitors and controls all causal agents 688, 690, 696, 714, 730 associated with its respective chilled water system. Further, the heating hot water system causal coordinator 648 may be responsible for the following:

Performing overall system causal analyses.

Communication with the SG-CR 636: sends system causal analyses and receives commands from the SG-CR 636.

Communication with the causal boiler agent 730: requests causal models and/or outputs of causal models from the causal chiller agent 712 and sends outputs from the causal analyses performed by other causal agents (e.g., causal zone agents) such that the causal boiler agent 730 can improve its own causal models.

Communication with the AHU system causal coordinator 642. The type of information that the heating hot water system causal coordinator 648 communicates to the AHU system causal coordinator 642 may represent causal models and/or outputs of causal models.

Figure 49:
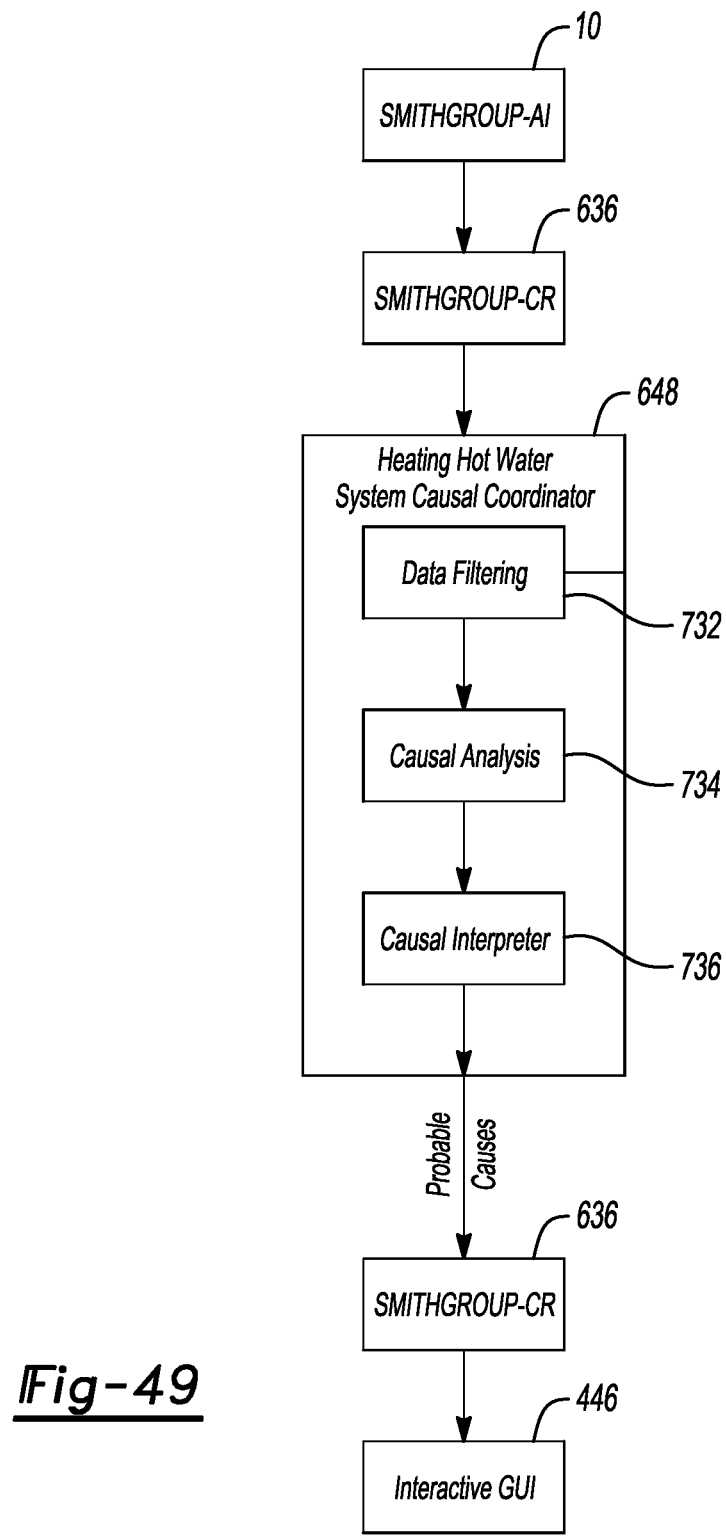
FIG. 49 shows the communication architecture between a heating hot water system causal coordinator and other system components.

Referring to FIG. 49, the heating hot water system causal coordinator 648 may achieve its goal by analyzing trend data and using statistical and causal algorithms to create causal models that may identify what variable (e.g., a sensor, an actuator, etc.) has caused another variable (e.g., a sensor, an actuator etc.) to operate outside of its expected range of operation. Further, the heating hot water system causal coordinator 648 may use statistical and causal algorithms to create causal models in order to identify why a variable (e.g., a sensor, an actuator) is operating outside of its expected range of operation.

The heating hot water system causal coordinator 648 is comprised of three modules, each with its own dedicated algorithms and controls logic. A data filtering module 732 is responsible for separating the data received from the trend data based on physical laws and complete datasets.

A causal analysis module is responsible for searching for and executing statistical and causal algorithms to produce causal models between the variable of interest and the associated trend/historic data. The statistical and causal algorithms that the heating hot water system causal coordinator 648 may use include but are not limited to MultiFask, FASK, GFCI, FCI, FGES, and FAS, as well as various machine learning and causal reinforcement learning algorithms. the casual analysis module 734 may also include preset background knowledge on how variables are related to each other. For example, it may be defined that an increase in cooling supply airflow directly affects the cooling load capacity, but not the other way around. The causal analysis module 734 may also be responsible for creating structural equations models (SEM) that describe the dependencies of the variables.

The causal interpreter 736 may be responsible for processing the structural equation models from the causal analysis module 734 and producing the Bayesian Information Criterion scores and implied correlation matrix from the data trends. The correlation matrix will weigh the relationship between variables on a scale of 0 to 1 or −1, with one being an exact correlation. The causal interpreter 736 may then compare the resulting data to historical outputs to detect any significant deviation, e.g., 10%, change in value. The causal interpreter 736 may request the causal analysis module 734 to perform larger or smaller causal model analyses depending on the variable deviation discovered. If significant deviation occurs and if the SG-CR 636 and SG-AI 10 cannot self-fix (via the self-commissioning module) the cause of the deviation, the heating hot water system causal coordinator 648 may be responsible for sending the variables in question to the interactive GUI 446 for user direction. For example, the causal interpreter agent 736 may present the user with an analysis indicating that there is a high probability that a heating hot water control valve is malfunctioning and maintenance is required in order to have the boiler operate within its expected range of operation.

Figure 50A:
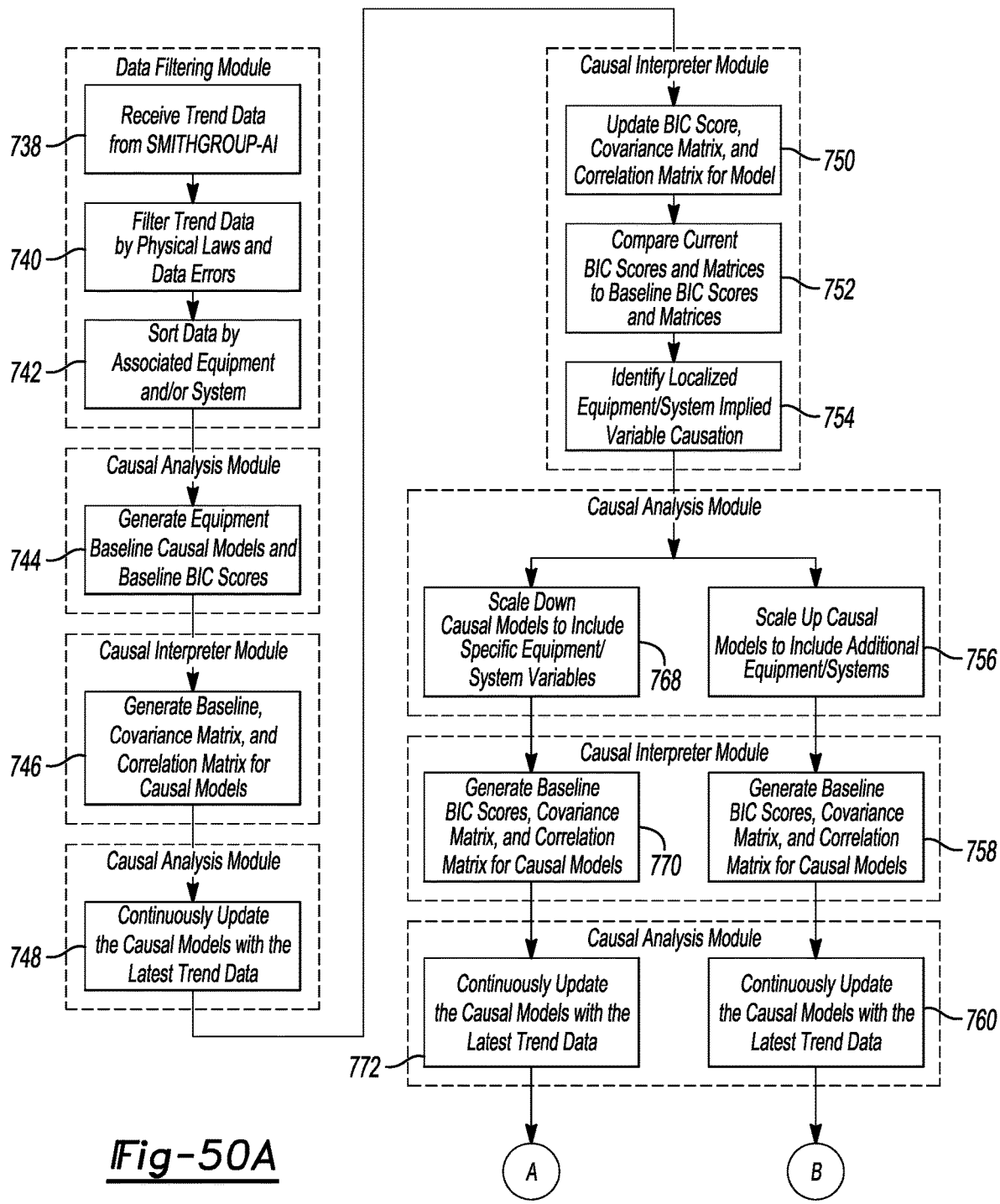
FIGS. 50A and 50B show a block diagram describing operations associated with causal analysis.
Figure 50B:
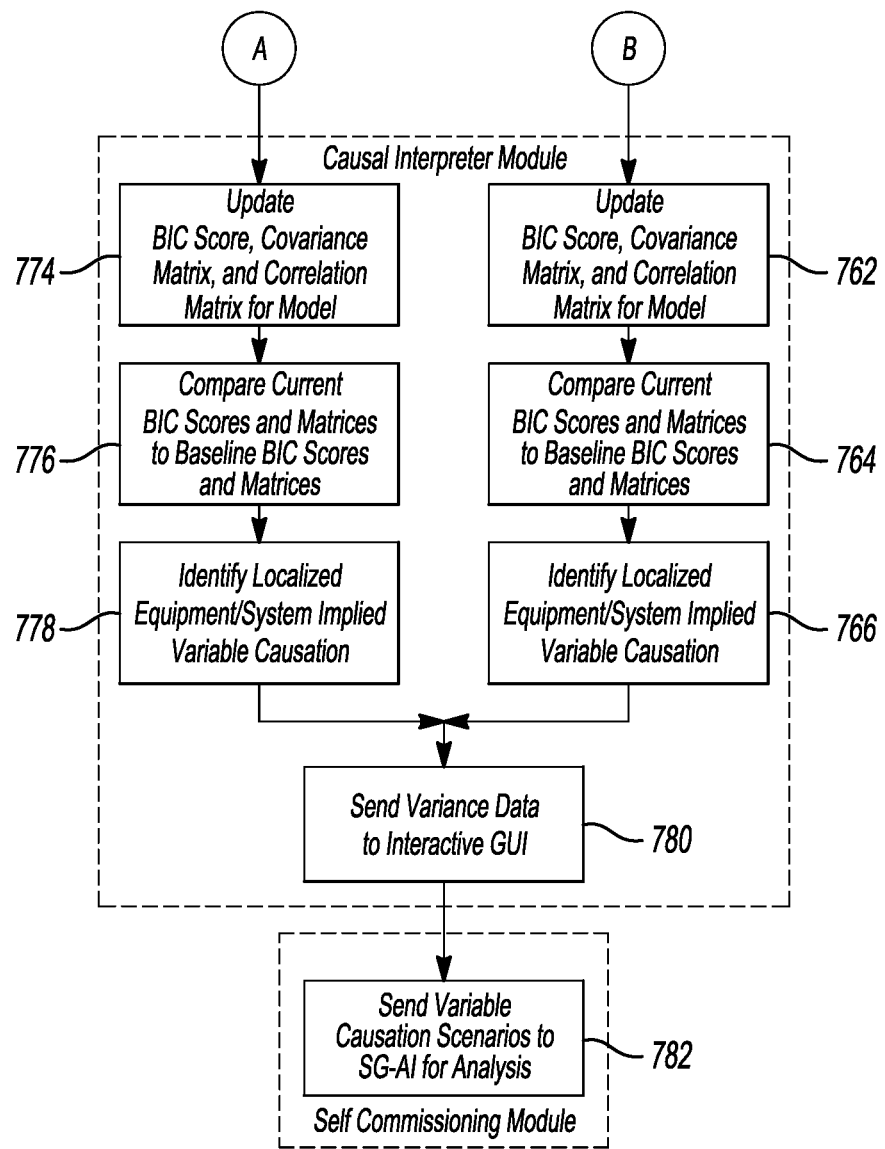

Referring to FIGS. 50A and 50B, the system may continuously receive trend data from the SG-AI 10. The SG-CR 636 may then send said trend data to each causal system coordinator. A process by which a causal system coordinator performs causal analyses is described next. The causal system coordinator may then filter the trend data to remove data points with errors. The data is then sorted first by each variable's associated system coordinator and then by the variable's associated equipment to prepare for causal analysis.

Figure 51:
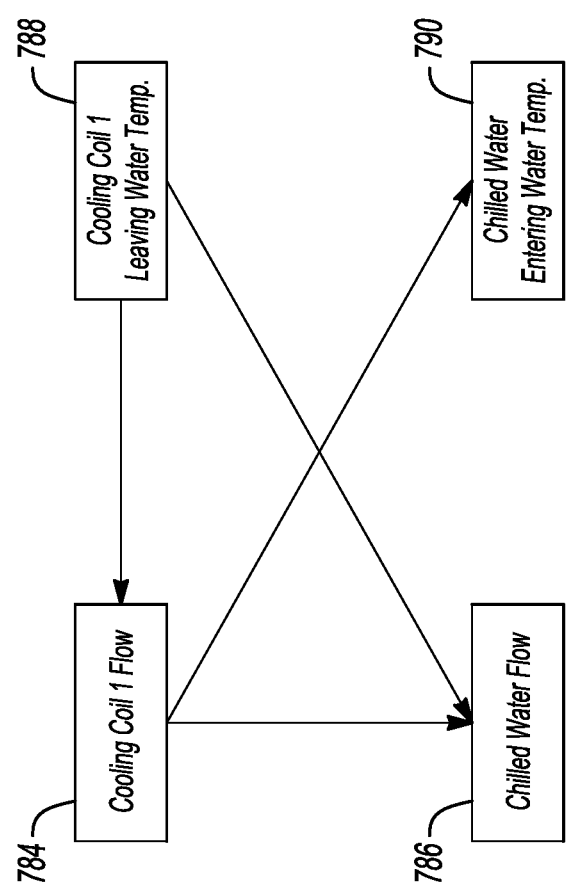
FIG. 51 shows an example directed acyclic graph.

The causal agent may take variables associated with a piece of equipment and run various causal model algorithms, such as fast greedy equivalent search (FGES), to generate baseline causal models/directed acyclic graphs (DAGs), as seen in FIG. 51. The causal agent may also generate baseline Bayesian Information Criterion scores associated with the baseline causal models and may use these scores for future comparisons to Bayesian Information Criterion scores from updated causal models.

For example, the FGES algorithm starts its search with an empty graph and performs parallel forward stepping searches in which edges, displayed as arrows, are added to variables to increase the Bayesian score. This continues until no single edge addition increases the score. Finally, it performs a parallel backward stepping search that removes edges until no edge removal can increase the score. The resulting analysis produces a Bayesian Information Criterion score for each variable and overall model that describes the error variance. From the relationships discovered in the direct acyclic graph, a structural equation model is created to describe the continuous variables with a set of linear coefficients. Values are then assigned to the linear coefficients and the implied correlation matrix and covariance matrix is derived. These matrices describe the strength of relationships between variables in the model, with the correlation matrix describing the strength on a scale of 0 to 1 or −1. An example correlation matrix is seen in Table 35.

TABLE 35

Cooling Coil 1 Correlation Matrix Baseline 1

|  | CC1_FLOW | CC1_LWT | CHW_FLOW | CHW_EWT |
|---|---|---|---|---|
| CC1_FLOW | 1.000 | | | |
| CC1_LWT | −0.559 | 1.000 | | |
| CHW_FLOW | 0.752 | −0.421 | 1.000 | |
| CHW_EWT | −0.361 | 0.886 | −0.465 | 1.000 |

The causal agent may then continuously update the causal models with new trend data from the SG-AI 10. New Bayesian Information Criterion scores and implied matrices may be developed from the new causal models, which will then be compared to the historical Bayesian Information Criterion and matrices to determine any significant variance as seen in Table 36.

TABLE 36

| | Cooling Coil 1 Correlation Matrix Baseline 1 | | | | Cooling Coil 1 Causal Model Baseline 1 | |
|---|---|---|---|---|---|---|
| | CC1_FLOW | CC1_LWT | CHW_FLOW | CHW_EWT | Overall BIC: | −1453.0473 |
| CC1_FLOW | 1.000 | | | | CC1_FLOW BIC | −856.71652 |
| CC1_LWT | −0.559 | 1.000 | | | CC1_LWT BIC: | −78.474085 |
| CHW_FLOW | 0.752 | −0.421 | 1.000 | | CHW_FLOW BIC: | −954.67332 |
| CHW_EWT | −0.361 | 0.886 | −0.465 | 1.000 | CHW_EWT BIC: | 436.81657 |
| | Cooling Coil 1 Correlation Matrix Updated 1 | | | | Cooling Coil 1 Causal Model Updated 1 | |
| | CC1_FLOW | CC1_LWT | CHW_FLOW | CHW_EWT | Overall BIC: | −1668.4758 |
| CC1_FLOW | 1.000 | | | | CC1_FLOW BIC | −931.71610 |
| CC1_LWT | −0.672 | 1.000 | | | CC1_LWT BIC: | −168.54291 |
| CHW_FLOW | 0.821 | −0.552 | 1.000 | | CHW_FLOW BIC: | −928.16577 |
| CHW_EWT | −0.464 | 0.891 | −0.539 | 1.000 | CHW_EWT BIC: | 438.23811 |

If any significant variance is detected, the causal agent may initiate causal models with more and/or less variables to further investigate the causal relationship of the deviations from historical data. The causal models' Bayesian Information Criterion scores and implied matrices will be compared to the respective baseline causal models to determine if there are any significant deviations. The variables detected to have implied cause for deviation will be sent to the interactive GUI.

The GUI may present options to the user for possible scenarios that could address the variable deviation. For example, the causal models may identify that the relative increase in chiller energy consumption levels is due to an increase in outside air flow at one the air handling units. If the increase in outside airflow at the air handling unit is within an expected range, then this may indicate that there are more people in the spaces served by the air handling unit. The causal agent may still flag the increase in outside air flow as the cause of the increase in chiller energy consumption levels.

If the increase in outside airflow at the air handling unit is outside of an expected/predicted range, then this may indicate that there may be a problem with the hardware of the air handling unit, e.g., outside air damper does not modulate. In this scenario, the causal agent may then communicate this output to the SG-CR, which in turn, via the self-commissioning module, may ask the SG-AI to perform a series of tests on the outside air damper. These tests may indicate that the damper actuator is not responding to the commands sent by the SG-AI via the AHU Agent. In this scenario, the SG-CR may indicate at the GUI to the user that there is, for example, an 80% chance that the increase in outside air flow at the air handling unit is due to an inactive damper actuator and said damper actuator will need to be replaced. These operations are summarized in blocks 738, 740, 742, 744, 746, 748, 750, 752, 754, 756, 758, 760, 762, 764, 766, 768, 770, 772, 774, 776, 778, 780, 782 with reference to FIGS. 50A and 50B, and blocks 784, 786, 788, 790.

Based on the preceding discussions, a causal agent responsible for maintaining the environment of a particular conference room may detect, via typical actuators and sensors, and report to its causal coordinator that a temperature of the conference room is outside (e.g., higher than) a predefined range (e.g., 70° F. to 75° F.) and that corresponding climate resources (e.g., a fan, etc.) for the conference room are operating within their predefined ranges (e.g., the fan is operating within an allowable speed range of 300 to 400 rpm) such that the climate resources are not able to lower the temperature into the predefined range. Sensed values may be compared to their corresponding predefined range to assess whether the sensed values fall within the predefined range. Other causal agents may also report to the causal coordinator, periodically or at the request of the causal coordinator, the state of their environmental parameters and resource parameters relative to corresponding designated ranges. A second causal agent may, for example, report that a second conference room temperature is within a designated range of 70° F. to 75° F. (e.g., is at 72° F.), and that a second fan associated with the second conference room is operating in an allowable speed range of 300 to 400 rpm (e.g., is at 390 rpm). Thus, the coordinator, based on a causal analysis as described above, may determine that the inability of the fan to cool the conference room to within the predefined range is caused by the second fan operating above 370 rpm when the first conference room temperature is above the predefined range. The coordinator may thus command the second causal agent to adjust the allowable rpm range of the second fan to 300 to 370 rpm (an altered span), and to operate the second fan within this altered span. Given this scenario and the associated analysis, operating the second fan at, for example, 370 rpm will result in the temperature of the first conference room falling to within the predefined range with continued operation of the first fan within its predefined rpm range.

Similarly, responsive to the causal agent reporting to its causal coordinator that a temperature of the conference room is outside a predefined range and that the corresponding climate resources for the conference room are operating within their predefined ranges, the causal coordinator may alert other causal coordinators and/or agents to the issues so they may run local causal analysis to determine whether resources under their control are responsible for the issue. Such circumstances may arise, for example, when the ability to sense an issue at its source takes longer than the ability to sense the issue downstream, or when sensors or actuators are malfunctioning, etc.

Once the cause of a variable operating outside of its expected range of operation is identified, SG-CR may also ask SG-AI to update its internal predictions to account for the variable as operating out of its expected range.

The algorithms, processes, methods, logic, or strategies disclosed may be deliverable to and/or implemented by a processing device, controller, or computer, which may include any existing programmable electronic control unit or dedicated electronic control unit. The supervisors, coordinators, and agents contemplated herein may be implemented across several processors as shown in FIG. 1 or a single processor, etc. Similarly, the algorithms, processes, methods, logic, or strategies may be stored as data and instructions executable by a controller or computer in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed:

1. A hierarchical resource analysis system for a building that has a plurality of zones each with a corresponding resource arranged to alter an environment of the zone, the system comprising:
   one or more processors programmed to implement a plurality of causal agents and a causal coordinator,
      each of the causal agents configured to report to the causal coordinator parameter values describing a state of the environment of one of the zones and parameter values describing a state of the corresponding resource for the zone, and
      the causal coordinator configured to, responsive to indication that at least one of the parameter values describing a state of the environment of one of the zones is outside a predefined zone range and all of the parameter values describing the states of the corresponding resources for the zones are within corresponding predefined resource ranges, command at least one of the causal agents to operate the corresponding resource within an altered span of at least one of the predefined resource ranges that is derived from a causal analysis of the parameter values describing the states of the environments of the zones and parameter values describing the states of the corresponding resources for the zones such that the at least one of the parameter values describing the state of the environment returns to the predefined zone range.

2. The hierarchical resource analysis system of claim 1, wherein each of the causal agents is further configured to, responsive to indication that at least one of the parameter values describing a state of the environment of the corresponding zone is outside the corresponding predefined zone range, identify whether the parameter values describing the state of the corresponding resource are within the corresponding predefined resource ranges.

3. The hierarchical resource analysis system of claim 1, wherein one of the causal agents, responsive to indication that at least one of the parameter values describing a state of the environment of the corresponding zone is outside the corresponding predefined zone range, alert the causal coordinator regarding the indication.

4. The hierarchical resource analysis system of claim 3, wherein the causal coordinator is further configured to command other of the causal agents to identify whether the parameter values describing the states of the corresponding resources are within the corresponding predefined resource ranges.

5. The hierarchical resource analysis system of claim 1, wherein the causal coordinator is further configured to indicate a status of an actuator or sensor associated with at least one of the causal agents.

* * * * *